United States Patent
Katohgi

(10) Patent No.: US 7,692,817 B2
(45) Date of Patent: Apr. 6, 2010

(54) IMAGE PROCESSING METHOD, IMAGE PROCESSING APPARATUS, IMAGE FORMING APPARATUS, COMPUTER PROGRAM PRODUCT AND COMPUTER MEMORY PRODUCT FOR CARRYING OUT IMAGE PROCESSING BY TRANSFORMING IMAGE DATA TO IMAGE DATA HAVING SPATIAL FREQUENCY COMPONENTS

(75) Inventor: Terumitsu Katohgi, Chiba (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 719 days.

(21) Appl. No.: 11/158,015

(22) Filed: Jun. 22, 2005

(65) Prior Publication Data

US 2005/0286791 A1    Dec. 29, 2005

(30) Foreign Application Priority Data

Jun. 23, 2004 (JP) ............................. 2004-185548
Aug. 17, 2004 (JP) ............................. 2001-237749

(51) Int. Cl.
*G06F 15/00*    (2006.01)
*H04N 1/40*     (2006.01)
*G06K 15/00*    (2006.01)
*G06K 9/46*     (2006.01)
*G06K 9/00*     (2006.01)

(52) U.S. Cl. .................. 358/3.03; 358/1.9; 358/3.01; 382/248; 382/250; 382/252

(58) Field of Classification Search ............... 358/3.01, 358/3.03, 1.9, 1.1; 382/252, 251, 232
See application file for complete search history.

(56) References Cited

U.S. PATENT DOCUMENTS 5,223,926 A * 6/1993 Stone et al. ............ 375/240.01

(Continued)

FOREIGN PATENT DOCUMENTS

JP    6-189119 A    7/1994

(Continued)

OTHER PUBLICATIONS

Takaie Hitoshi., "Yokuwakaru Digital Gazo Shori" (Fully Understandable Digital Image Processing) CQ Publishing Co., Ltd. pp. 120-130, Feb. 20, 1996.

(Continued)

*Primary Examiner*—Mark K Zimmerman
*Assistant Examiner*—Ming Hon
(74) *Attorney, Agent, or Firm*—Birch, Stewart, Kolasch & Birch, LLP

(57) ABSTRACT

Image processing is carried out by transforming image data to image data having spatial frequency components, by judging whether the absolute values of the coefficients of the predetermined frequency components of the transformed image data are equal to or more than a predetermined value, by modifying the coefficients of the AC components of the image data depending on the result of the judgment, by inversely transforming the image data having the modified coefficients to image data having spatial coordinate components, by comparing the gray levels of the inversely transformed image data with predetermined values, and by transforming the gray levels to quantized levels corresponding to the result of the comparison. By carrying out proper image processing corresponding to the characteristics of the image, the number of gray levels of the image can be decreased while the characteristic portions of the original image are maintained properly.

17 Claims, 27 Drawing Sheets

U.S. PATENT DOCUMENTS

| | | | | |
|---|---|---|---|---|
| 5,838,379 A | * | 11/1998 | Takayama | 375/240.2 |
| 5,949,904 A | * | 9/1999 | Delp | 382/165 |
| 6,078,615 A | * | 6/2000 | Yamamoto et al. | 375/240 |
| 6,122,070 A | * | 9/2000 | Kang et al. | 358/1.9 |
| 6,473,533 B1 | * | 10/2002 | Yokose et al. | 382/248 |
| 6,584,225 B1 | | 6/2003 | Moroney | |
| 6,603,864 B1 | * | 8/2003 | Matsunoshita | 382/100 |
| 2003/0188025 A1 | * | 10/2003 | Porter et al. | 709/247 |
| 2003/0202712 A1 | * | 10/2003 | Stefan Porter et al. | 382/251 |

FOREIGN PATENT DOCUMENTS

| | | |
|---|---|---|
| JP | 9-54825 A | 2/1997 |
| JP | 10-276321 A | 10/1998 |
| JP | 2000-299783 A | 10/2000 |
| JP | 2001-143066 A | 5/2001 |
| JP | 2002-10085 A | 1/2002 |
| JP | 2003-132344 A | 5/2003 |
| JP | 2005-57553 A | 3/2005 |

OTHER PUBLICATIONS

Makita Tsuyoshi, "Ink-jet Printer niokeru Kougashitsu Gijyutsu" (High Quality Image Processing for Ink-jet Printers) Journal of the Image Society of Japan, 2001, vol. 40, No. 3, pp. 237-243.

* cited by examiner

FIG. 1
PRIOR ART

DITHER MATRIX

| 0 | 128 | 32 | 160 |
|---|---|---|---|
| 192 | 64 | 224 | 96 |
| 48 | 176 | 16 | 144 |
| 240 | 112 | 208 | 80 |

FIG. 6

BLUE NOISE MASK

| Y\X | 1 | 2 | 3 | 4 | 5 | 6 | 7 | 8 | 9 | 10 | |
|---|---|---|---|---|---|---|---|---|---|---|---|
| 1 | 48 | -88 | 24 | -24 | 65 | -104 | -7 | 99 | -44 | -112 | ... |
| 2 | -45 | 105 | -68 | 89 | -60 | 106 | 47 | -77 | 0 | 117 | ... |
| 3 | -108 | 14 | 59 | -97 | 11 | -17 | -122 | 27 | 66 | -103 | ... |
| 4 | 83 | -72 | -33 | 114 | 42 | -82 | 127 | -58 | -24 | 101 | ... |
| 5 | -126 | 49 | -3 | -117 | -54 | 66 | -6 | 84 | -86 | 43 | ... |
| 6 | 123 | -52 | 90 | 38 | 102 | -32 | -112 | 51 | 15 | -98 | ... |
| 7 | -84 | 22 | -98 | -18 | -87 | 19 | 109 | -58 | -16 | 73 | ... |
| 8 | 113 | -12 | 82 | 13 | -52 | 71 | -3 | -92 | 98 | -118 | ... |
| 9 | 57 | -64 | -123 | 55 | 114 | -106 | -39 | 50 | 5 | -30 | ... |
| 10 | -36 | 107 | 1 | -44 | -81 | 17 | 66 | -65 | 126 | -76 | ... |
| | ... | ... | ... | ... | ... | ... | ... | ... | ... | ... | ... |

FIG. 14 ONE EXAMPLE OF TWO-DIMENSIONAL MATRIX USED FOR 2nd MODIFICATION UNIT

| T→ / S↑ | | | | | | | | | | |
|---|---|---|---|---|---|---|---|---|---|---|
| | | | | | 364.7 | 431.4 | 480.9 | 463.4 | 412.0 | 463.4 | 480.9 | 431.4 |
| | | | | | 475.2 | 480.9 | 475.3 | 441.9 | 390.6 | 441.9 | 475.3 | 480.9 |
| | | | | | 469.8 | 463.4 | 441.9 | 404.7 | 358.1 | 404.7 | 441.9 | 463.4 |
| | | | | | 419.4 | 412.0 | 390.6 | 358.1 | 391.5 | 358.1 | 390.6 | 412.0 |
| 1 | | | | | | 463.4 | 441.9 | 404.7 | 358.1 | 404.7 | 441.9 | 463.4 |
| 1 | | | | | | 475.3 | 441.9 | 390.6 | 441.9 | 475.3 | 480.9 |
| 1 | 1 | | | | | 463.4 | 412.0 | 463.4 | 480.9 | 431.4 |
| 1 | 1 | 1 | 1 | 419.4 | 469.8 | 475.2 | 364.6 |

(Note: table reproduction is approximate; see figure for exact layout.)

IMAGE PROCESSING METHOD, IMAGE PROCESSING APPARATUS, IMAGE FORMING APPARATUS, COMPUTER PROGRAM PRODUCT AND COMPUTER MEMORY PRODUCT FOR CARRYING OUT IMAGE PROCESSING BY TRANSFORMING IMAGE DATA TO IMAGE DATA HAVING SPATIAL FREQUENCY COMPONENTS

CROSS-REFERENCE TO RELATED APPLICATIONS

This Nonprovisional application claims priority under 35 U.S.C. § 119 (a) on Patent Applications No. 2004-185548 and No. 2004-237749 filed in Japan on Jun. 23, 2004 and Aug. 17, 2004, the entire contents of which are hereby incorporated by reference.

BACKGROUND OF THE INVENTION

1. Field of the Invention

The present invention relates to an image processing method for carrying out image processing by changing the coefficients of the spatial frequency components of image data, an image processing apparatus for carrying out such an image processing method, an image forming apparatus including such an image processing apparatus, a computer program product for operating a general purpose computer so as to function as the above-mentioned image processing apparatus, and a computer program product on which a computer program has been recorded.

2. Description of Related Art

As a method for decreasing the number of gray levels of an image including halftones, for example, as a method for binarizing an image having 256 gray levels to obtain an image having 2 gray levels, a method for carrying out binarization by comparing the number of gray levels of an image with a predetermined value, i.e., a threshold value, a dither method and an error diffusion method (Japanese Patent Application Laid-Opens No. 2000-299783, No. H06-189119 (1994) and No. 2002-10085) are known.

FIG. 1 is a schematic view showing an example of a dither matrix of 4×4 that is used in the case where an image having 16 gray level is binarized in the conventional dither method. In the dither matrix, any one of predetermined values in the range of 0 to 240 is set according to the location of the pixel. In the dither method, the number of gray levels of image data having 16 gray level having been inputted are compared with the predetermined values having been set in the dither matrix, pixel by pixel. In the case where the number of gray levels of the image data is equal to or more than the predetermined value, the gray level is set at 255, and in the case where the gray level is less than the predetermined value, the gray level is set at 0. In this way, the image is binarized.

In the error diffusion method, a quantization error occurring when each pixel of image data having been inputted is binarized, that is, the difference between the gray level of a pixel before binarization and the gray level after binarization is diffused to pixels not yet binarized. In the case where a pixel to be binarized is assumed to be a processing pixel, the quantization error of the processing pixel is added to the gray levels of the pixels not yet binarized and located in the vicinity of the processing pixel, after weighting is carried out according to the relative location from the processing pixel.

FIG. 2 is a schematic view showing an example of a weighting coefficient matrix being used in the conventional error diffusion method. In the example shown in FIG. 2, a weighting coefficient matrix of 3×2 including a processing pixel (IX, IY) is shown, wherein the horizontal direction (the left-right direction in FIG. 2) is assumed to be the X direction, and the vertical direction (the up-down direction in FIG. 2) is assumed to be the Y direction. The weighting coefficient matrix has the weighting coefficients of the lower left pixel, the lower pixel, the lower right pixel and the right pixel adjacent to the processing pixel (IX, IY). For example, the gray level of the processing pixel (IX, IY) is compared with a predetermined value. In the case where the gray level is equal to or more than the predetermined value, the gray level of the processing pixel (IX, IY) is set at 255. In the case where the gray level is less than the predetermined value, the gray level of the processing pixel (IX, IY) is set at 0. Next, the difference between the binarized gray level, 255 or 0, and the gray level of the processing pixel (IX, IY) before binarization, that is, a quantization error, is diffused to the adjacent pixels before binarization, on the basis of the weighting coefficient matrix. However, since the left pixel (IX−1, Y) adjacent to the processing pixel (IX, IY) has already been quantized earlier than the processing pixel (IX, IY), the quantization error is not diffused to the left pixel.

In the case where the quantization error is assumed to be Err, Err×(7/16), Err×(1/16) and Err×(5/16), Err×(3/16) are diffused to the four pixels (IX+1, IY), (IX+1, IY+1), (IX, IY+1) and (IX−1, IY+1) adjacent to the processing pixel (IX, IY), respectively.

In the error diffusion method, since the quantization error is diffused to the adjacent unprocessed pixels on the basis of the weighting coefficient matrix, the method has an advantage of hardly causing moire patterns in binarized images in comparison with the dither method.

In addition, in the method disclosed in Japanese Patent Application Laid-Open No. 2002-10085, image data is converted to image data having spatial frequency components, and halftone processing of the image is carried out by using the data converted to halftone spatial frequency domains predetermined for the coefficients of the spatial frequency components used for the transformation.

In the dither method, however, since binarization is carried out by using the dither matrix having the same pattern, there is a problem of generating texture peculiar to the dither method, that is, periodic patterns, in a binarized image.

Furthermore, in the error diffusion method, since an error is diffused for each pixel on the basis of the same matrix, a large quantization error is diffused in a chain reaction at a highlight area having large gray levels. This causes a problem of connecting pixels to one another. More specifically, pixels having different gray levels are forced to have the same gray level, and this causes a problem of generating an image having pixels partly connected to one another.

Still further, since predetermined halftone data is used in the invention disclosed in Japanese Patent Application Laid-Open No. 2002-10085, there is a problem of generating texture or the like as in the case of the error diffusion method or the dither method. In other words, a problem similar to that described above occurs since halftone processing is merely carried out in frequency domains by using a method similar to the above-mentioned conventional method.

BRIEF SUMMARY OF THE INVENTION

In consideration of the above-mentioned circumstances, an object of the present invention is to be capable of solving the problem of pixel connection encountered in the error diffusion method by changing the coefficients of alternating current (AC) components depending on the characteristics of an image and by adding specific values to the coefficients of the AC components, that is, by adding noise to the image, and to reduce the number of gray levels of the image while properly maintaining the characteristic portions of the original image.

It is also an object of the invention to solve a problem associated with the error diffusion method, that is, connection of pixels to each other, by judging whether or not an edge portion is present in an image based on the coefficients of predetermined frequency components of image data and the mean gray level of the image, more particularly by judging whether or not an edge portion is present by varying a criterion for judging an edge portion based on the mean gray level of the image, modifying the coefficients of AC components according to the judgment result and then adding a specific value to the coefficients of the AC components, that is, adding noise to the image, and to decrease the gray levels of the image while satisfactorily maintaining the features of the original image by the image processing according to the presence or absence of an edge portion in the image.

It is another object of the invention to make it possible to judge whether or not an image subject to processing includes an edge portion more accurately compared with a judgment based on the coefficients of AC components on the high frequency side by judging whether or not an edge portion is present based on the magnitude of the products obtained by multiplying the coefficients of AC components on the low frequency side by the coefficient of the DC component, and to decrease the gray levels of the image while more satisfactorily maintaining the features of the original image.

In addition, another object of the present invention is, in the case where it is judged that the absolute values of the coefficients of predetermined frequency components are equal to or more than a predetermined value, that is, in the case where it is judged that an image includes edge portions, to be capable of selectively emphasizing the image including edge portions by increasing the coefficients of AC components, and to reduce the number of gray levels of the image while properly maintaining the characteristic portions of the original image.

Furthermore, still another object of the present invention is, in the case where it is judged that the absolute values of the coefficients of predetermined frequency components are equal to or more than a predetermined value, that is, in the case where it is judged that an image includes edge portions, to be capable of selectively emphasizing the image including edge portions by increasing the coefficients of AC components having only spatial frequency components in the horizontal direction and the coefficients of AC components having only spatial frequency components in the vertical direction, to be capable of reducing the number of gray levels of the image while properly maintaining the characteristic portions of the original image, and to suppress block patterns from being generated at the curve portions in the image, the number of gray levels of which is decreased.

Still further, yet still another object of the present invention is to be capable of more effectively emphasizing edge portions without losing the characteristic portions of an image by multiplying the coefficients of AC components by a larger real number as the frequency of the AC component is higher.

Moreover, a further object of the present invention is, in the case where it is judged that the absolute values of the coefficients of predetermined frequency components are less than the predetermined value, that is, in the case where it is judged that an image is flat image not including edge portions, to be capable of selectively smoothing the image not including edge portions by configuring an image processing apparatus so as to decrease the coefficients of AC components, and to decrease the number of gray levels of the image while properly maintaining the characteristic portions of the original image.

It is a further object of the invention to decrease the gray levels of the image while satisfactorily maintaining the features of the original image by decreasing the coefficients of the AC components when a judgment is made that the image subjected to processing is an image including no edge portion and the absolute values of the coefficients of predetermined frequency components are smaller than a predetermined value, that is, when the image subjected to processing is a flat image, or decreasing the gray levels without modifying the coefficients of the AC components when the absolute values of the coefficients of predetermined frequency components are equal to or larger than the predetermined value, and thereby enhancing the edge portion in the image including the edge portion, or smoothing the image of a particularly flat image in the image including no edge portion.

An image processing method in accordance with the present invention is an image processing method for carrying out image processing by transforming image data to image data having spatial frequency components and by modifying the coefficients of the spatial frequency components, characterized by comprising steps of: judging whether absolute values of the coefficients of the predetermined frequency components of the transformed image data are equal to or more than a predetermined value; modifying the coefficients of alternating current (AC) components of the image data by calculation depending on the result of the judgment; adding specific values to the modified coefficients of the alternating current (AC) components of the image data; inversely transforming the image data, to which the specific values are added, to image data having spatial coordinate components; comparing gray levels of the inversely transformed image data with predetermined values; and transforming the gray levels to quantized levels corresponding to the result of the comparison.

An image processing method in accordance with the present invention is an image processing method for carrying out image processing by transforming image data to image data having spatial frequency components and by modifying the coefficients of the spatial frequency components, characterized by comprising steps of: judging whether absolute values of the products obtained by multiplying the coefficients of the predetermined frequency components of the transformed image data by the coefficients of the direct current (DC) components of the same are equal to or more than a predetermined value; modifying the coefficients of alternating current (AC) components of the image data by calculation depending on the result of the judgment; adding specific values to the modified coefficients of the alternating current (AC) components of the image data; inversely transforming the image data, to which the specific values are added, to image data having spatial coordinate components; comparing gray levels of the inversely transformed image data with predetermined values; and transforming the gray levels to quantized levels corresponding to the result of the comparison.

An image processing method in accordance with the present invention is, in the above-mentioned image processing method, characterized by further comprising a step of modifying the coefficients by calculation in the case where it is judged that the absolute values are equal to or more than the predetermined value, by multiplying the coefficients of the alternating current (AC) components having only the spatial frequency components in the horizontal direction and the coefficients of the alternating current (AC) components having only the spatial frequency components in the vertical direction by a real number larger than 1.

An image processing method in accordance with the present invention is, in the above-mentioned image processing method, characterized by further comprising a step of modifying the coefficients by calculation in the case where it is judged that the absolute values are equal to or more than the predetermined value, by multiplying the coefficients by a larger (or smaller) real number as the frequency of the alternating current (AC) component is higher (or lower).

An image processing apparatus in accordance with the present invention is an image processing apparatus which has a frequency transform unit for transforming image data to image data having spatial frequency components, and carries out image processing by modifying the coefficients of the spatial frequency components, characterized by comprising: a judging unit for judging whether absolute values of the coefficients of the predetermined frequency components of the image data transformed by the frequency transform unit are equal to or more than a predetermined value; a calculation unit for modifying the coefficients of alternating current (AC) components of the image data by calculation depending on the result of the judgment made by the judging unit; an adding unit for adding specific values to the coefficients of the alternating current (AC) components of the image data modified by the calculation unit; an inverse transform unit for inversely transforming the image data, to which the specific values are added by the adding unit, to image data having spatial coordinate components; and a threshold processing unit for comparing gray levels of the image data inversely transformed by the inverse transform unit with predetermined values and for transforming the gray levels to quantized levels corresponding to the result of the comparison.

An image processing apparatus in accordance with the present invention is an image processing apparatus which has a frequency transform unit for transforming image data to image data having spatial frequency components, and carries out image processing by modifying the coefficients of the spatial frequency components, characterized by comprising: a judging unit for judging whether absolute values of the products obtained by multiplying the coefficients of the predetermined frequency components of the transformed image data by the coefficients of the direct current (DC) components of the same are equal to or more than a predetermined value; a calculation unit for modifying the coefficients of alternating current (AC) components of the image data by calculation depending on the result of the judgment made by the judging unit; an adding unit for adding specific values to the coefficients of the alternating current (AC) components of the image data modified by the calculation unit; an inverse transform unit for inversely transforming the image data, to which the specific values are added by the adding unit, to image data having spatial coordinate components; and a threshold processing unit for comparing gray levels of the image data inversely transformed by the inverse transform unit with predetermined values and for transforming the gray levels to quantized levels corresponding to the result of the comparison.

An image processing apparatus in accordance with the present invention is, in the above-mentioned image processing apparatus, characterized in that in the case where the judging unit judges that the absolute values are equal to or more than the predetermined value, the calculation unit multiplies the coefficients of the alternating current (AC) components of the image data by a real number larger than 1 or divides the coefficients of the alternating current (AC) components of the image data by a positive real number smaller than 1.

An image processing apparatus in accordance with the present invention is, in the above-mentioned image processing apparatus, characterized in that in the case where the judging unit judges that the absolute values are equal to or more than the predetermined value, the calculation unit multiplies the coefficients of the alternating current (AC) components having only the spatial frequency components in the horizontal direction and the coefficients of the alternating current (AC) components having only the spatial frequency components in the vertical direction by a real number larger than 1.

An image processing apparatus in accordance with the present invention is, in the above-mentioned image processing apparatus, characterized in that the calculation unit multiplies the coefficients by a larger (or smaller) real number as the frequency of the alternating current (AC) component is higher (or lower).

An image processing apparatus in accordance with the present invention is, in the above-mentioned image processing apparatus, characterized in that the judging unit judges that the absolute values are less than the predetermined value, the calculation unit multiplies the coefficients of the alternating current (AC) components of the image data by a positive real number smaller than 1 or divides the coefficients of the alternating current (AC) components of the image data by a real number larger than 1.

An image processing apparatus in accordance with the present invention is, in the above-mentioned image processing apparatus, characterized in that the frequency transform unit transforms the image data into image data having spatial frequency components within a predetermined frequency range, and the judging unit judges whether or not absolute values of products obtained by multiplying the coefficients of alternating current (AC) components on a low frequency side by the coefficient of direct current (DC) component are equal to or larger than a predetermined value.

An image processing apparatus in accordance with the present invention is, in the above-mentioned image processing apparatus, characterized in that the judging unit judges whether or not absolute values of coefficients of predetermined frequency components of the image data transformed by the frequency transform unit are equal to or larger than a predetermined value, the adding unit adds specific values to the coefficients of alternating current (AC) components of the image data transformed by the frequency transform unit, when the judging unit judges that the absolute values of the products are not equal to or larger than the predetermined value and the absolute values of the coefficients are equal to or larger than the predetermined value, and the calculation unit multiplies the coefficients of alternating current (AC) components of the image data transformed by the frequency transform unit by a positive real number smaller than 1, or divides the coefficients of alternating current (AC) components of the image data by a real number larger than 1, when the judging unit judges that the absolute values of the products are not equal to or larger than the predetermined value and the absolute values of the coefficients are not equal to or larger than the predetermined value.

An image forming apparatus in accordance with the present invention is characterized by comprising any one of the above-mentioned image forming apparatuses and to form images on the basis of image data image-processed by the image forming apparatus.

Furthermore, a computer program product and a computer memory product in accordance with the present invention are characterized to make a general-purpose computer carry out the above-mentioned image processing method in accordance with the present invention.

In the present invention described above, a judgment as to whether an image includes edge portions in the image area to be processed can be made by judging whether the absolute values of the coefficients of predetermined frequency components among the coefficients of spatial frequency components possessed by image data are equal to or more than the predetermined value. The image is then emphasized or smoothened depending on the characteristics of the image to be processed by modifying the coefficients of the AC components depending on the result of the judgment of the magnitudes of the absolute values, whereby the gray levels of the image after the processing are decreased on the basis of the predetermined value. Hence, the number of gray levels of the image can be decreased while the characteristic portions of the image are maintained properly. The method of making comparison with the predetermined value and decreasing the number of gray levels is not limited to the threshold method, but includes the dither method, the error diffusion method or the like.

Furthermore, in the present invention, by adding specific values, for example, the specific values of blue noise having frequency characteristics difficult to be sensed by human eyes, to the coefficients of AC components, the gray levels of the respective pixels in highlight areas having large gray levels are diffused, whereby the pixels are prevented from being connected to one another. Moreover, the texture in mid density domains can also be improved. It is not necessary to add the specific values to all the coefficients of the AC components. The specific values may be added to the coefficients of part of the AC components. Besides, it is not necessary to add the same specific value to all the coefficients of the AC components. Hence, with the present invention, proper image processing is carried out depending on the characteristics of an image, and the pixels in highlight areas having large gray levels are prevented from being connected to one another. Hence, the number of gray levels of the image can be decreased while the characteristic portions of the original image are maintained properly.

Moreover, in the above-described invention, a judgment is made as to whether or not the absolute values of the products obtained by multiplying the coefficients of predetermined frequency components in the coefficients of spatial frequency components of image data by the coefficient of the DC component are equal to or larger than a predetermined value, and according to the judgment results, a judgment is made as to whether or not the image subjected to processing is an image including an edge portion.

The larger the gray level difference of the edge portion of the image, the larger the coefficients of the predetermined frequency components and the larger the absolute values of the above-mentioned products.

Further, the coefficient of the DC component corresponds to the mean gray level of the image, and the greater the mean gray level of the image, the larger the coefficient of the DC component. Thus, the larger the mean gray level of the image, that is, the brighter the image, the larger the above-mentioned products, and consequently the image subjected to processing is more likely judged to be an image including an edge portion.

On the other hand, since humans can more easily recognize an edge portion in a bright image than in a dark image, even when the image has predetermined frequency components of the same coefficients, the larger the mean gray level of the image, the more strongly the edge portion is recognized. Thus, since the strength of an edge portion recognized by humans corresponds to the magnitude of the above-mentioned absolute values, it is possible to judge whether or not an edge portion is present according to the recognition characteristics of humans by judging the presence or absence of edge portions based on the above-mentioned products.

For example, when light gray characters are included in a white image with the DC component of a large coefficient, since the gray level difference of the edge portion is small, the absolute values of the AC components are small, but the absolute values of the above-mentioned products becomes larger due to the large coefficient of the DC component, and the image is judged to be an image including an edge portion.

Then, by modifying the coefficients of the AC components according to the judgment results of the magnitude of the above-mentioned absolute values, the image enhancement or smoothing is performed according to the features of the image subjected to processing, that is, the presence or absence of an edge portion, and the gray levels of the image after the image processing are decreased based on a predetermined value. It is thus possible to decrease the gray levels of the image while more satisfactorily maintaining the features of the image.

With the invention as described above, it is possible to perform appropriate image processing according to the features of an image, prevent connection of pixels to each other in a highlight area where the absolute values are large, and decrease the gray levels of the image while satisfactorily maintaining the features of the original image. In particular, since a judgment as to whether or not an edge portion is present is made according to the mean gray level of the image, it is possible to perform image processing according to the brightness of the image and the gray level difference of the edge portion.

With the present invention, a judgment is made as to whether or not the image subjected to processing is an image including an edge portion by judging whether or not the absolute values of the products obtained by multiplying the coefficients of the AC components on the low frequency side in a predetermined frequency domain by the coefficient of the DC component are equal to or larger than a predetermined value. The coefficients of the AC components on the low frequency side relate more strongly to the strength of edge portions compared with the coefficients of the AC components on the high frequency side. Therefore, when an edge portion is found using the coefficients of the AC components on the low frequency side, it is possible to more accurately judge whether or not the image subjected to processing is an image including an edge portion.

According to the invention as described above, since a judgment as to whether or not the image subjected to processing is an image including an edge portion can be made more accurately compared with a judgment using the coefficients of the AC components on the high frequency side, it is possible to decrease the gray levels of the image while more satisfactorily maintaining the features of the original image.

Furthermore, in the present invention, in the case where it is judged that the absolute values of the coefficients of predetermined frequency components are equal to or more than the predetermined value, the coefficients of the AC components are multiplied by a real number larger than 1, or the coefficients of the AC components are divided by a positive real number smaller than 1. Hence, the coefficients of the AC components are increased, and the edge portions of an image are emphasized. In other words, it is possible to carry out processing wherein an image including edge portions is selected from among images to be processed and the edge portions of the image are emphasized. Since the characteristic portions of the image are emphasized relatively, the number of gray levels of the image can be decreased while the characteristic portions of the original image are maintained properly.

Moreover, in the present invention, in the case where it is judged that the absolute values of the coefficients of predetermined frequency components are equal to or more than the predetermined value, that is, in the case where it is judged that an image includes edge portions, the coefficients of the AC components having only the spatial frequency components in the horizontal direction and the coefficients of the AC components having only the spatial frequency components in the vertical direction are multiplied by a real number larger than 1, whereby the values of the coefficients are modified. In this case, since the coefficients of the AC components become larger than the coefficients before the modification, the edge portions of the image are emphasized. The present invention also includes a case wherein the values of the coefficients are modified by dividing the coefficients of the AC components by a real number smaller than 1.

Hence, with the present invention, the image including edge portions is emphasized, and the characteristic portions of the image are emphasized relatively, whereby the number of gray levels of the image can be decreased while the characteristic portions of the original image are maintained properly.

Furthermore, in the present invention, the modification is not necessarily carried out for the DCT coefficients of all the AC components, but the modification is carries out for the coefficients of the AC components having only the spatial frequency components in the horizontal direction and the coefficients of the AC components having only the spatial frequency components in the vertical direction. Hence, even after the number of gray levels is decreased, unnecessary block patterns are suppressed from being generated in the curve portions of an image in a density domain, that is, the edge portions of curves, and an image having sharper curve portions is obtained. A similar effect is also obtained in the case where the coefficients are divided by a positive real number smaller than 1.

Hence, with the present invention, block patterns are effectively prevented from being generated in the curve portions of an image in comparison with the case wherein the coefficients of all the AC components are modified. Hence, the number of gray levels of the image can be decreased while the characteristic portions of the original image are maintained more properly.

Moreover, in the present invention, the coefficients of the AC components are multiplied by a larger (or smaller) real number as the frequency of the AC component is higher (or lower). In comparison with the case wherein the coefficients of the AC components having low frequencies are modified, in the case wherein the coefficients of the AC components having high frequencies are modified, the edge portions can be emphasized effectively while the characteristic portions of the image are maintained. Hence, an image having sharper edges is obtained even after threshold processing.

Hence, with the present invention, the edge portions can be emphasized effectively without losing the characteristic portions of the image, and the number of gray levels of the image can be decreased while the characteristic portions of the original image are maintained properly.

In the case where it is judged that the absolute values of the coefficients of predetermined frequency components are less than the predetermined value, the coefficients of the AC components are multiplied by a positive real number smaller than 1, or the coefficients of the AC components are divided by a real number larger than 1. Hence, the coefficients of the AC components are made smaller, and an image not including edge portions is smoothened. In other words, it is possible to select a flat image from among images to be processed and to smoothen the image. Since the characteristic portions of the image are emphasized relatively, the number of gray levels of the image can be decreased while the characteristic portions of the original image are maintained properly.

Hence, with the present invention, a flat image not including edge portions is smoothened, and the characteristic portions of the image are emphasized relatively, whereby the number of gray levels of the image can be decreased while the characteristic portions of the original image are maintained properly.

In a method for decreasing the number of gray levels of an image including halftones, since the number of gray levels of the image is decreased from 256 to 4, for example, the characteristic portions of the image are usually lost. For this reason, in the case where a digital copying machine carries out spatial filter processing in the preceding step and then carries out processing for decreasing the number of gray levels of the image after the filter processing, or in the case where a computer carries out filter processing using image editing software and then carries out processing for decreasing the number of gray levels of the image after the filter processing, there is a danger of lessening the effect of the filter processing depending on the decrease in the number of gray levels. However, with the present invention, an image including edge portions is emphasized or a flat image not including edge portions is smoothened, whereby the characteristic portions of the image are emphasized relatively. It is thus possible to suppress the decrease in the effect of the filter processing. Hence, the number of gray levels of the image can be decreased while the characteristic portions of the original image are maintained properly.

In the invention as described above, by further judging whether or not the absolute values of the coefficients of predetermined frequency components are equal to or larger than a predetermined value for an image whose absolute values of the products obtained by multiplication is smaller than a predetermined value, a judgment is made as to whether the image subjected to processing is a flat image, that is, an image with a small gray level difference in the entire image. Further, by increasing the coefficients of the AC components for an image including an edge portion, the image is enhanced, whereas by decreasing the coefficients of the AC components for a flat image, the image is smoothed. For an image that includes no edge portion and is not flat, both of image enhancement and smoothing are not performed, and the processing from the above-mentioned addition of a specific value is executed. For such an image, the image enhancement and smoothing are not performed because it is difficult to decide which of the enhancement and smoothing processes is appropriate for enhancing the features of the image.

Thus, by enhancing the features of the image by enhancing the edge portion and further smoothing the flat image, it is possible to decrease the gray levels of the image while satisfactorily maintaining the features of the image.

In the image processing method and the image forming apparatus of the present invention, by enhancing the edge portion in an image having the edge portion and smoothing the image of a particularly flat image in an image including no edge portion, it is possible to decrease the gray levels of the image while satisfactorily maintaining the features of the original image.

The above and further objects and features of the invention will more fully be apparent from the following detailed description with accompanying drawings.

BRIEF DESCRIPTION OF THE SEVERAL VIEWS OF THE DRAWINGS

FIG. 1 is a schematic view showing an example of a dither matrix of 4×4 that is used in the case where an image having 256 gray levels is binarized in the conventional dither method;

FIG. 6 is a schematic view showing an example of a blue noise mask;

FIG. 14 is a schematic view conceptually showing the two-dimensional matrix being used at the time when the second modification unit of the image processing apparatus in accordance with Embodiment 4 of the present invention carries out modification processing;

DETAILED DESCRIPTION OF THE PREFERRED EMBODIMENTS

An image processing method and an image processing apparatus in accordance with the present invention will be described below on the basis of the drawings showing preferred embodiments thereof.

Embodiment 1

Figure 2:
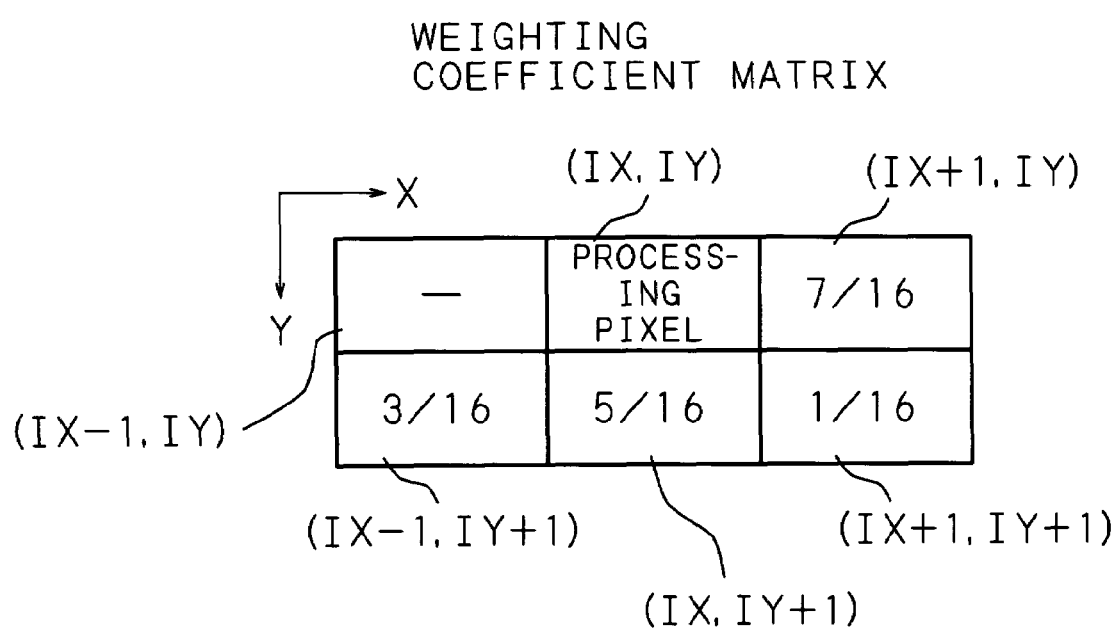
FIG. 2 is a schematic view showing an example of a weighting coefficient matrix being used in the conventional error diffusion method.
Figure 3:
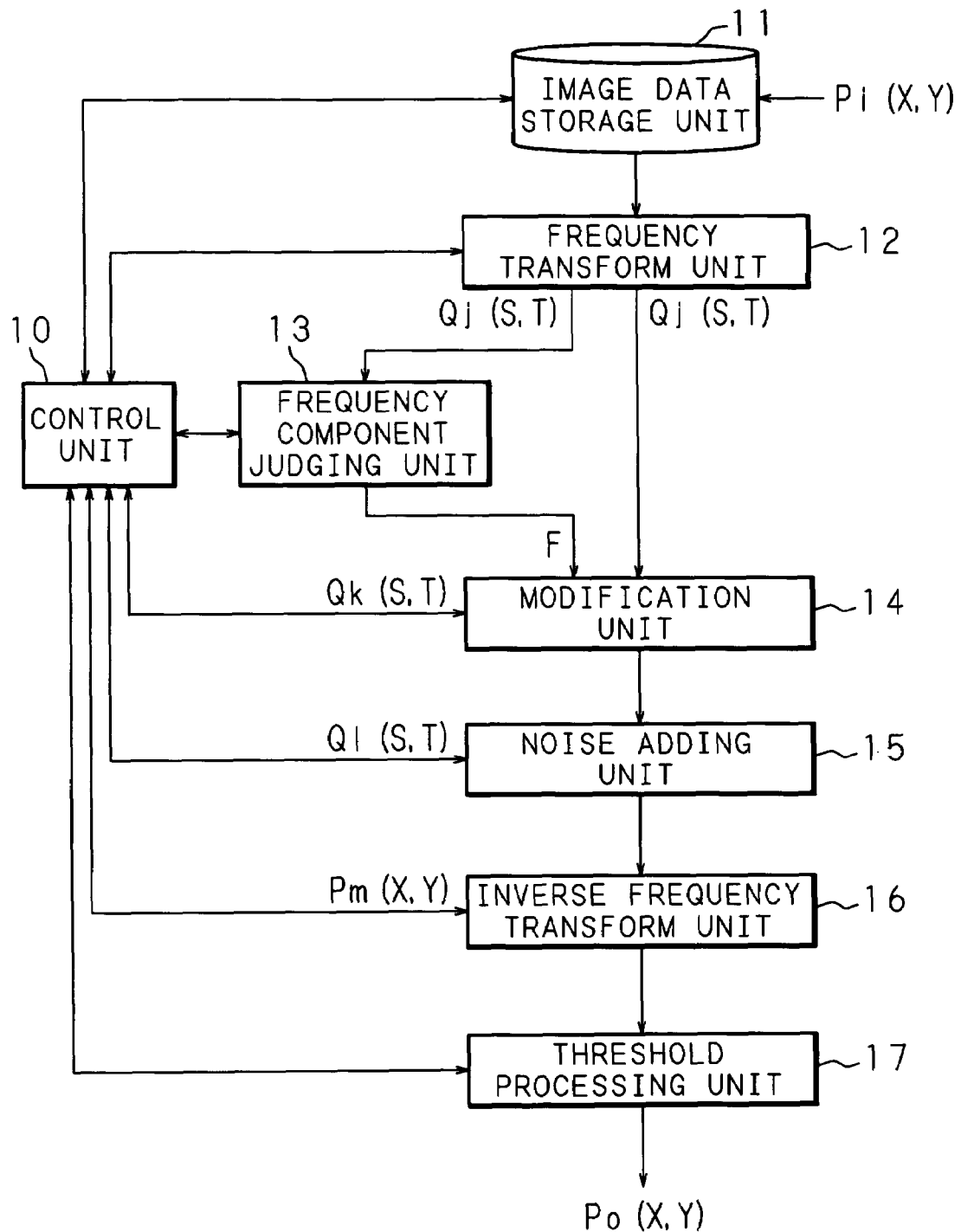
FIG. 3 is a block diagram showing a configuration example of an image processing apparatus in accordance with Embodiment 1 of the present invention.

FIG. 3 is a block diagram showing a configuration example of an image processing apparatus in accordance with Embodiment 1 of the present invention. The image processing apparatus is an apparatus that generates and outputs image data Po(X, Y) obtained by decreasing the number of gray levels of image data Pi(X, Y) inputted to the image processing apparatus. For example, the image processing apparatus generates and outputs image data Po(X, Y) obtained by quantizing data to decrease the number of gray levels of the Pi(X, Y), 256, to, for example, 4. The image data Pi(X,Y) herein represents the gray levels of an image formed of pixels disposed in a two-dimensional matrix form in the X-direction and the Y-direction being perpendicular to each other, that is, on the horizontal line and the vertical line. X designates the location of an image on the horizontal line, and Y designates the location of the image on the vertical line.

The image processing apparatus is provided with an image data storage unit 11 for temporarily storing inputted image data Pi(X, Y). By a frequency transform unit 12, the image data Pi(X, Y) stored in the image data storage unit 11 is subjected to discrete cosine transform (DCT) to obtain image data having spatial frequency components, that is, DCT coefficients Qj(S, T), and the data is outputted to a frequency component judging unit 13 and a modification unit 14. The frequency component judging unit 13 judges the magnitudes of the coefficients of predetermined spatial frequency components and outputs the results of the judgment to the modification unit 14. On the basis of the results of the judgment of the frequency component judging unit 13, the modification unit 14 partly modifies the values of the DCT coefficients Qj(S, T) obtained by the discrete cosine transform in the frequency transform unit 12. DCT coefficients Qk(S, T) obtained after the modification are outputted to a noise adding unit 15. The noise adding unit 15 outputs DCT coefficients Ql(S,T), obtained by adding the DCT coefficients of an image having blue noise characteristics to the DCT coefficients Qk(S,T), to an inverse frequency transform unit 16. The DCT coefficients of the image having the blue noise characteristics is an examples of specific values. The inverse frequency transform unit 16 generates image data Pm(X,Y) by subjecting the DCT coefficients Ql(S, T), to which noise is added, to inverse frequency transformation, and the image data is outputted to a threshold processing unit 17. The threshold processing unit 17 compares the gray levels of the image data Pm(X, Y) with predetermined values, and quantizes data to transform the gray levels of the image data Pm(X,Y) to, for example, four values, for example, 0, 85, 171 and 255 depending on the result of the comparison. The threshold processing unit 17 then outputs the image data Po(X, Y) obtained after the modification to the outside.

The image data storage unit 11, the frequency transform unit 12, the frequency component judging unit 13, the modification unit 14, the noise adding unit 15, the inverse frequency transform unit 16 and the threshold processing unit 17 are controlled by the control unit 10 of a microcomputer.

The function of each component described above will be described below more specifically. The image data Pi(X, Y) inputted to the image processing apparatus is stored sequentially in the image data storage unit 11. The image data Pi(X, Y) stored in the image data storage unit 11 is outputted sequentially to the frequency transform unit 12 by the control of the control unit 10, wherein a group of pixels in a matrix form of 8×8 in the X×Y directions is used as a unit block.

The frequency transform unit 12 transforms the image data Pi(X, Y) outputted from the image data storage unit 11, one unit block at a time, to image data Qj(S, T) having spatial frequency components. More specifically, the frequency transform unit 12 receives the image data Pi(X, Y) wherein 8×8 pixels are used as one unit block, and subjects the data to discrete cosine transform. The frequency transform unit 12 then outputs DCT coefficients Qj(S, T) obtained after the discrete cosine transform to the frequency component judging unit 13 and the modification unit 14. The discrete cosine transform is represented by Expression (1) described below. Herein, S designates a frequency in the X-direction, and T designates a frequency in the Y-direction. Furthermore, M designates the number of pixels in the X-direction in the unit block, and N designates the number of pixels in the Y-direction in the unit block. In Embodiment 1, M=N=8.

$$Qj(S, T) = \alpha_S \alpha_T \sum_{X=0}^{M-1} \sum_{Y=0}^{N-1} Pi(X, Y) \quad (1)$$

$$\cos\frac{\pi(2X+1)S}{2M} \cos\frac{\pi(2Y+1)T}{2N}$$

$$0 \le S \le M - 1$$

$$0 \le T \le N - 1$$

$$\alpha_S = \begin{cases} 1/\sqrt{M}, & S = 0 \\ \sqrt{2/M}, & 1 \le S \le M-1 \end{cases}$$

$$\alpha_T = \begin{cases} 1/\sqrt{N}, & T = 0 \\ \sqrt{2/N}, & 1 \le T \le N-1 \end{cases}$$

The frequency transform unit 12 subjects a two-dimensional image, an object to be image-processed, to discrete cosine transform, beginning with the block including the most upper left pixel, for each unit block, in the X-direction, and ending with the unit block including the most lower right pixel, while the lines are shifted sequentially in the Y-direction.

Figure 4:
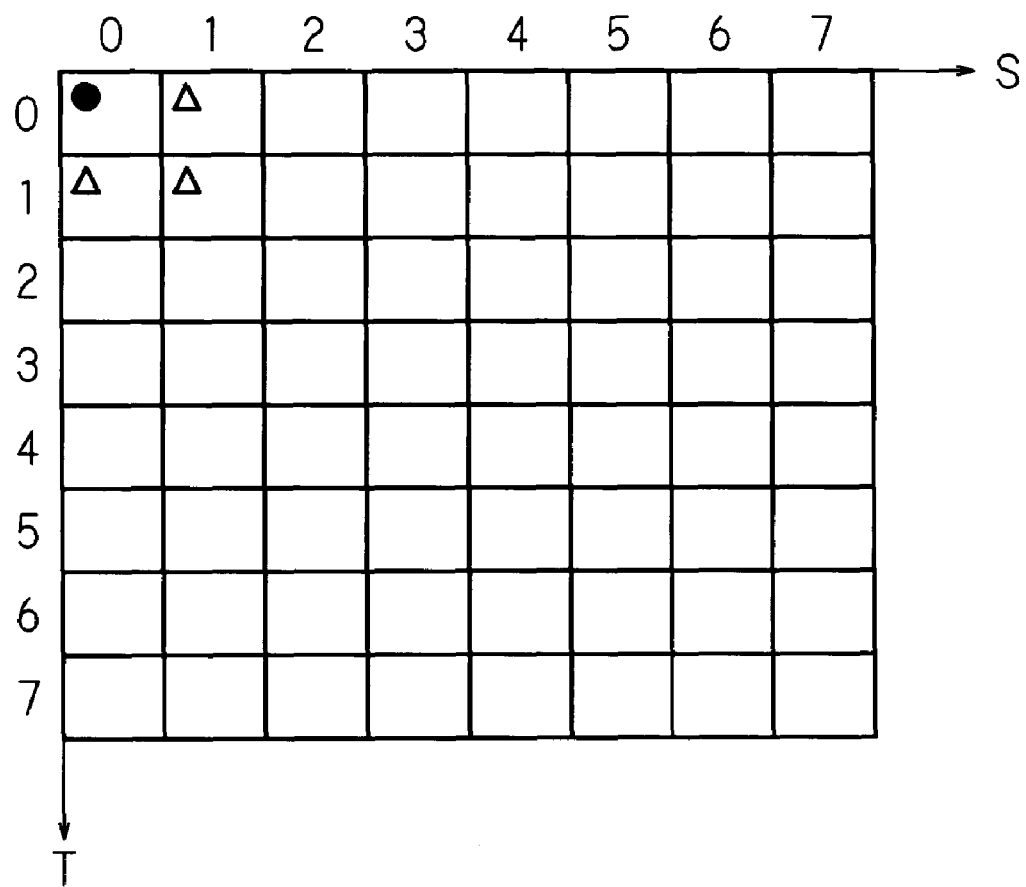
FIG. 4 is a schematic view showing, using 8×8 sections, DCT coefficients transformed to spatial frequency components by the frequency transform unit of the image-processing apparatus in accordance with Embodiment 1 of the present invention.

FIG. 4 is a schematic view showing, using 8×8 sections, DCT coefficients transformed to spatial frequency components by the frequency transform unit 12. The section located at the upper left end and marked by a black circle represents the DC component of the DCT coefficients, and the other sections represent the alternating current (AC) components. The S-axis represents the magnitude of the frequency in the X-axis direction in a spatial image, and the T-axis represents the magnitude of the frequency in the Y-axis direction in the spatial image. The frequency component judging unit 13 calculates the absolute values of the DCT coefficients of predetermined frequency components in the spatial frequency components, and outputs judgment data F depending on whether the values obtained by the calculation are equal to or more than a predetermined value. This judgment data F is used as data depending on which the modification unit 14 judges the magnitudes of the absolute values of the DCT coefficients of the predetermined frequency components.

More specifically, the frequency component judging unit 13 calculates the absolute values q10, q01 and q11 of the DCT coefficients Qj(1, 0), Qj(0, 1) and Qj(1, 1), respectively, of the spatial frequency components corresponding to the sections marked by triangles shown in FIG. 4. The DCT coefficients Qj(1, 0), Qj(0, 1) and Qj(1, 1) are one example of the predetermined frequency components. Then, the frequency component judging unit 13 judges whether at least one of the absolute values q10, q01 and q11 is equal to or more than a predetermined positive value α, for example, 64. In the case where the frequency component judging unit 13 judges that one of the absolute values q10, q01 and q11 is equal to or more than the predetermined value α, the frequency component judging unit 13 sets the judgment data F at "1" and outputs the data to the modification unit 14. Furthermore, in the case where the frequency component judging unit 13 judges that all the absolute values q10, q01 and q11 are less than the predetermined value α, the frequency component judging unit 13 sets the judgment data F at "0" and outputs the data to the modification unit 14.

It is possible to judge whether a unit block to be processed includes edge portions in the density domain by comparing the absolute values q10, q01 and q11 with the predetermined value α. In addition, the predetermined value α is a design item that can be set as desired. In the case where the predetermined value α is smaller than 64, it is easier to judge that the absolute values q10, q01 and q11 are equal to or more than the predetermined value α than in the case where the predetermined value α is larger than 64. Hence, it becomes easier to judge that edge portions are included in the unit block to be image-processed.

The modification unit 14 modifies the DCT coefficients Qj(S, T) by calculation depending on the value of the judgment data F outputted from the frequency component judging unit 13. The modification of the DCT coefficients Qj(S, T) is carried out for each one block unit.

Figure 5:
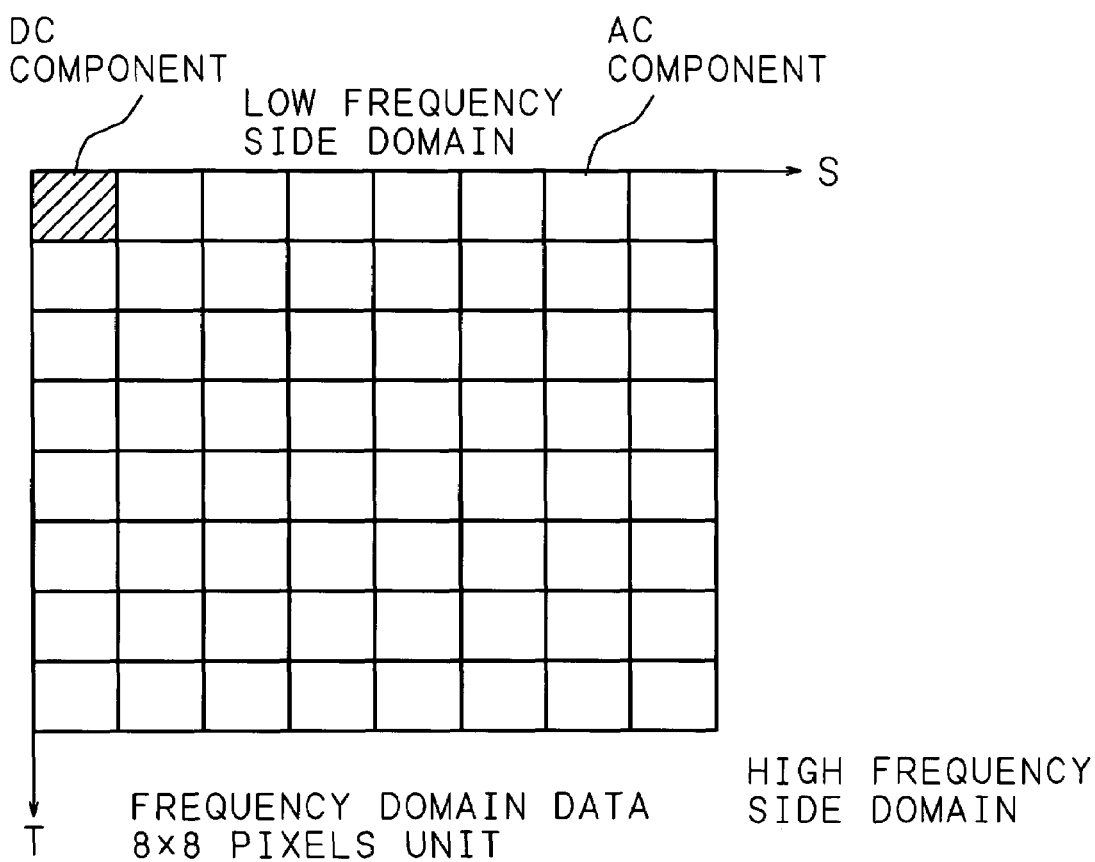
FIG. 5 is a schematic view conceptually showing frequency components, the DCT coefficients of which are modified by the modification unit of the image-processing apparatus in accordance with Embodiment 1 of the present invention.

FIG. 5 is a schematic view conceptually showing frequency components, the DCT coefficients of which are modified by the modification unit 14. In the case where the judgment data F being set at "1" is outputted from the frequency component judging unit 13, the modification unit 14 multiplies the DCT coefficients Qj(S, T) of all the AC components by a real number larger than 1, for example, "1.3". The modification unit 14 then outputs the DCT coefficients Qk(S, T) obtained as the result of this multiplication to the noise adding unit 15. In FIG. 5, the DCT coefficients Qj(S, T) of the AC components, excluding the DC component shown by the hatched block, are modified. In the case where the judgment data F being set at "0" is outputted, the modification unit 14 does not modify the values of the DCT coefficients Qj(S, T), but outputs the DCT coefficients Qk(S, T)=Qj(S, T) to the noise adding unit 15 as it is. The DCT coefficients Qk(S, T) to be processed by the modification unit 14 are represented by Expression (2) described below.

$$Qk(S, T) = Qj(S, T) \text{ (wherein } S = T = 0\text{)} \quad (2)$$
$$= Qj(S, T) \times 1.3 \text{ (wherein } S \neq 0 \text{ or } T \neq 0\text{)}$$

Next, the noise adding unit 15 adds the DCT coefficients including noise having blue noise characteristics to the DCT coefficients Qk(S, T) processed by the modification unit 14, and outputs the result of the addition, DCT coefficients Ql(S, T), to the inverse frequency transform unit 16.

Figure 7:
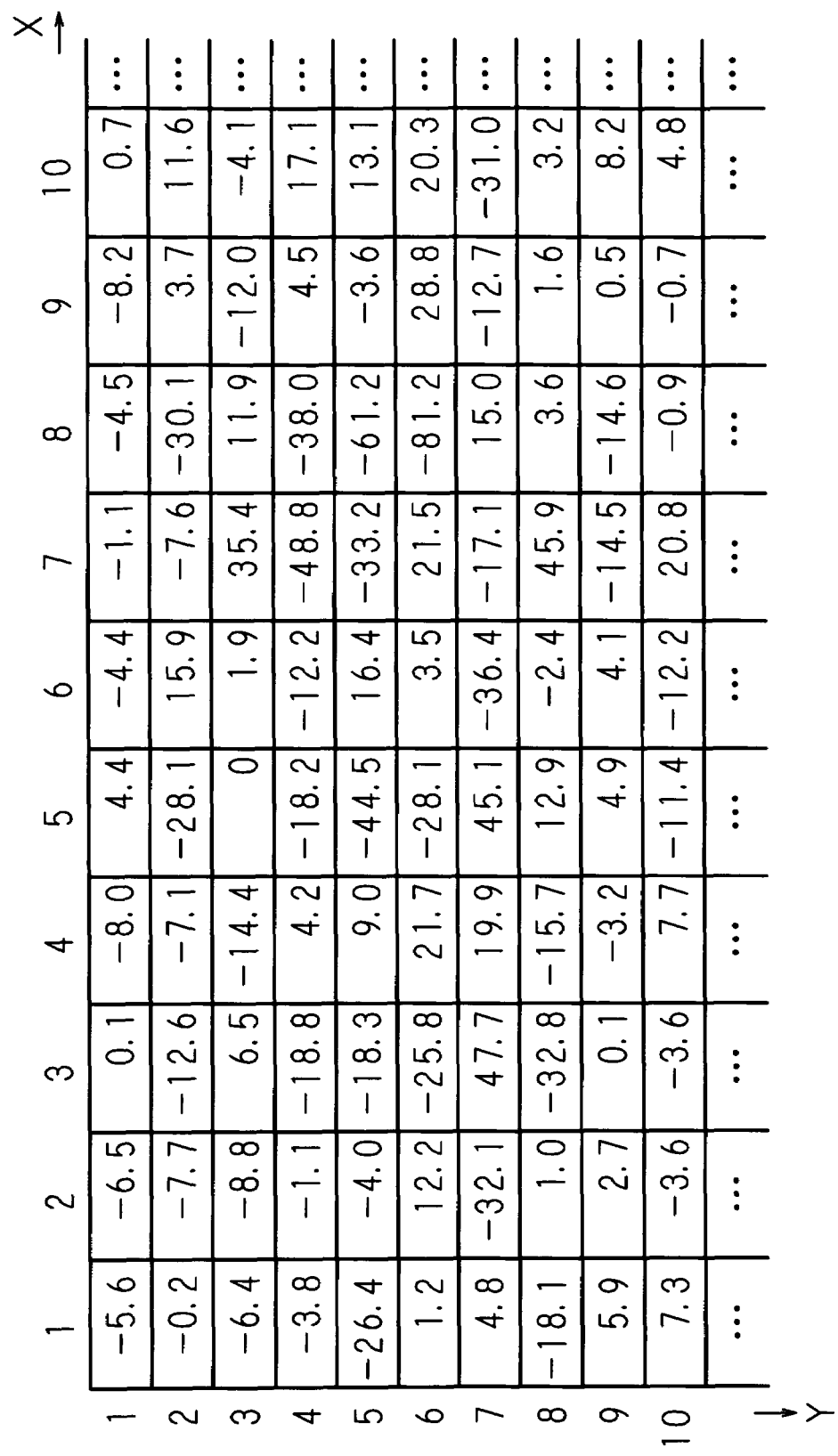
FIG. 7 is a schematic view showing examples of the DCT coefficients obtained by subjecting the blue noise mask to discrete cosine transform.

FIG. 6 is a schematic view showing an example of a blue noise mask. Blue noise is given as matrix data referred to as a blue noise mask of 256×256. The noise adding unit 15 subjects the blue noise mask shown in FIG. 6 to discrete cosine transform, and holds normalized DCT coefficient values. FIG. 7 is a schematic view showing examples of the DCT coefficients obtained by subjecting the blue noise mask to the discrete cosine transform. In Embodiment 1, the noise adding unit 15 subjects the blue noise mask to the discrete cosine transform for each unit block of 8×8 pixels, and holds the DCT coefficients in 32×32 blocks. Then, the noise adding unit 15 adds any one of the DCT coefficients in the 32×32 blocks to the DCT coefficients Qk(S, T) of the unit blocks to be inputted. In a similar way, any one of the DCT coefficients in the 32×32 blocks is also added sequentially to other unit blocks to be inputted sequentially.

Blue noise is pattern data having spatial frequency components difficult to be sensed by human eyes. It is known that human eyes cannot sense pattern images having spatial frequencies equal to or more than a certain value and that the MTF (modulation transfer function) of the visual system is a kind of low-pass filter ("High Quality Image Processing for Ink-jet Printers" by MAKITA tsuyoshi), Journal of the Image Society of Japan, 2001, Vol. 40, No. 3, p. 239 to 243). Blue noise is obtained by operating a pseudo-random pattern and by generating a pattern wherein the main components of the spatial frequency components are distributed in a frequency band having frequencies equal to or more than the cutoff frequency of the MTF of the visual system.

By adding the DCT coefficients of the blue noise to the DCT coefficients Qk(S, T), pixels are prevented from being connected to one another in highlight areas having large gray levels, and texture in mid density portions can be improved.

The inverse frequency transform unit 16 subjects the DCT coefficients Ql(S, T) outputted from the noise adding unit 15 to inverse frequency transformation to obtain image data Pm(X, Y) having spatial frequency components. After the inverse frequency transformation, the image data Pm(X,Y) is outputted to the threshold processing unit 17. More specifically, inverse discrete cosine transform is carried out according to Expression (1).

The threshold processing unit 17 quantizes the image data Pm(X, Y) for transforming in the density domain outputted from the inverse frequency transform unit 16 to image data Po(X, Y) having multiple values using multiple predetermined values. For example, the image data Pm(X,Y) is quantized and transformed to the image data Po(X,Y) having, for example, four values of gray level according to Expression (3) described below wherein three predetermined values, 42, 127 and 212, are used.

$$Po(X, Y)=0 \text{ (if } 0<Pm(X, Y)\leq 42\text{)}$$

$$Po(X, Y)=85 \text{ (if } 42<Pm(X, Y)\leq 127\text{)}$$

$$Po(X, Y)=171 \text{ (if } 127<Pm(X, Y)\leq 212\text{)}$$

$$Po(X, Y)=255 \text{ (if } 212<Pm(X, Y)-255\text{)} \quad (3)$$

Figure 8:
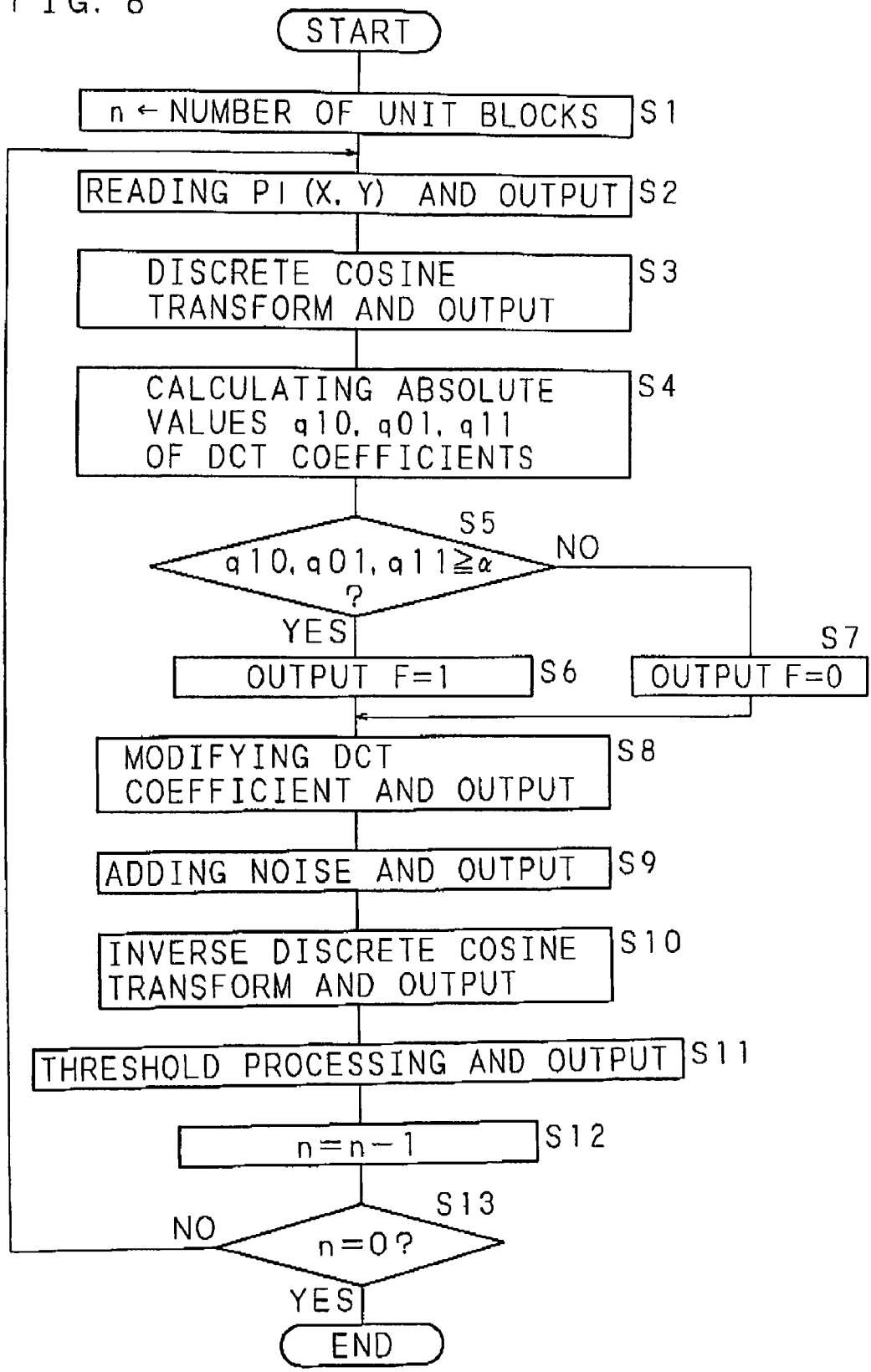
FIG. 8 is a flowchart showing the image processing procedure carried out by the control unit of the image-processing apparatus in accordance with Embodiment 1 of the present invention.

Next, the processing procedure of the control unit 10 will be described using a flowchart. FIG. 8 is a flowchart showing the image processing procedure carried out by the control unit 10. First, the control unit 10 sets the number of unit blocks at a variable n in the case where the image data Pi(X,Y) inputted from the outside and stored in the image data storage unit 11 is divided into unit blocks, one unit block having 8×8 pixels (step S1). For example, in the case of image data having 256×256 pixels, 32×32 is set at the variable n. Then, the control unit 10 reads the image data Pi(X,Y), one block unit at a time, each one unit block having 8×8 pixels, and outputs the image data Pi(X, Y) having been read to the frequency transform unit 12 (step S2).

Next, the control unit 10 subjects Pi(X, Y) to discrete cosine transform in the frequency transform unit 12, and outputs the DCT coefficients Qj(S, T) obtained after the discrete cosine transform to the frequency component judging unit 13 and the modification unit 14 (step S3). Then, in the frequency component judging unit 13, the control unit 10 calculates the absolute values q10, q01 and q11 of the DCT coefficients of the predetermined frequency components (step S4), and judges whether any one of the absolute values q10, q01 and q11 obtained by the calculation is equal to or more than the predetermined value α (step S5). In the case where any one of the absolute values q10, q01 and q11 is equal to or more than the predetermined value α (YES at step S5), the control unit 10 sets the judgment data F at "1" in the frequency component judging unit 13, and outputs the judgment data F (=1) to the modification unit 14 (step S6). In the case where all the absolute values q10, q01 and q11 are less than the predetermined value a (NO at step S5), the control unit 10 sets the judgment data F at "0" in the frequency component judging unit 13 and outputs the judgment data F (=0) to the modification unit 14 (step S7).

Next, the control unit 10 modifies the values of the DCT coefficients Qj(S, T) to the values of the DCT coefficients Qk(S, T) according to Expression (2) in the modification unit 14, and outputs the DCT coefficients Qk(S, T) to the noise adding unit 15 (step S8). Then, the control unit 10 adds the DCT coefficients of blue noise to the DCT coefficients Qk(S, T) in the noise adding unit 15, and outputs DCT coefficients Ql(S, T) obtained after the addition of the noise, to the inverse frequency transform unit 16 (step S9).

Next, the control unit 10 subjects the DCT coefficients Ql(S, T) to inverse discrete cosine transform to obtain Pm(X, Y) in the inverse frequency transform unit 16, and outputs Pm(X, Y) obtained after the transformation to the threshold processing unit 17 (step S10). Then, the control unit 10 transforms Pm(X, Y) to four-value image data Po(X, Y) according to Expression (3) in the threshold processing unit 17, and outputs the data to the outside (step S11). Next, the control unit 10 decrements the variable n by 1 (step S12), and judges whether the variable n obtained after the decrement is 0 (step S13). In other words, a judgment is made as to whether image processing is completed for all the unit blocks. In the case where it is judged that the variable n is 0 (YES at step S13), the control unit 10 completes this image processing. In the case where it is judged that the variable n is not 0 (NO at step S13), the control unit 10 returns the processing to step S2, and carries out image processing for the remaining unit blocks in a similar manner as described above at step S2 to step S11.

The actions and effects brought about by the above-mentioned processing will be described. First, the processing at step S4 and step S5, it is made possible to judge whether a unit block includes characteristic portions, such as edge portions. Since the DCT coefficients of low frequency components excluding the DC component have more information on the image than the DCT coefficients of high frequency components, it is possible to judge whether a unit block has image information by comparing the absolute values q10, q01 and q11, that is, the magnitudes of the DCT coefficients of predetermined frequency components, with the predetermined value α. It is generally known that the DCT coefficients of an image including edge portions, unlike the DCT coefficients of a flat image having uniform density, are larger in the DC component and low frequency components than in the high frequency components, and that image information is concentrated mainly in the low frequency components ("Fully Understandable Digital Image Processing" by TAKAIE hitoshi, CQ Publishing Co., Ltd., p. 121 to 128). Furthermore, since the DCT coefficient of the DC component is proportional to the average gray level in the density domain of the unit block, the judgment as to whether an image includes edge portions cannot be made by using the DC component.

For example, in the case where a solid image, that is, an image not including edge portions, is subjected to discrete cosine transform, the DCT coefficients of the AC components become 0, and the DCT coefficient of only the DC component becomes 0 or a value other than 0 depending on the average density of the image. On the other hand, in the case where an image including edge portions is subjected to discrete cosine transform, the DCT coefficients of the low frequency components have values other than 0 depending on the characteristics of the edge portions.

At step S6 to step S8, the DCT coefficients are modified depending on whether the image of a unit block includes edge portions, whereby image processing for emphasizing the edge portions is carried out only for the image including edge portions. The image emphasizing processing is carried out by increasing the values of the DCT coefficients of the AC components. The DCT coefficients of the AC components have information on the edge portions of the image as described above. Hence, the edge portions can be emphasized by increasing the values of the DCT coefficients of the AC components so as to be larger than the values of the DCT coefficients of the original image. On the other hand, in the case of an image not including edge portions, the image is not emphasized. Hence, only the edge portions of the entire image can be emphasized, whereby the number of gray levels of the image can be reduced while the characteristic portions of the original image are maintained properly.

In the processing at step S9, it is possible to improve the pixel dispersibility in the highlight area of the processed image or the texture in the mid density domain of the processed image by adding the DCT coefficients of the blue noise difficult to be sensed by the human being to the DCT coefficients Qk(S, T). Furthermore, since blue noise is difficult to be sensed by the human being, image deterioration owing to the addition of the noise can be suppressed to the minimum.

In the present invention described above, a judgment is made as to whether edge portions are included in each unit block. In the case where edge portions are included, the spatial frequency components are modified to emphasize the edge portions. Hence, it is possible to obtain an image being sharp at edge portions, and the number of gray levels of the image can be decreased while the characteristic portions of the original image are maintained properly. This processing is particularly effective for images including numerous texts, graphic arts or the like.

Furthermore, in the present invention, by the addition of the DCT coefficients of the blue noise, pixels are prevented from being connected to one another at highlight areas having large gray levels while image deterioration is suppressed to the minimum.

The value of the real number, "1.3", to be multiplied to the DCT coefficients in the processing at step S8 is an example. The value should only be a value capable of increasing the values of the DCT coefficients within the range of not exceeding the maximum value of the DCT coefficients.

Moreover, although the judgment as to whether edge portions are included in each unit block is made by using the absolute values q10, q01 and q11 of the low frequency components in the processing at step S5, the judgment is not limited to this. For example, the judgment can also be made similarly by using the absolute values of the DCT coefficients of the spatial frequency components having higher frequencies. For example, it is possible to make the judgment by extending the reference domain to DCT coefficients Qj(0, 2), Qj(1, 2), Qj(2, 2), Qj(2, 1) and Qj(2, 0) and by using the absolute values of these. In the case of using the absolute values of the DCT coefficients in the extended reference domain as described above, it is possible to more accurately make the judgment as to whether edge portions are included in an image. Furthermore, at the time of judging the magnitude of each DCT coefficient, a predetermined value β different from the predetermined value α may also be used for the judgment.

Embodiment 2

Figure 9:
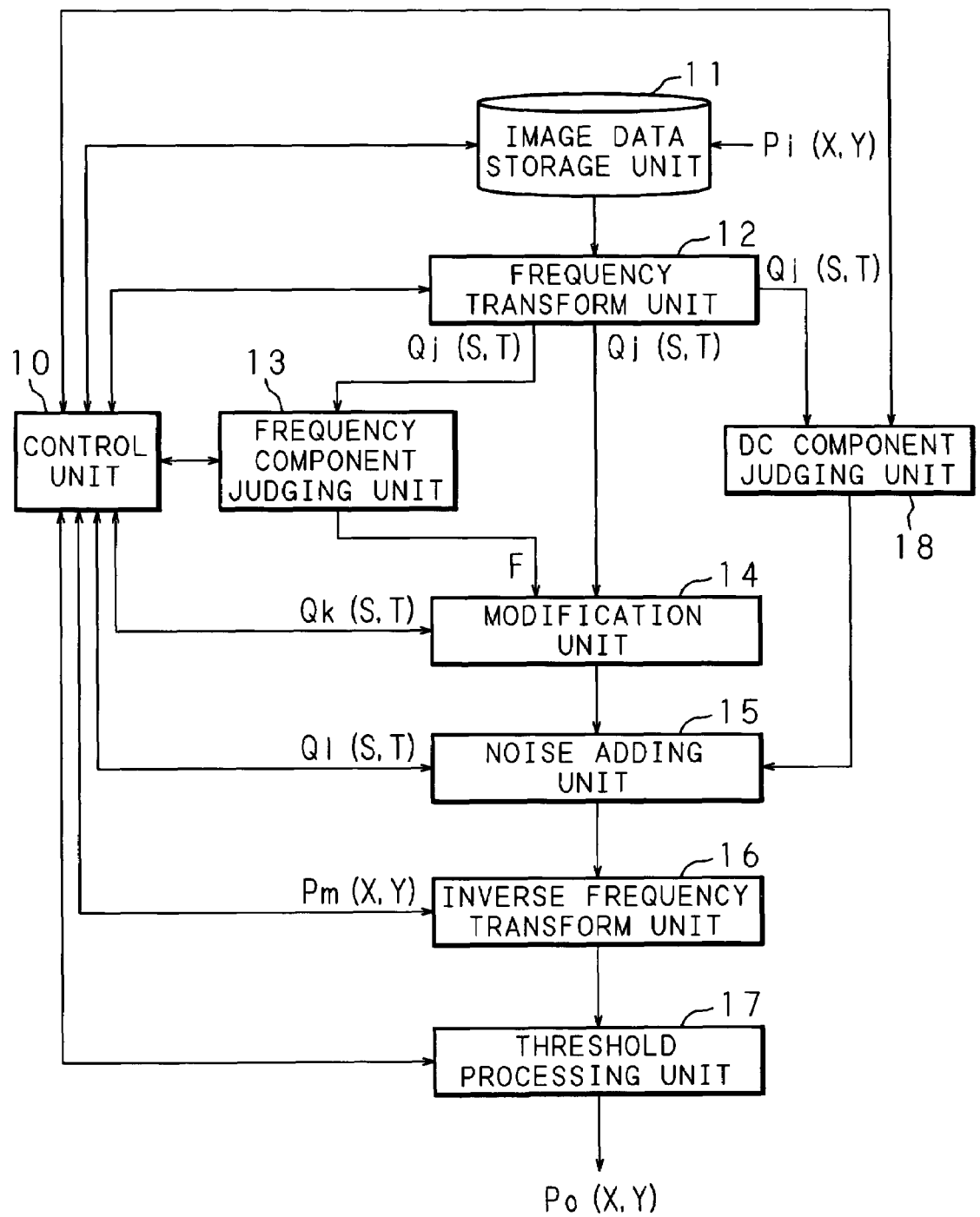
FIG. 9 is a block diagram showing a configuration example of an image processing apparatus in accordance with Embodiment 2 of the present invention.

FIG. 9 is a block diagram showing a configuration example of an image processing apparatus in accordance with Embodiment 2 of the present invention. Like the image processing apparatus in accordance with Embodiment 1 shown in FIG. 3, the image processing apparatus in accordance with Embodiment 2 comprises a control unit 10, an image data storage unit 11, a frequency transform unit 12, a frequency component judging unit 13, a modification unit 14, a noise adding unit 15, an inverse frequency transform unit 16 and a threshold processing unit 17, and further comprises a DC component judging unit 18. Since the configuration, operations and effects of the image processing apparatus in accordance with Embodiment 2 are similar to the configuration, operations and effects of the image processing apparatus in accordance with Embodiment 1, except for the DC component judging unit 18, the same components are designated by the same reference numerals, and their detailed descriptions are omitted.

The DCT coefficients Qj(S, T) outputted from the frequency transform unit 12 are inputted to the DC component judging unit 18 provided in the image processing apparatus in accordance with Embodiment 2. The DC component judging unit 18 judges whether the DCT coefficient Qj(0, 0) of the DC component in the DCT coefficients Qj(S, T) having been inputted is a value in a predetermined range larger than the lower limit N1 and smaller than the upper limit N2, and outputs the result of the judgment to the noise adding unit 15. The minimum value of the DCT coefficient Qj(0, 0) of the DC component is 0, and its maximum value is 2040 (=8×255).

For example, in the case where the DCT coefficient Qj(0, 0) of the DC component is in the predetermined range larger than the lower limit N1=0 and smaller than the upper limit N2=2040, the DC component judging unit 18 sets DC component judgment data at "0". In the case where the DCT coefficient Qj(0, 0) is equal to the lower limit N1=0 or the upper limit N2=2040, the DC component judging unit 18 sets the DC component judgment data at "1". The judgment data is outputted to the noise adding unit 15.

In the case where the DC component judgment data being set at "1" is outputted from the DC component judging unit 18, the noise adding unit 15 does not carry out noise addition. In the case where the DC component judgment data being set at "0" is outputted, the noise adding unit 15 carries out noise addition as in the case of Embodiment 1.

The magnitude of the DCT coefficient Qj(0, 0) of the DC component indicates the average gray level in the density domain of a unit block. Hence, it is possible to judge whether the unit block to be processed is wholly black or white by judging the magnitude of the DCT coefficient Qj(0, 0). In the case where the unit block to be processed is wholly black or white, the noise adding unit 15 does not carry out noise addition. Hence, a block being uniformly black or white can be obtained, and an excellent image can be obtained.

Embodiment 3

Figure 10:
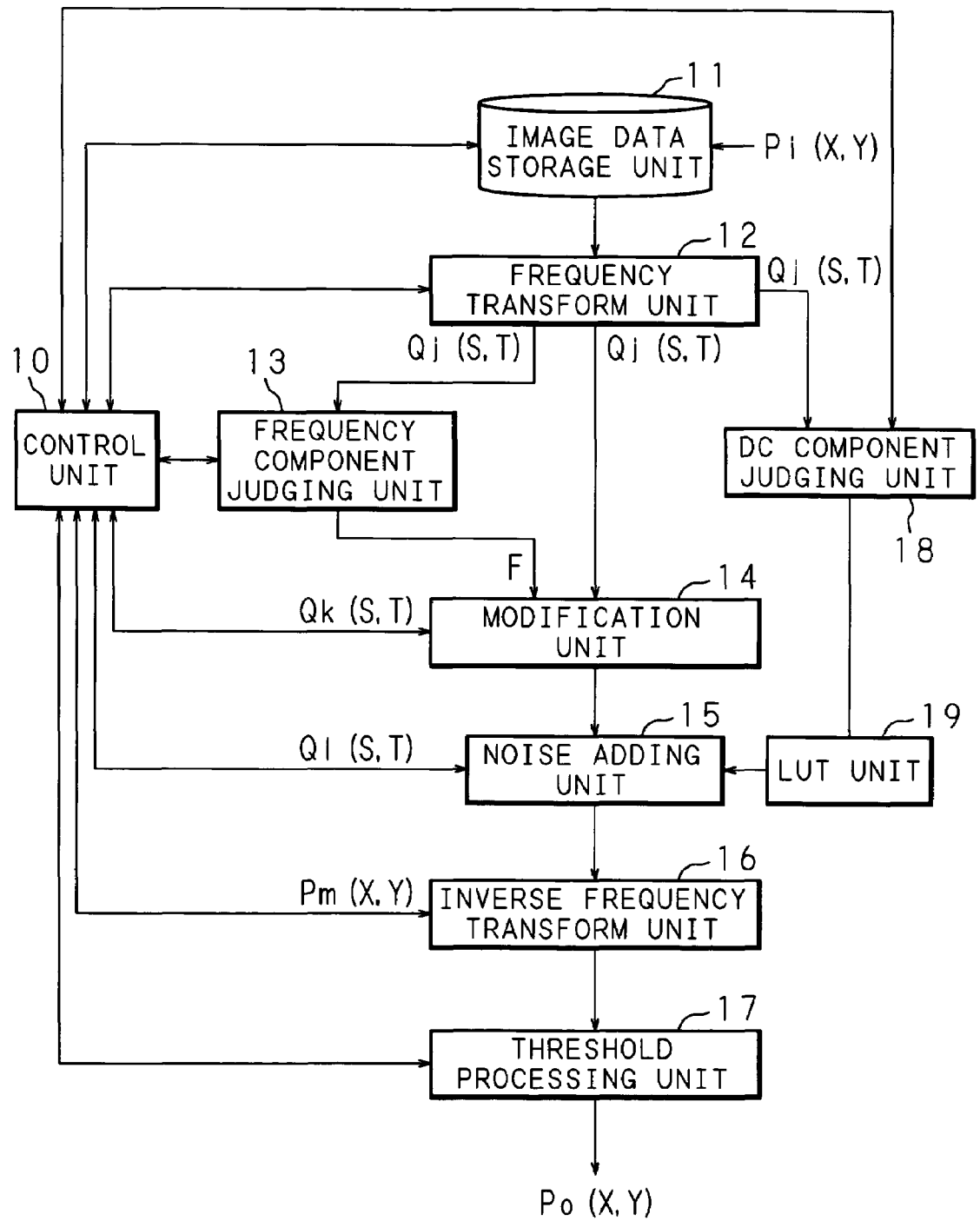
FIG. 10 is a block diagram showing a configuration example of an image processing apparatus in accordance with Embodiment 3 of the present invention.

FIG. 10 is a block diagram showing a configuration example of an image processing apparatus in accordance with Embodiment 3 of the present invention. Like the image processing apparatus in accordance with Embodiment 2 shown in FIG. 9, the image processing apparatus in accordance with Embodiment 3 comprises a control unit 10, an image data storage unit 11, a frequency transform unit 12, a frequency component judging unit 13, a modification unit 14, a noise adding unit 15, an inverse frequency transform unit 16, a threshold processing unit 17 and a DC component judging unit 18, and further comprises an LUT (lookup table) unit 19 for storing the DCT coefficients of blue noise being used for noise addition. The LUT unit 19 is connected to the noise adding unit 15. Since the configuration, operations and effects of the image processing apparatus in accordance with Embodiment 3 are similar to the configuration, operations and effects of the image processing apparatus in accordance with Embodiment 2, except for the LUT unit 19, the same components are designated by the same reference numerals, and their detailed descriptions are omitted.

The LUT unit 19 subjects image data having blue noise characteristics in a density domain to discrete cosine transform beforehand for each unit block, and stores the DCT coefficients obtained by the discrete cosine transform for each unit block. In addition, the LUT unit 19 stores unit blocks, the values of the DCT coefficients of which are all 0.

DC component judgment data outputted from the DC component judging unit 18 is inputted to the LUT unit 19. In the case where the DC component judgment data being set at "1" is inputted to the LUT unit 19, the noise adding unit 15 reads the unit blocks, the values of the DCT coefficients of which are all 0, from the LUT unit 19, and carries out noise addition. Furthermore, in the case where the DC component judgment data being set at "0" is outputted to the LUT unit 19, the noise adding unit 15 reads unit blocks having the DCT coefficients of blue noise from the LUT unit 19, and carries out noise addition.

More specifically, the blue noise mask shown in FIG. 6 is subjected to discrete cosine transform beforehand, 8×8 being used as one unit block, and the normalized DCT coefficients shown in FIG. 7 are obtained by calculation. Then, 8×8 blocks, 64 blocks in total, each unit block having 8×8 pixels, wherein blue noise is subjected to discrete cosine transform, are stored in the LUT unit 19. Furthermore, the LUT unit 19 stores blocks, the values of the DCT coefficients of which are all 0. The noise adding unit 15 sequentially reads the unit blocks of DCT coefficients of blue noise from the LUT unit 19, and adds the DCT coefficients having been read to the DCT coefficients Qk(S, T) outputted from the modification unit 14, one block unit at a time.

Figure 11:
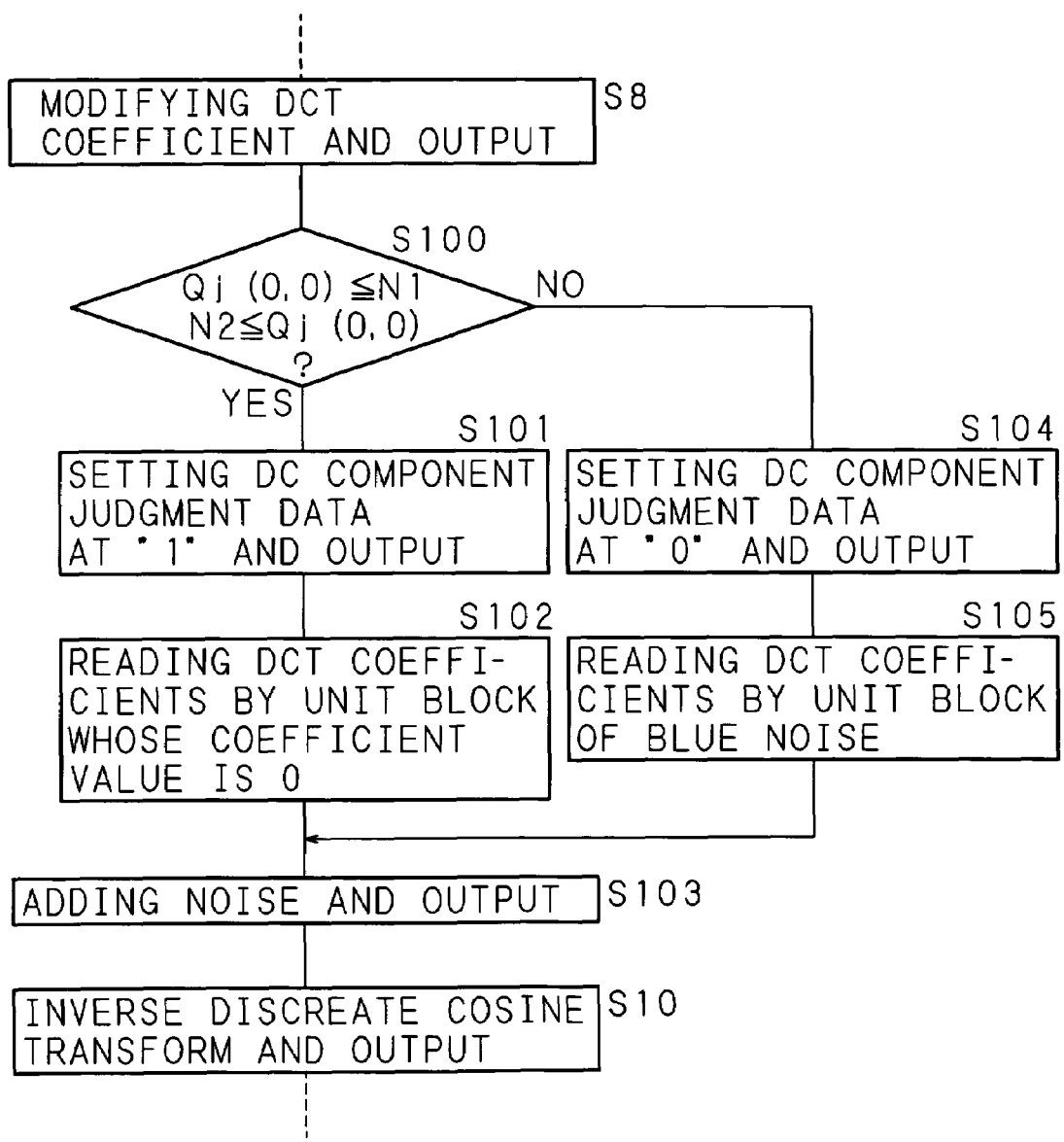
FIG. 11 is a flowchart showing the noise addition processing procedure carried out by the image processing apparatus in accordance with Embodiment 3 of the present invention.

FIG. 11 is a flowchart showing the noise addition processing procedure carried out by the image processing apparatus in accordance with Embodiment 3. In the image processing apparatus in accordance with Embodiment 3, the control unit 10 carries out the processing shown in FIG. 11, instead of the processing at step S9 shown in FIG. 8. In other words, after the processing at step S8 is completed and before the processing at step S10 is carried out, the control unit 10 carries out the processing from step S100 to step S105. After the processing at step S8 is completed, the control unit 10 judges whether the DCT coefficient Qj(0, 0) of the DC component is equal to or less than the lower limit N1 or equal to or more than the upper limit N2 in the DC component judging unit 18 (step S100). In the case where it is judged that the value of the DCT coefficient Qj(0, 0) is equal to or less than the lower limit N1 or equal to or more than the upper limit N2 (YES at step S100), the control unit 10 sets DC component judgment data at "1", and output the judgment data to the LUT unit 19 (step S101). In the case where the DC component judgment data being set at "1" is inputted to the LUT unit 19 as described above, the noise adding unit 15 reads the DCT coefficients, the values of which are all 0, from the LUT unit 19, one block unit at a time (step S102). Then, the control unit 10 adds the DCT coefficients having been read to DCT coefficient Qk(S, T), and outputs DCT coefficient Ql(S, T), obtained after the addition of the DCT coefficients, to the inverse frequency transform unit 16 (step S103). In the case where the processing at step S103 is completed, the control unit 10 carries out the processing at step S10 shown in FIG. 8.

In the case where it is judged that the DCT coefficient Qj(0, 0) is in the predetermined range larger than the lower limit N1 and smaller than the upper limit N2 (NO at step S100), the control unit 10 sets the DC component judgment data at "0" in the DC component judging unit 18, and outputs the judgment data to the LUT unit 19 (step S104). In the case where the DC component judgment data being set at "0" is inputted to the LUT unit 19 as described above, the noise adding unit 15 reads the DCT coefficients of blue noise from the LUT unit 19, one block unit at a time (step S105). Then, the control unit 10 adds the DCT coefficients having been read to Qk(S, T), and outputs Ql(S, T), obtained after the addition of the DCT coefficients, to the inverse frequency transform unit 16 (step S103). In the case where the processing at step S103 is completed, the control unit 10 carries out the processing of step S10 shown in FIG. 8.

In the image processing apparatus in accordance with Embodiment 3 described above, the LUT unit 19 stores the DCT coefficients of an image having blue noise characteristics, the DCT coefficients being obtained by calculation beforehand. Hence, the noise addition processing can be carried out at speed higher than that in an image processing apparatus not provided with the LUT unit 19. Therefore, image processing can be carried out at high speed.

Embodiment 4

Figure 12:
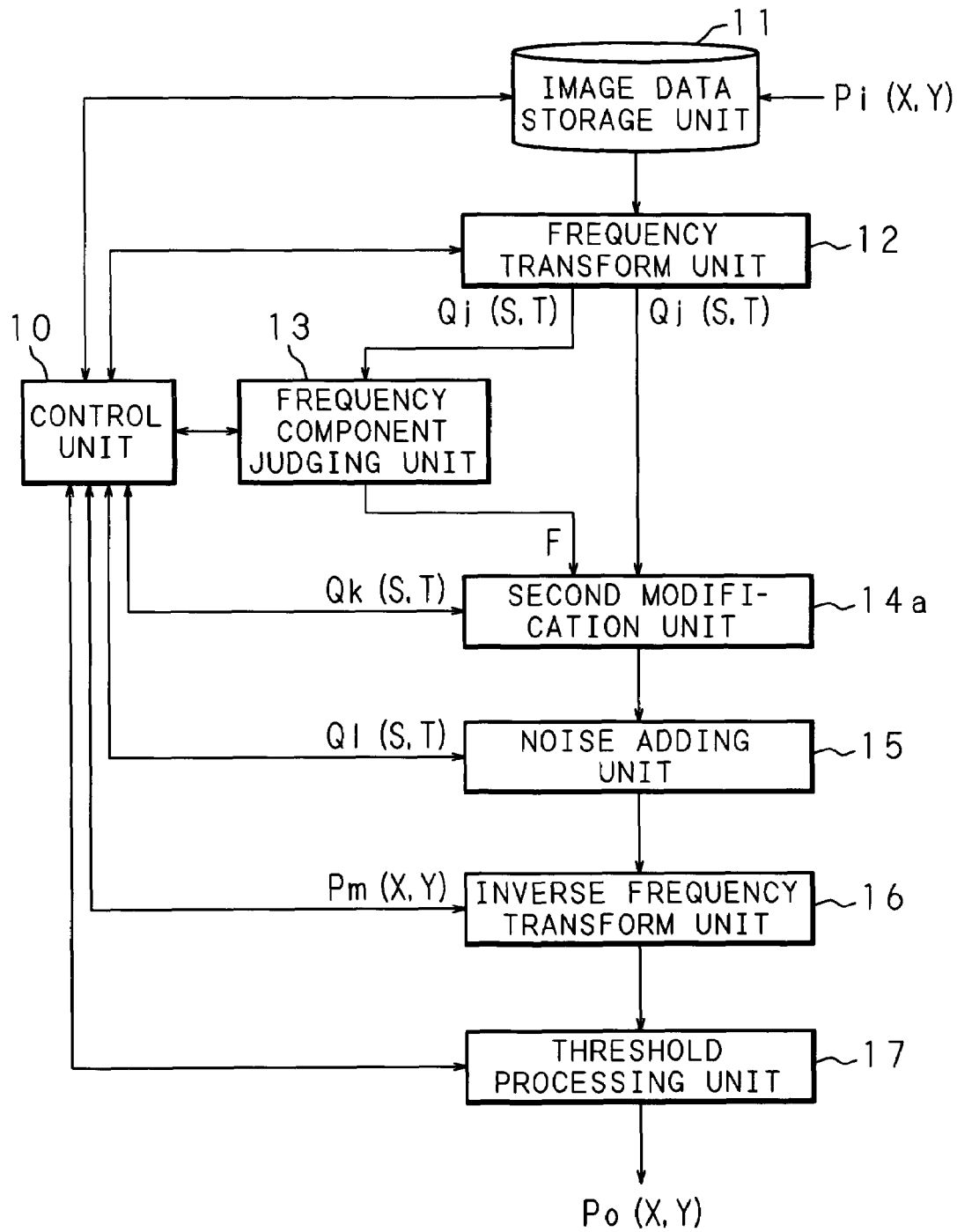
FIG. 12 is a block diagram showing a configuration example of an image processing apparatus in accordance with Embodiment 4 of the present invention.

FIG. 12 is a block diagram showing a configuration example of an image processing apparatus in accordance with Embodiment 4 of the present invention. Like the image processing apparatus in accordance with Embodiment 1 shown in FIG. 3, the image processing apparatus in accordance with Embodiment 4 comprises a control unit 10, an image data storage unit 11, a frequency transform unit 12, a frequency component judging unit 13, a modification unit 14, a noise adding unit 15, an inverse frequency transform unit 16 and a threshold processing unit 17. However, since the modification unit in the image processing apparatus in accordance with Embodiment 4 has a function different from that of the modification unit 14 of the image processing apparatus in accordance with Embodiment 1 to Embodiment 3, the modification unit in accordance with Embodiment 4 is referred to as a second modification unit 14a for the sake of distinction. Since the configuration, operations and effects of the image processing apparatus in accordance with Embodiment 4 are similar to the configuration, operations and effects of the image processing apparatus in accordance with Embodiment 1, except for this second modification unit 14a, the same components are designated by the same reference numerals, and their detailed descriptions are omitted.

The function provided in the second modification unit 14a will be described below. In the case where the frequency component judging unit 13 judges that any one of the absolute values q10, q01 and q11 is equal to or more than the predetermined value α and outputs the judgment data F being set at "1" to the second modification unit 14a, the second modification unit 14a multiplies the DCT coefficients Qj(S, T) of the AC components by a real number larger than 1 to emphasize edge portions, as in the case of Embodiment 1. On the other hand, in the case where the frequency component judging unit 13 judges that all the absolute values q10, q01 and q11 are less than the predetermined value α and outputs the judgment data F being set at "0" to the second modification unit 14a, the second modification unit 14a carries out processing for decreasing the values of the DCT coefficients Qj(S, T) other than the values of the DCT coefficients of the DC component and low frequency components.

Figure 13:
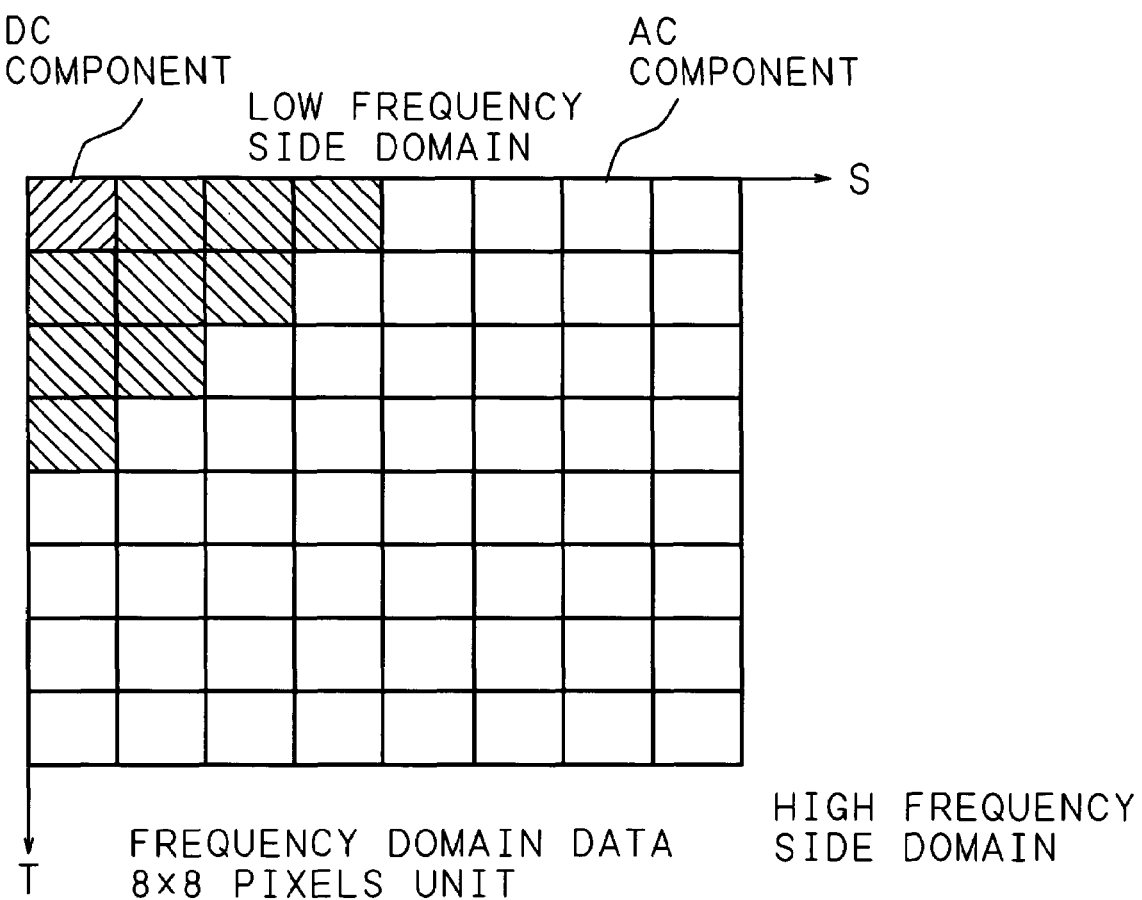
FIG. 13 is a schematic view conceptually showing the frequency domains of the DCT coefficients to be modified by the second modification unit of the image processing apparatus in accordance with Embodiment 4 of the present invention in the case where judgment data F being set at "0" is outputted from the frequency component judging unit thereof.

FIG. 13 is a schematic view conceptually showing the frequency domains of the DCT coefficients to be modified by the second modification unit 14a of the image processing apparatus in accordance with Embodiment 4 in the case where the judgment data F being set at "0" is outputted from the frequency component judging unit 13. Among the DCT coefficients Qj(S, T), the DCT coefficients Qk(S, T), (S, T) satisfying the condition of 3<S+T≦14, are to be modified. This modification domain has been set beforehand in the second modification unit 14a or the control unit 10, for example.

A specific modification procedure by the second modification unit 14a will be described below. FIG. 14 is a schematic view conceptually showing the two-dimensional matrix being used at the time when the second modification unit 14a of the image processing apparatus in accordance with Embodiment 4 carries out modification processing. The two-dimensional matrix shown in FIG. 14 has 8×8 matrix data M(S, T) corresponding to 8×8 spatial frequency components, wherein S=0 to 7, and T=0 to 7 (both S and T are integers). In the range of 0≦S+T≦3, the values of the matrix data M(S, T) is 1. In the range of 3<S+T≦14, the values of the matrix data M(S, T) is real numbers equal to or more than 1.

The two-dimensional matrix shown in FIG. 14 has the general characteristics of the contrast sensitive function (CSF), that is, characteristics reflecting the visual sense characteristics of the human being. The general sensitivity of the human being with respect to contrast depends on spatial frequencies, and the visual system of the human being is regarded as a kind of band pass filter. For example, in the case of a white-and-black striped pattern, the sensitivity of the human being for the striped pattern changes depending on the intervals between stripes arranged continuously. In the case where the intervals between the stripes is very small, it is difficult for the human being to sense the striped pattern. The values of M(S, T) are, for example, values changing concentrically depending on the sensitivity of the human being with respect to contrast around the frequency components hatched in FIG. 14.

In the case where the judgment data F being set at "0" is outputted from the frequency component judging unit 13, the second modification unit 14a carries out modification for each unit block by dividing the DCT coefficients Qj(S, T) by M(S, T) according to Expression (4) described below. The calculation of Expression (4) described below may be done to fractional parts.

$$Qk(S, T) = Qj(S, T)/M(S, T) \quad (4)$$

Next, the second modification unit 14a outputs the DCT coefficients Qk(S, T) obtained after the modification to the noise adding unit 15. In the case where the judgment data F being set at "1" is outputted from the frequency component judging unit 13, the DCT coefficients Qj(S, T) of the AC components are modified to DCT coefficients Qk(S, T)=Qj(S, T)×1.3, and the DCT coefficients Qk(S, T) obtained after the modification are outputted to the noise adding unit 15, as described in Embodiment 1. The processing after the DCT coefficients Qk(S, T) obtained after the modification are inputted to the noise adding unit 15 as described above is similar to that in the case of Embodiment 1.

In the case where the DCT coefficients Qj(S, T) are divided by the contrast sensitive function (CSF), the DCT coefficients of frequency components having high sensitivity to contrast are divided by a value larger than that in the case of the DCT coefficients of frequency components having low sensitivity to contrast, whereby an effective smoothing effect is obtained.

With Embodiment 4, in the case where a unit block does not include edge portions, the image of the unit block is smoothened using two-dimensional matrix data. On the other hand, in the case where a unit block includes edge portions, the edge portions of the image are emphasized. Hence, the edge portions are emphasized in the whole image, and flat portions not including edge portions are smoothened. As a result, the graininess of the image is suppressed effectively. Hence, the number of gray levels can be decreased while the characteristic portions of the original image are maintained properly.

The two-dimensional matrix data being used for smoothing is not limited to that shown in FIG. 14. It is possible to use two-dimensional matrix data wherein small values are set for frequency components being low in the sensitivity of the human being with respect to contrast, and on the other hand, large values are set for frequency components being high in the sensitivity of the human being with respect to contrast. In other words, it is preferable to use a two-dimensional matrix wherein the coefficients of low frequency components are maintained and the DCT coefficients being external and concentric around a predetermined frequency component in 8×8 blocks are suppressed more significantly. For example, a two-dimensional matrix, such as that having the Gaussian distribution, is suitable.

Furthermore, in Embodiment 4, the frequency components in the range of $3 < S+T \leq 14$ are modified. However, without being limited to this, the frequency components in the range of $1 < S+T \leq 14$ may be modified.

Still further, the image processing apparatus in accordance with Embodiment 4 may also be configured so as to be provided with the DC component judging unit 18 and the LUT unit 19 described above. In this case, the effects similar to those of Embodiment 2 and Embodiment 3 are obtained.

Embodiment 5

Figure 15:
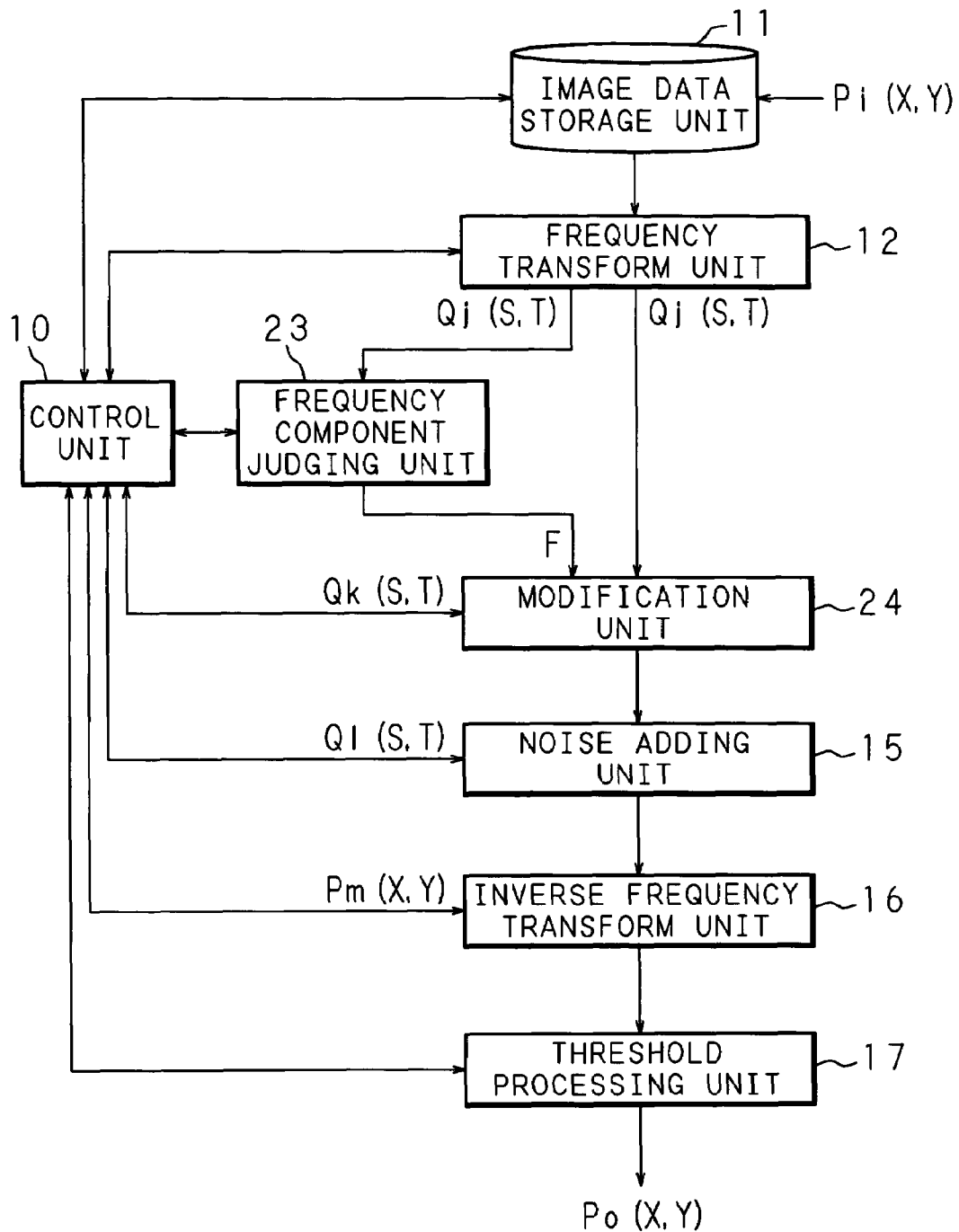
FIG. 15 is a block diagram showing a configuration example of an image processing apparatus in accordance with Embodiment 5 of the present invention.

FIG. 15 is a block diagram showing a configuration example of an image processing apparatus in accordance with Embodiment 5 of the present invention. Like the image processing apparatus in accordance with Embodiment 1 shown in FIG. 3, the image processing apparatus in accordance with Embodiment 5 comprises a control unit 10, an image data storage unit 11, a frequency transform unit 12, a frequency component judging unit 23, a modification unit 24, a noise adding unit 15, an inverse frequency transform unit 16 and a threshold processing unit 17. However, the frequency component judging unit 23 and the modification unit 24 provided in the image processing apparatus in accordance with Embodiment 5 have functions different from those of the frequency component judging unit 13 and the modification unit 14 provided in the image processing apparatus in accordance with Embodiment 1.

Figure 16:
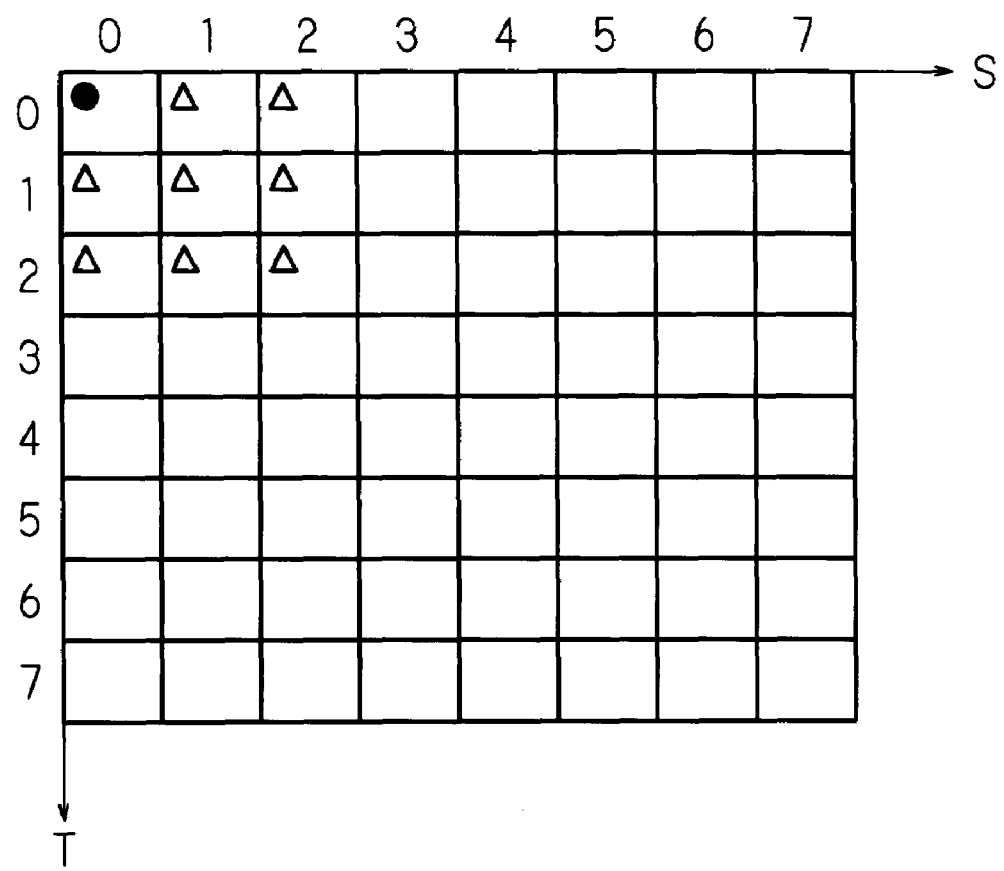
FIG. 16 is a schematic view conceptually showing, using 8×8 sections, the spatial frequency components of the DCT coefficients Qj(S, T), the magnitudes of the absolute values in the spatial frequency components being judged by the frequency component judging unit of the image processing apparatus in accordance with Embodiment 5 of the present invention.

The function of the frequency component judging unit 23 provided in the image processing apparatus in accordance with Embodiment 5 will be described below. FIG. 16 is a schematic view conceptually showing, using 8×8 sections, the spatial frequency components of the DCT coefficients $Qj(S, T)$, the magnitudes of the absolute values in the spatial frequency components being judged by the frequency component judging unit 23 provided in the image processing apparatus in accordance with Embodiment 5. The section located at the upper left end and marked by a black circle represents the DC component of the DCT coefficients $Qj(S, T)$, and the other sections represent the AC components. The S-axis represents the magnitude of the frequency in the X-axis direction in a spatial image, and the T-axis represents the magnitude of the frequency in the Y-axis direction in the spatial image. In other words, the S-axis and the T-axis represent the magnitudes of the frequencies in a density domain in the X-axis direction and the Y-axis direction.

The frequency component judging unit 23 calculates the absolute values of the DCT coefficients of the spatial frequency components corresponding to the sections marked by triangles. In other words, the frequency component judging unit 23 calculates the absolute value q10 of the DCT coefficient $Qj(1, 0)$, the absolute value q01 of the DCT coefficient $Qj(0, 1)$, the absolute value q11 of the DCT coefficient $Qj(1, 1)$, the absolute value q20 of the DCT coefficient $Qj(2, 0)$, the absolute value q02 of the DCT coefficient $Qj(0, 2)$, the absolute value q21 of the DCT coefficient $Qj(2, 1)$, the absolute value q12 of the DCT coefficient $Qj(1, 2)$ and the absolute value q22 of the DCT coefficient $Qj(2, 2)$.

Then, the frequency component judging unit 23 judges whether any one of the absolute values q10, q01, q11, q20, q02, q21, q12 and q22 is equal to or more than a predetermined positive value $\alpha$. In other words, a judgment is made as to whether the conditional expression of $q10 \geq \alpha$, $q01 \geq \alpha$, $q11 \geq \alpha$, $q20 \geq \alpha$, $q02 \geq \alpha$, $q21 \geq \alpha$, $q12 \geq \alpha$ or $q22 \geq \alpha$ is established. It is assumed that the predetermined value $\alpha$ can be set as desired. As the setting value of the predetermined value $\alpha$ is smaller (or larger), the judgment as to whether edge portions are included in the image of one unit block is made easier (or more difficult). In Embodiment 5, the predetermined value $\alpha$ is set at 64 as an example. The predetermined value $\alpha$ having been set is used as a judgment criterion for judging whether the image in the density domain of each unit block includes edge portions.

In the case where it is judged that one of the above-mentioned conditional expressions is established, that is, in the case where it is judged that any one of q10, q01, q11, q20, q02, q21, q12 and q22 is equal to or more than the predetermined value $\alpha$, the frequency component judging unit 23 sets the judgment data F at "1", and outputs the judgment data to the modification unit 24. In the case where it is judged that the above-mentioned conditional expressions are not established, that is, in the case where it is judged that all of q10, q01, q11, q20, q02, q21, q12 and q22 are less than the predetermined value $\alpha$, the frequency component judging unit 23 sets the judgment data F at "0", and outputs the judgment data to the modification unit 24. The output of the judgment data F is carried out sequentially, each unit block at a time.

The modification unit 24 modifies the DCT coefficients $Qj(S, T)$ by calculation depending on the value of the judgment data F outputted from the frequency component judging unit 23. The modification of the DCT coefficients $Qj(S, T)$ is carried out for each unit block.

Figure 17:
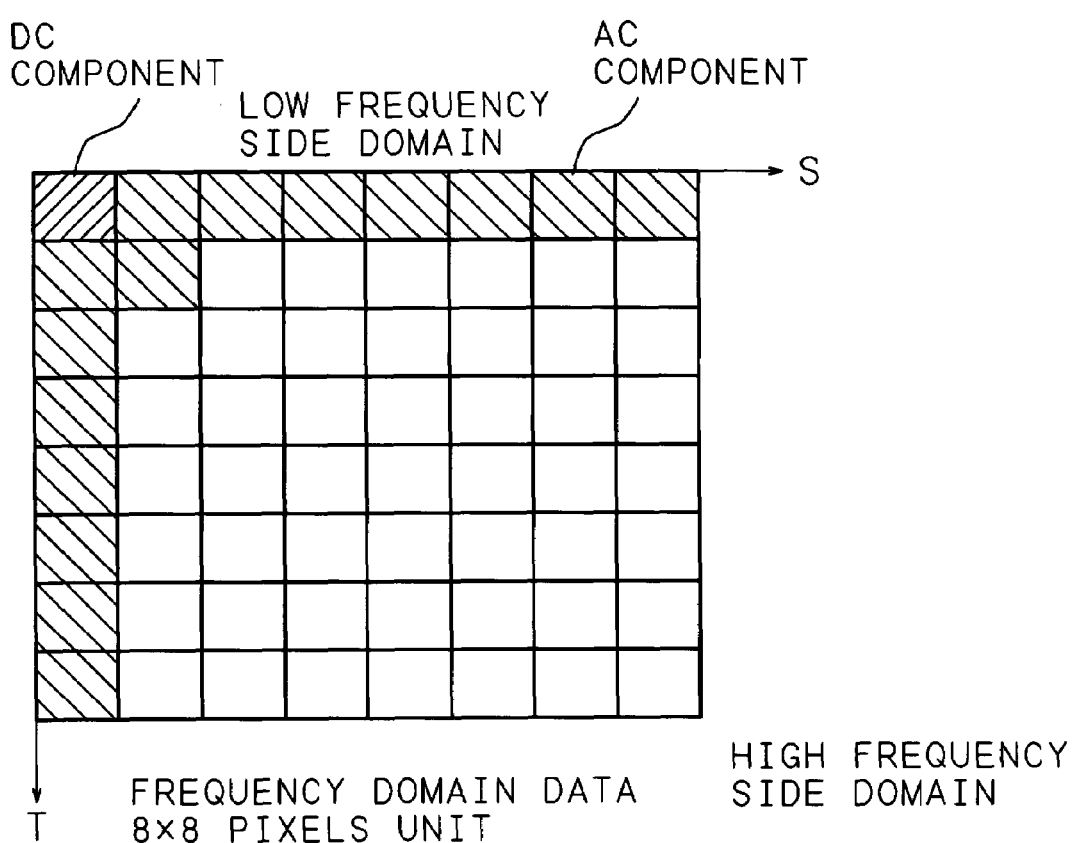
FIG. 17 is a schematic view conceptually showing the frequency components, the DCT coefficients of which are modified by the modification unit of the image processing apparatus in accordance with Embodiment 5 of the present invention.

FIG. 17 is a schematic view conceptually showing the frequency components, the DCT coefficients of which are modified by the modification unit 24 of the image processing apparatus in accordance with Embodiment 5. In FIG. 17, the sections hatched right-downward indicate modification domains in the frequency space of the DCT coefficients $Qj(S, T)$ to be modified by the modification unit 24 in the case where the judgment data F being set at "1" is outputted from the frequency component judging unit 23. The DCT coefficients $Qj(S, T)$ corresponding to the hatched sections are the coefficients $Qj(S, T)$ (wherein $0 < S \leq 7$, $T=0$) of the AC components having only the spatial frequency components in the horizontal direction, the coefficients $Qj(S, T)$ (wherein $S=0$, $0 < T \leq 7$) of the AC components having only the spatial frequency components in the vertical direction, and the coefficients $Qj(1, 1)$ of the AC components having the fundamental frequency components in the respective horizontal and vertical directions. The frequency component domains of the DCT coefficients $Qj(S, T)$ to be modified by the modification unit 24 have been set beforehand in the modification unit 24 or the control unit 10, for example.

Figure 18:
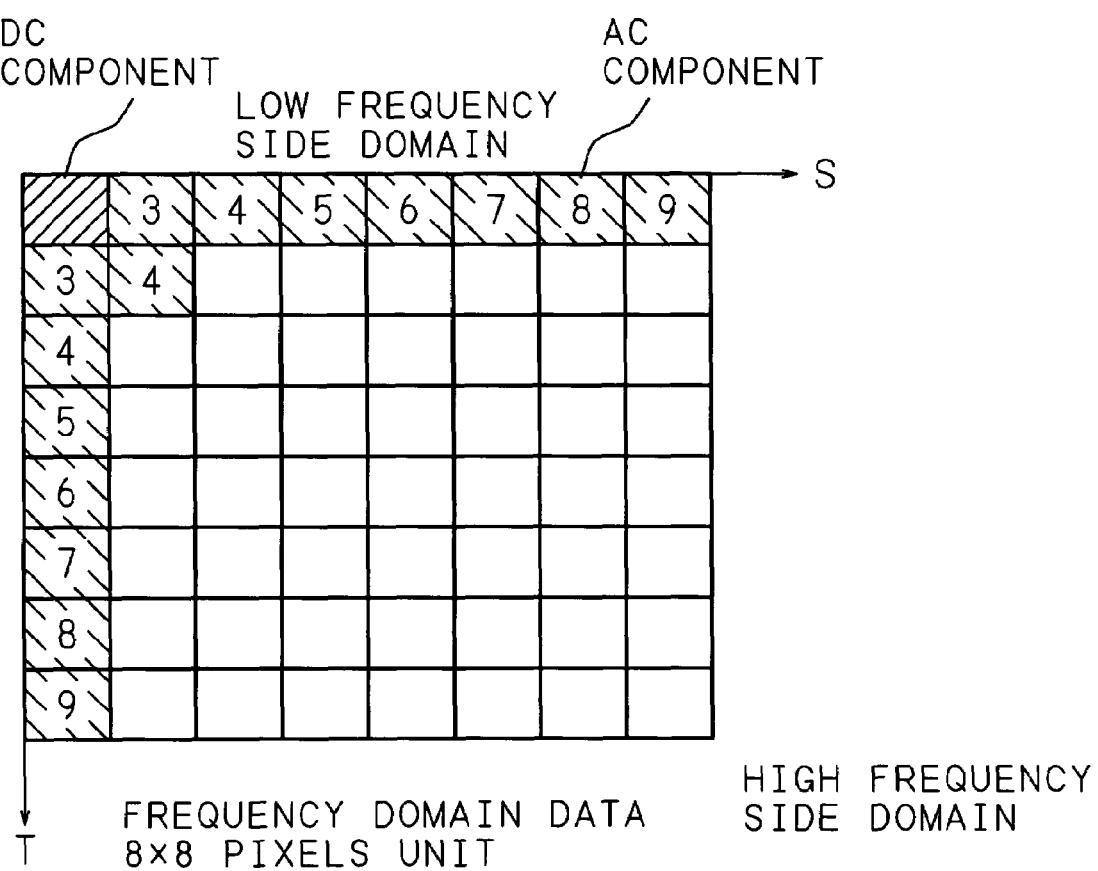
FIG. 18 is a schematic view conceptually showing the frequency information data for modifying DCT coefficients in the image processing apparatus in accordance with Embodiment 5 of the present invention.

FIG. 18 is a schematic view conceptually showing the frequency information data for modifying DCT coefficients in the image processing apparatus in accordance with Embodiment 5. As shown in FIG. 18, the frequency information data for frequency (S, T) is data for carrying out weighting at the time when the DCT coefficients Qj(S, T) are modified, and is set as the value of S+T+2.

For example, the frequency information data for the frequency (0, 1) is 0+1+2=3, the frequency information data for the frequency (0, 7) is 0+7+2=9, the frequency information data for the frequency (1, 0) is 1+0+2=3, and the frequency information data for the frequency (7, 0) is 7+0+2=9.

In the case where the judgment data F being set at "1" is outputted from the frequency component judging unit 23, the modification unit 24 multiplies the DCT coefficients Qj(S, T) in the modification domain shown in FIG. 17 by a real number larger than 1, which is determined for each frequency, thereby modifying the DCT coefficients Qj(S, T) to the DCT coefficients Qk(S, T). The real number larger than 1 is a value obtained by multiplying the frequency information data of the frequency (S, T) by a constant value of 0.35. Hence, the relationship between the DCT coefficient Qj(S, T) in the modification domain before the modification by the modification unit 24 and the DCT coefficient Qk(S, T) after the modification is represented by Expression (5) described below.

$$Qk(S, T) = Qj(S, T) \times \text{(frequency information data)} \times 0.35 \quad (5)$$
$$= Qj(S, T) \times (S + T + 2) \times 0.35$$

(wherein $0 < S \leq 7$ and $T=0$, or $S=0$ and $0 < T \leq 7$, or $S=T=1$)

Furthermore, the relationship between the DCT coefficient Qj(S, T) in domains other than the modification domain, outputted to the modification unit 24, and the DCT coefficient Qk(S, T) outputted from the modification unit 24 to the noise adding unit 15 is represented by Expression (6) described below.

$$Qk(S, T) = Qj(S, T) \quad (6)$$

(wherein $S=T=0$, or $S \neq 0$ and $T \neq 0$; $S=T=1$ excluded)

The above-mentioned real number larger than 1 is a value by which the DCT coefficients Qj(S, T) are multiplied so that the image is emphasized. Hence, it is desired that the value should be determined by carrying out image evaluation using actual print samples in consideration of overall balance, such as balance depending on whether edge portions are emphasized excessively.

In the case where DCT coefficient Qj(0, 2), for example, is outputted, the modification unit 24 outputs Qk(0, 2)=Qj(0, 2)×(0+2+2)×0.35 to the noise adding unit 15. In the case where DCT coefficient Qj(2, 3) is outputted, the modification unit 24 outputs Qk(2, 3)=Qj(2, 3) to the noise adding unit 15.

Even in the case where processing for modifying DCT coefficients Qj(S, T) to DCT coefficients Qk(S, T) is carried out according to Expression (5) and Expression (6), the value of the DCT coefficient Qj(0, 0) of the DC component is not modified. Hence, the average density of the whole image of one unit block is maintained.

In the case where the judgment data F being set at "0" is outputted from the frequency component judging unit 23, as in the case of Embodiment 4, the modification unit 24 carries out processing for decreasing the values of DCT coefficients Qj(S, T) other than the DCT coefficients of the DC component and low frequency components. In other words, the modification unit 24 modifies DCT coefficients Qj(S, T) to DCT coefficients Qk(S, T) according to Expression (4), and outputs the DCT coefficients Qk(S, T) obtained by the modification to the noise adding unit 15.

The DCT coefficients Qk(S, T) outputted from the modification unit 24 are processed by the noise adding unit 15, the inverse frequency transform unit 16 and the threshold processing unit 17 similarly as in the case of Embodiment 1.

Figure 19:
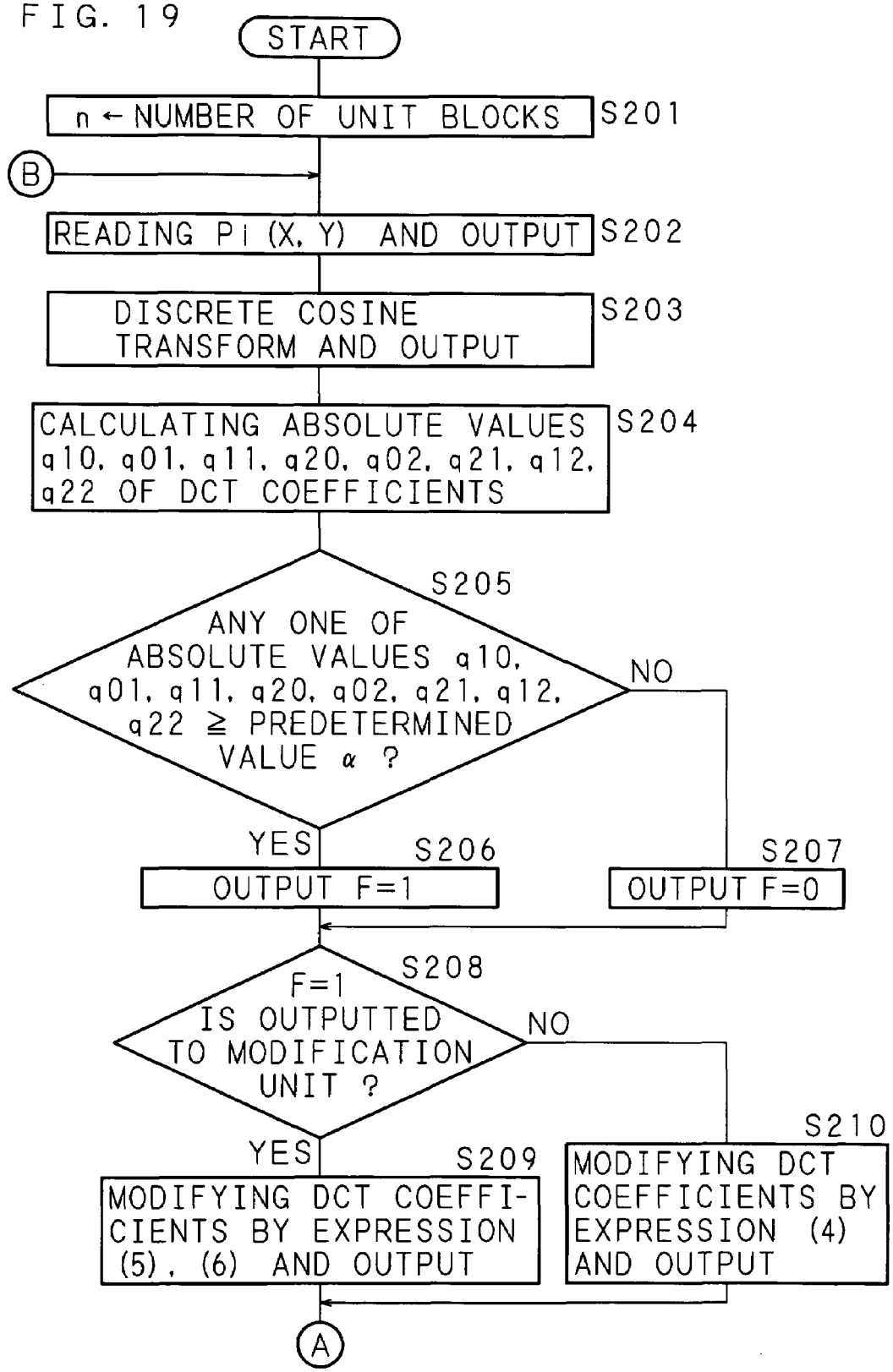
FIG. 19 is a flowchart showing the image processing procedure carried out by the image processing apparatus in accordance with Embodiment 5 of the present invention.
Figure 20:
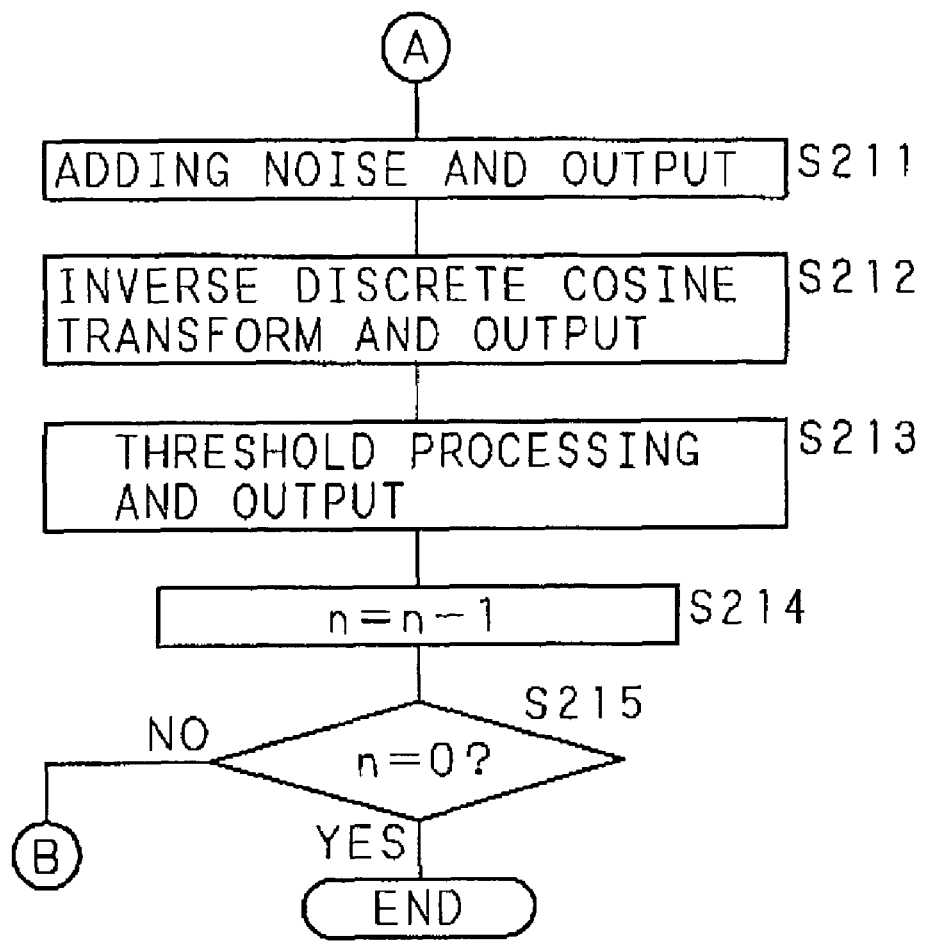
FIG. 20 is a flowchart showing the image processing procedure carried out by the image processing apparatus in accordance with Embodiment 5 of the present invention.

FIG. 19 and FIG. 20 are flowcharts showing the image processing procedure to be carried out by the image processing apparatus in accordance with Embodiment 5. A case of obtaining an image having 4 gray levels is described herein. It is assumed that inputted image data Pi(X, Y) has been stored in the image data storage unit 11. First, the control unit 10 sets the number of unit blocks at a variable n in the case where the image data Pi(X, Y) stored in the image data storage unit 11 is divided into unit blocks, one unit block having 8×8 pixels (step S201). Then, the control unit 10 reads the image data Pi(X, Y), one block unit at a time, each one unit block having 8×8 pixels, and outputs the image data Pi(X, Y) having been read to the frequency transform unit 12 (step S202).

Next, the control unit 10 subjects Pi(X, Y) to discrete cosine transform in the frequency transform unit 12, and outputs the DCT coefficients Qj(S, T) obtained after the discrete cosine transform to the frequency component judging unit 23 and the modification unit 24 (step S203). Then, in the frequency component judging unit 23, the control unit 10 calculates the absolute values q10, q01, q11, q20, q02, q21, q12 and q22 of the DCT coefficients of the predetermined frequency components (step S204), and judges whether any one of the absolute values q10, q01, q11, q20, q02, q21, q12 and q22 obtained by the calculation is equal to or more than a predetermined value α or more (step S205). In the case where any one of the absolute values q10, q01, q11, q20, q02, q21, q12 and q22 is equal to or more than the predetermined value α (YES at step S205), the control unit 10 sets the judgment data F at "1", and outputs the judgment data F (=1) to the modification unit 24 (step S206). In the case where all the absolute values q10, q01, q11, q20, q02, q21, q12 and q22 are less than the predetermined value α (NO at step S205), the control unit 10 sets the judgment data F at "0", and outputs the judgment data F (=0) to the modification unit 24 (step S207).

Next, in the modification unit 24, the control unit 10 judges whether the judgment data F being set at "1" is outputted from the frequency component judging unit 23 to the modification unit 24 (step S208). In the case where it is judged that the judgment data F being set at "1" is outputted to the modification unit 24 (YES at step S208), the control unit 10 modifies the DCT coefficients Qj(S, T) to the DCT coefficient Qk(S, T) according to Expression (5) and Expression (6) in the modification unit 24, and outputs the DCT coefficients Qk(S, T) obtained after the modification to the noise adding unit 15 (step S209). In other words, the DCT coefficients Qj(S, T) are modified by the processing at step S209 so that the edge portions of the image are emphasized.

In the case where it is judged that the judgment data F being set at "1" is not outputted to the modification unit 24, in other words, in the case where the judgment data F being set at "0" is outputted (NO at step S208), the control unit 10 modifies the DCT coefficients Qj(S, T) to the DCT coefficients Qk(S, T) according to Expression (4) in the modification unit 24, and outputs the DCT coefficient Qk(S, T) obtained after the modification to the noise adding unit 15 (step S210). In other words, the DCT coefficients Qj(S, T) are modified by the processing at step S210 so that the image is smoothened.

In the case where the processing at step S209 or step S210 is completed, the control unit 10 adds the DCT coefficients of blue noise to the DCT coefficients Qk(S, T) in the noise adding unit 15, and outputs DCT coefficients Ql(S, T), obtained after the addition of the noise, to the inverse frequency transform unit 16 (step S211). In other words, the DCT coefficients of the noise having blue noise characteristics in the density domain and having been transformed to image data having spatial frequency components are added sequentially.

Next, the control unit 10 subjects the DCT coefficients Ql(S, T) to inverse discrete cosine transform to obtain Pm(X, Y) in the inverse frequency transform unit 16, and outputs Pm(X, Y) obtained after the transformation to the threshold processing unit 17 (step S212). In other words, the data of the frequency domains is transformed to the data of the density domains. The inverse discrete cosine transform is carried out by the inverse transform of Expression (1). Then, the control unit 10 subjects Pm(X, Y) to quantized processing, for example, simple 4-value threshold processing according to Expression (3) in the threshold processing unit 17, and outputs image data Po(X,Y) obtained after the 4-value threshold processing to the outside (step S213). Next, the control unit 10 decrements the variable n by 1 (step S214), and judges whether the variable n obtained as the result of the decrement is "0" (step S215). In other words, a judgment is made as to whether image processing is completed for all the unit blocks. In the case where it is judged that the variable n is 0 (YES at step S215), the control unit 10 completes image processing. In the case where it is judged that the variable n is not 0 (NO at step S215), the control unit 10 returns the processing to step S202, and carries out image processing for the remaining unit blocks in a similar manner as described above at step S202 to step S213.

Except for the frequency component judging unit 23 and the modification unit 24, the configuration, operations and effects of the image processing apparatus in accordance with Embodiment 5 are similar to those of the image processing apparatus in accordance with Embodiment 1. Hence, the same components are designated by the same reference numerals, and their detailed descriptions are omitted.

In the image processing apparatus in accordance with Embodiment 5 configured as described above, in the processing of emphasizing the edge portions of the image at step S209, the modification is not necessarily carried out for the DCT coefficients Qj(S, T) in all the frequency domains other than the DC component. The frequency domains of the DCT coefficients Qj(S, T) to be modified are limited to the modification domains shown in FIG. 17. Hence, block patterns are suppressed from being generated in the edge portions of the curves of the image. For this reason, it is possible to obtain an image having sharper curve portions after threshold processing than in the case of modifying the DCT coefficients Qj(S, T) of all the AC components, it is possible to obtain an image having sharp curve portions after threshold processing. Furthermore, the number of gray levels can thus be decreased while the characteristic portions of the original image are maintained more properly.

Figure 21A:
FIG. 21A and FIG. 21B are schematic views showing difference in image quality in the frequency domains of the DCT coefficients modified by the modification unit of the image processing apparatus in accordance with Embodiment 5 of the present invention.
Figure 21B:

FIG. 21A and FIG. 21B are schematic views showing difference in image quality in the frequency domains of the DCT coefficients modified by the modification unit of the image processing apparatus in accordance with Embodiment 5. FIG. 21A shows an example of an image obtained in the case where image processing is carried out by modifying the DCT coefficients Qj(S, T) limited in the modification domain shown in FIG. 17. On the other hand, FIG. 21B shows an example of an image obtained in the case where image processing is carried out for the same original image as that shown in FIG. 21A by modifying the DCT coefficients Qj(S, T) of all the frequency domains other than the DC component, that is, all the AC components.

As clearly shown in FIG. 21A and FIG. 21B, in comparison with the case of the image shown in FIG. 21B, block patterns are suppressed properly from being generated in the contour portions of the face shown in the image of FIG. 21A, that is, at the edge portions of the curves.

In the image processing apparatus in accordance with Embodiment 5, as the frequency of the DCT coefficient is higher, a larger real number is used for multiplication. For this reason, it is possible to obtain an image having sharper edges than in the case of multiplying all the DCT coefficients by the same real number. Hence, the number of gray levels of the image can be decreased while the characteristic portions of the original image are maintained properly.

Furthermore, in Embodiment 5, in addition to the DCT coefficients of the AC components having only the spatial frequency components in the horizontal direction and the DCT coefficients of the AC components having only the spatial frequency components in the vertical direction, the DCT coefficients respectively having the fundamental frequency components in the horizontal direction and the vertical direction are modified. It is thus possible to emphasize the edge portions more effectively.

Embodiment 5 is configured to modify the DCT coefficients respectively having the fundamental frequency components. However, it may be configured so as not to modify the DCT coefficients respectively having the fundamental frequency components.

In addition, in Embodiment 5, image smoothing processing is carried out at step S210. However, Embodiment 5 may be configured so as not to carry out the processing at step S210. In other words, in the case where it is judged at step S208 that the judgment data F being set at "0" is outputted to the modification unit, Embodiment 5 may be configured to carry out noise addition and output processing at step S211 without modifying the DCT coefficients.

Furthermore, in Embodiment 5, the DCT coefficients are modified by multiplying the DCT coefficients Qj(S, T) by a value obtained by multiplying the frequency information data of the frequency (S, T) by a constant value of 0.35. However, the value multiplied to the DCT coefficients is not limited to this, but may be another real number larger than 1. For example, the constant value of 0.35 may be changed to a real number, such as 0.34, 0.36 or 0.4. Moreover, although the frequency information data is assumed to be S+T+2, the data may be another real number having a larger (or smaller) value as the frequency of the DCT coefficient is higher (or lower).

Still further, in Embodiment 5, the frequency domains of the DCT coefficients to be judged by the frequency component judging unit may be extended further within the low frequency domains, provided that hardware conditions permit.

Besides, the image processing apparatus in accordance with Embodiment 5 may be configured so as to be provided with the DC component judging unit 18 and the LUT unit 19. In this case, effects similar to those of Embodiment 2 and Embodiment 3 are obtained.

Embodiment 6

Next, the following description will describe in detail an image processing method and an image processing apparatus according to Embodiment 6 of the present invention, based on the drawings. Similarly to the image processing apparatus in accordance with Embodiment 1 shown in FIG. 3, the image processing apparatus in accordance with Embodiment 6 comprises a control unit 10, an image data storage unit 11, a frequency transform unit 12, a frequency component judging unit 13, a modification unit 14, a noise adding unit 15, an inverse frequency transform unit 16, and a threshold processing unit 17.

However, the frequency component judging unit 13 in the image processing apparatus in accordance with Embodiment 6 executes a judgment process different from that in accordance with Embodiment 1. Note that since the configuration, operations and effects of the image processing apparatus in accordance with Embodiment 6 except for the frequency component judging unit 13 are the same as the configuration, operations and effects of the image processing apparatus in accordance with Embodiment 1, the same reference numerals are given to the same components, and the detailed explanation thereof will be omitted.

Figure 22:
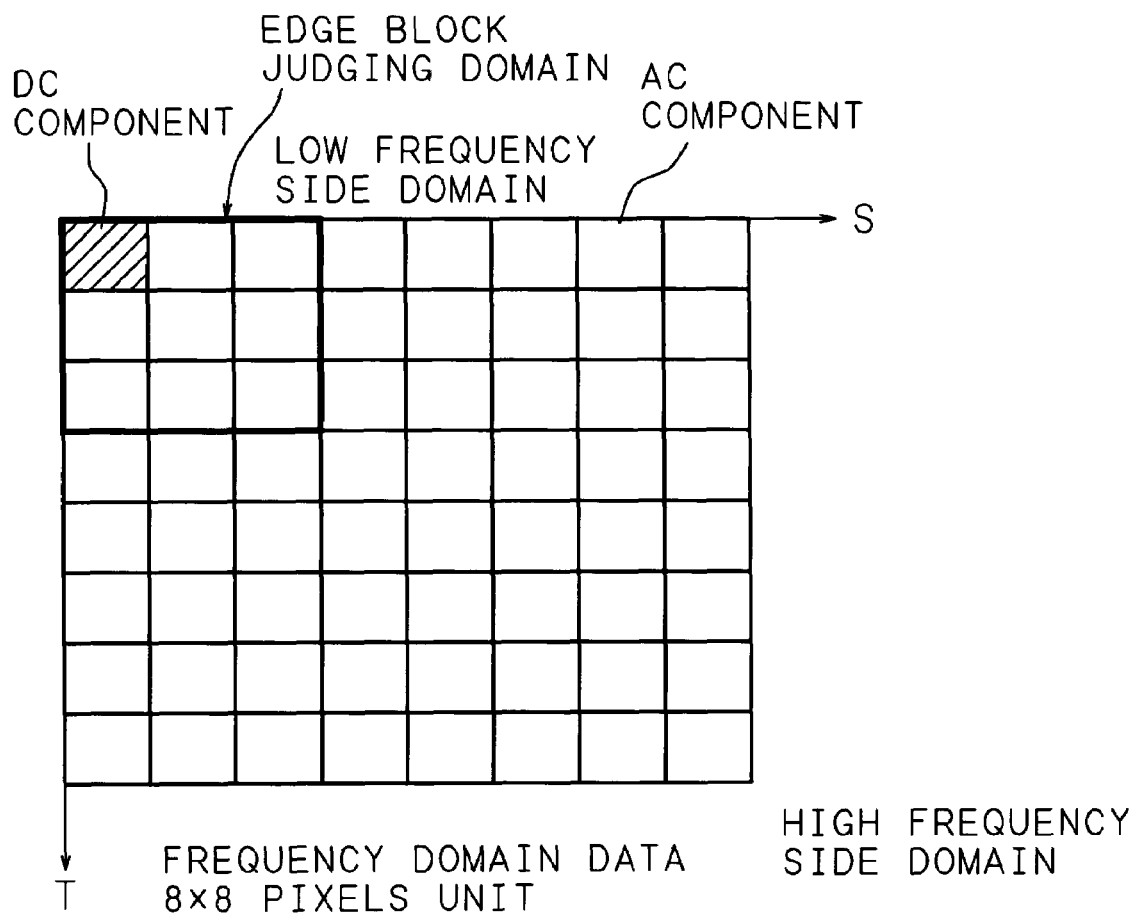
FIG. 22 is a conceptual view showing a block of image data after transformed into spatial frequency components by the frequency transform unit.

FIG. 22 is a conceptual view showing a block of image data after transformed into spatial frequency components by the frequency transform unit 12. The S-axis represents the magnitude of frequency in the X-axis direction of the spatial image, and the T-axis represents the magnitude of frequency in the Y-axis direction of the spatial image. A component corresponding to the upper-left position coordinates in the frequency space coordinates shown in FIG. 22 among 8×8 components is a DC component, and components corresponding to the other position coordinates are AC components.

DCT coefficients Qj(S, T) in an edge block judgment domain having a 3×3 matrix size shown in FIG. 22, namely, the DCT coefficients Qj(S, T) of predetermined frequency components, are represented by Qj(s0+μ, t0+v) (where, μ, v=0, 1, 2, and μ=v≠0). Here, the position coordinates of the DC component are (s0, t0), and the DCT coefficient Qj(S, T) of the spatial frequency component at this position coordinates is Qj(s0, t0). Moreover, in FIG. 22, the next position coordinates on the right of the position coordinates (s0, t0) are (s0+1, t0), and the DCT coefficient Qj(S, T) of the spatial frequency component at this position coordinates is Qj(s0+1, t0). Further, the next position coordinates on the right of the position coordinates (s0+1, t0) are (s0+2, t0), and the DCT coefficient Qj(S, T) of the spatial frequency component at this position coordinates is Qj(s0+2, t0). The DCT coefficients Qj(S, T) of the spatial frequency components at position coordinates (s0, t0+1), (s0+1, t0+1), and (s0+2, t0+1) arranged in this order from the left of the next lower row are Qj(s0, t0+1), Qj(s0+1, t0+1), and Qj(s0+2, t0+1), respectively. Further, the DCT coefficients Qj(S, T) of the spatial frequency components corresponding to position coordinates (s0, t0+2), (s0+1, t0+2), and (s0+2, t0+2) arranged in this order from the left of the next lower row are Qj(s0, t0+2), Qj(s0+1, t0+2), and Qj(s0+2, t0+2), respectively.

The frequency component judging unit 13 judges whether or not the DCT coefficients Qj(S, T) in the edge block judgment domain satisfy following Equation (7).

$$|Qj(s0+\mu, t0+v) \times Qj(s0, t0)| \geq \alpha 1 \quad (7)$$

(where μ, v=0, 1, 2, μ=v≠0, and α1=34000).

First, the frequency component judging unit 13 calculates the absolute value Aqμv=|Qj(s0+μ, t0+v)×Qj(s0, t0)| (where μ, v=0, 1, 2, μ=v≠0) of the product obtained by multiplying each of the DCT coefficients Qj(S, T) in the edge block judgment domain in the special frequency components by the DCT coefficient Qj(s0, t0) of the DC component. Next, when there is a pair of μ, v satisfying the relationship of Equation (7) shown above, that is, when the magnitude of any of the products obtained by multiplying the DCT coefficients Qj(S, T) in the edge block judgment domain by the DCT coefficient Qj(s0, t0) of the DC component is equal to or larger than a predetermined value α1, the frequency component judging unit 13 judges that the block subjected to image processing is a block including an edge portion (hereinafter referred to as an edge block). When a judgment is made that the block subjected to image processing is an edge block, the frequency component judging unit 13 sets judgment data F at "1" and outputs it to the modification unit 14.

On the other hand, when all of the products obtained in the above-mentioned manner are smaller than the predetermined value α1, the frequency component judging unit 13 judges that the block subjected to image processing is a block including no edge portion. When a judgment is made that the block subjected to image processing is not an edge block, the frequency component judging unit 13 sets judgment data F at "0" and outputs it to the modification unit 14.

As described above, the judgment data F is data indicating whether the block subjected to image processing is an edge block or not.

According the value of the judgment data F outputted from the frequency component judging unit 13, the modification unit 14 modifies the DCT coefficients Qj(S, T) by calculation. Specifically, when the judgment data F=1 is outputted, the modification unit 14 performs an enhancement process on the image by increasing the DCT coefficients Qj(S, T) of the AC components. On the other hand, when the judgment data F=0 is outputted, the modification unit 14 performs a smoothing process on the image by decreasing the DCT coefficients Qj(S, T) of the AC components. The modification of DCT coefficients Qj(S, T) is performed block by block for each unit block.

When the judgment data F indicating the value "1" is outputted from the frequency component judging unit 13, the modification unit 14 multiplies all of the DCT coefficients Qj(S, T) of the AC components by a real number larger than 1, for example, 1.3. Then, the modification unit 14 outputs the DCT coefficients Qk (S, T) obtained by multiplying the DCT coefficients Qj(S, T) by 1.3 to the noise adding unit 15.

When the judgment data F indicating the value "0" is outputted, the modification unit 14 divides the DCT coefficients Qj(S, T) of predetermined AC components by a real number larger than 1, for example, 350, to decrease the DCT coefficients Qj(S, T). Then, the modification unit 14 outputs the decreased DCT coefficients Qk (S, T) to the noise adding unit 15.

Figure 23:
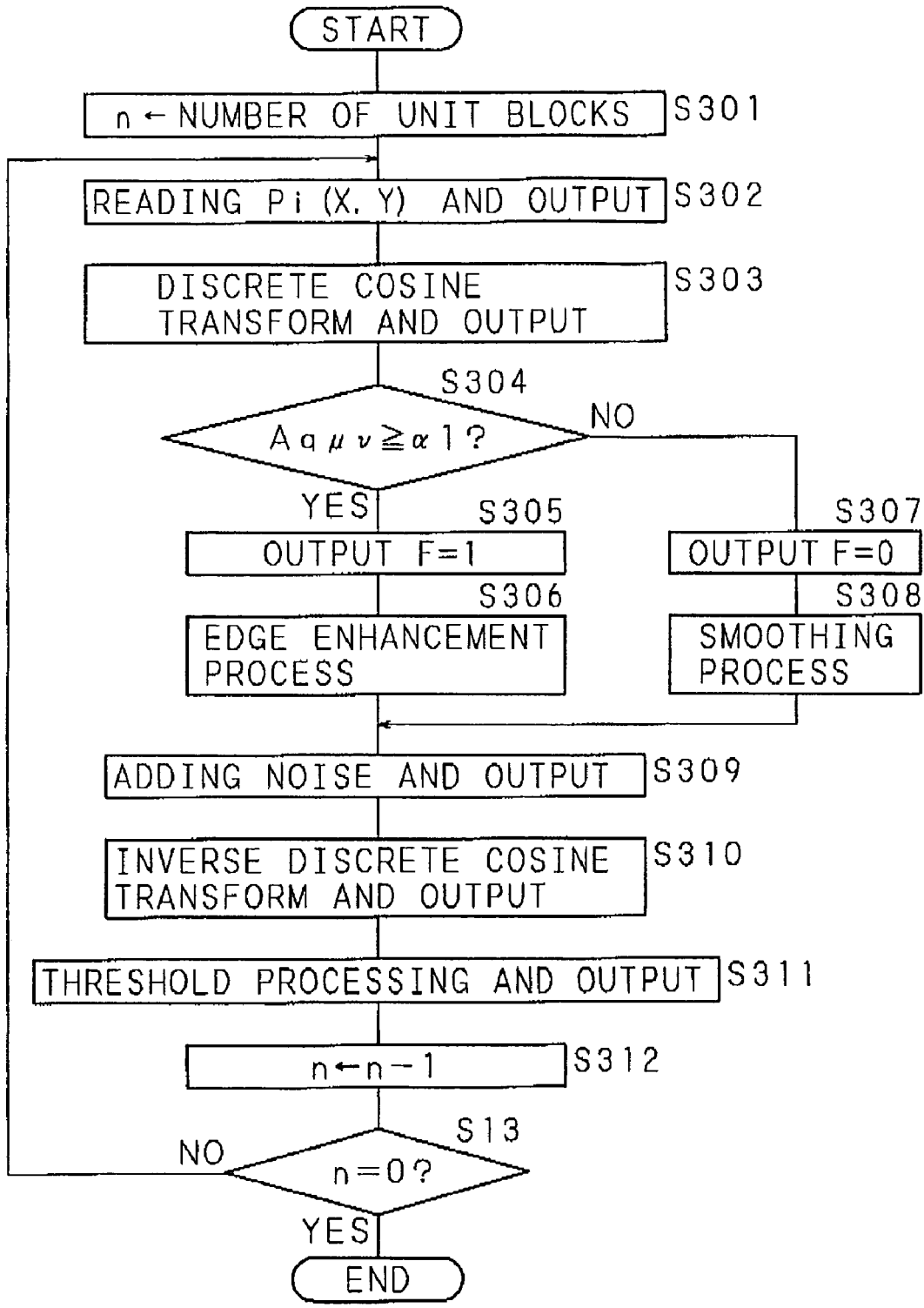
FIG. 23 is a flowchart showing the procedure of image processing performed by the image processing apparatus in accordance with Embodiment 6 of the present invention.

Next, the processing procedure of the control unit 10 will be explained using a flowchart. FIG. 23 is a flowchart showing the procedure of image processing performed by the image processing apparatus in accordance with Embodiment 6. First, for a variable n, the control unit 10 of the image processing apparatus sets the number of unit blocks obtained by dividing image data Pi (X, Y) inputted and stored in the image data storage unit 11 so that each unit block consists of 8×8 pixels (step S301). For example, when the image data represents 256×256 pixels, 32×32 is set for the variable n. Then, the control unit 10 reads the image data Pi (X, Y) for each unit block of 8×8 pixels, and outputs the read image data Pi (X, Y) to the frequency transform unit 12 (step S302).

Next, the control unit 10 transforms the Pi (X, Y) by discrete cosine transformation in the frequency transform unit 12, and outputs the resulting DCT coefficients Qj(S, T) to the frequency component judging unit 13 and modification unit 14 (step S303).

Then, the control unit 10 multiplies each of the DCT coefficients Qj(s0+μ, t0+v) in the edge block judgment domain by the value Qj(s0, t0) of the DC component, calculates the absolute value Aqμv (where μ, v=0, 1, 2, and μ≠v) of the product obtained by the multiplication, and judges whether or not any of the calculated absolute values Aqμv is equal to or larger than the predetermined value α1 (step S304).

When any absolute value Aqμv is judged to be equal to or larger than the predetermined value α1 (S304: YES), the control unit 10 sets the judgment data F at "1", and outputs the judgment data F (=1) to the modification unit 14 (step S305). Then, the control unit 10 performs the enhancement process on the value of the DCT coefficient Qj(S, T) in the modification unit 14 in which the outputted judgment data F (=1) has been inputted, and outputs the result to the noise adding unit 15 (step S306).

In short, the control unit 10 changes the DCT coefficient Qj(S, T) into Qk (S, T), according to Equation (2), in the modification unit 14, and outputs the Qk (S, T) to the noise adding unit 15.

When all the absolute values Aqμv are smaller than the predetermined value α1 (step S304: NO), the control unit 10 sets the judgment data F at "0", and outputs the judgment data F (=0) to the modification unit 14 (step S307). Then, the control unit 10 performs the smoothing process on the values of the DCT coefficients Qj(S, T) in the modification unit 14 in which the outputted judgment data F (=0) has been inputted (S308), and outputs the results to the noise adding unit 15.

In short, the control unit 10 changes the DCT coefficient Qj(S, T) into Qk (S, T), according to Equation (4), and outputs the Qk (S, T) to the noise adding unit 15.

When the process at step S306 or step S308 has been finished, the control unit 10 adds the DCT coefficient of blue noise to the DCT coefficients Qk (S, T) in the noise adding unit 15, and outputs the DCT coefficients Ql (S, T) resulting from the noise addition to the inverse frequency transform unit 16 (step S309).

Next, the control unit 10 transforms the DCT coefficient Ql (S, T) into Pm (X, Y) by inverse discrete cosine transformation in the inverse frequency transform unit 16, and outputs the resulting Pm(X, Y) to the threshold processing frequency unit 17 (step S310). Then, the control unit 10 transforms the Pm (X, Y) into quantized data, for example, 4-value image data Po (X, Y) according to Equation (3) in the threshold processing unit 17, and outputs the image data Po (X, Y) to the outside (step S311). Next, the control unit 10 decrements the variable n by 1 (step S312), and judges whether or not the variable n of the decremented result is 0 (step S313). In short, a judgment is made as to whether or not image processing has been finished for all the unit blocks. When a judgment is made that the variable n is 0 (step S313: YES), the control unit 10 terminates the image processing. When a judgment is made that the variable n is not 0 (step S313: NO), the control unit 10 returns the processing to step S302, and performs the image processing from step S302 through step S311 for the remaining unit blocks in the same manner as above.

The function of the image processing apparatus in accordance with Embodiment 6 will be explained. First, the process at step S304 makes it possible to judge whether or not the image of a unit block includes an edge portion.

Since the DCT coefficients Qj(S, T) of low frequency components except for the DC component has more information about an edge portion compared with high frequency components, it is possible to judge whether or not a unit block includes an edge portion by comparing the absolute values Aqμv, namely the magnitude of the products obtained by multiplying the DCT coefficients Qj(S, T) in the edge block judgment domain by the DCT coefficient Qj(s0, t0) of the DC component, with the predetermined value α1.

Next, the following description will explain the reason why the DCT coefficient Qj(s0, t0) of the DC component is added to the judgment element of an image including an edge portion, in addition to the DCT coefficients Qj(S, T) in the edge block judgment domain having the information about an edge portion.

When a block includes an edge portion, the DCT coefficients Qj(S, T) in the edge block judgment domain have a larger value compared with that of a flat image. Therefore, by judging whether or not the magnitude of the DCT coefficients Qj(S, T) in the edge block domain is equal to or larger than a predetermined value, it is basically possible to judge whether the block subjected to processing is an edge block or not.

However, the edge portion recognition characteristics of human depend on the mean gray level of the image. In other words, even when the image has DCT coefficients Qj(S, T) of the same magnitude in the edge block judgment domain, the larger (smaller) the DCT coefficient Qj(s0, t0) of the DC component corresponding to the mean gray level, the more difficult (more easy) the humans can recognize an edge portion. Therefore, even when the magnitude of the DCT coefficients Qj(S, T) in the edge block judgment domain is not larger than the predetermined value, when the DCT coefficient Qj(s0, t0) of the DC component is large, there arises the problem that the enhancement process is not performed on an image recognized as an edge portion.

For example, for an image including light characters on a highlight, the enhancement process should be performed to enhance the characters before transformation into 4-value data. However, since the difference in the gray level between the background highlight area and the light character portion is small, the block subjected to image processing is not judged to be an edge block. Consequently, since the enhancement process is not performed, the characters may become unclear when the gray levels are decreased.

When the predetermined value is simply decreased, an edge block can be easily found, but an image that should not be enhanced is also subjected to the enhancement process, and consequently there arises a problem that the image becomes rough.

Therefore, in order to make it possible to find an edge block even in an image including light characters on a highlight area, the DCT coefficient Qj(s0, t0) of the DC component having the information about the mean gray level of the image is added for the judgment element of an edge block.

More specifically, whether the block is an edge block or not is judged by judging whether or not the absolute values of the products obtained by multiplying the DCT coefficients Qj(S, T) of predetermined spatial frequency components by the DCT coefficient Qj(s0, t0) of the DC component are equal to or larger than the predetermined value α1. As a result, even when the block has the same DCT coefficients Qj(S, T) in the edge block judgment domain, the larger (or smaller) the DCT coefficients Qj(s0, t0), the more difficult (or more easy) it is to make a judgment that the block subjected to image processing is an edge block.

Thus, according to the image processing method and the image processing apparatus in accordance with Embodiment 6 of the present invention, since a judgment as to whether an edge portion is present or absent can be made depending on the mean gray level of the image, it is possible to perform the enhancement process on a block of an image including an edge portion. For example, it is possible to enhance the light characters on a highlight area.

In step S306 and step S308, the DCT coefficients are modified according to whether or not the image of a unit block includes an edge portion. Thus, the enhancement process is performed on an image including an edge portion, whereas the smoothing process is performed on an image including no edge portion. With use of similar method of Embodiment 1 or Embodiment 5, the enhancement process for an image is performed by increasing the values of the DCT coefficients Qj(S, T) of the AC components, and with use of similar method of Embodiment 4, the smoothing process for an image is performed by decreasing the values of the DCT coefficients Qj(S, T) of the AC components.

As described above, the DCT coefficients Qj(S, T) of the AC components have the information about an edge portion of the image. Therefore, by making the values of the DCT coefficients Qj(S, T) of the AC components larger than the values of the DCT coefficients Qj(S, T) of the original image, it is possible to enhance the edge portion. On the other hand, by making the values of the DCT coefficients Qj(S, T) smaller than the values of the DCT coefficients Qj(S, T) of the original image, it is possible to smooth the image. Thus, by Embodiment 6, it is possible to enhance the edge portion and smooth the flat image in the entire image, and it is possible to decrease the gray levels while satisfactorily maintaining the features of the original image.

In Embodiment 6, a judgment as to whether a unit block includes an edge portion is made block by block. Then, when a unit block includes an edge portion, the DCT coefficients Qj(S, T) are modified to enhance the edge portion. On the other hand, when a unit block includes no edge portion, the DCT coefficients Qj(S, T) are modified to smooth the image. Consequently, it is possible to obtain the image with the clear edge portion, and it is possible to decrease the gray levels of the image while satisfactorily maintaining the features of the original image. In particular, the present invention is effective for images including a large amount of text, or graphic arts.

Moreover, by using the DC component of the block subjected to image processing when judging the frequency components, it becomes possible to judge a block having light characters on a highlight area as an edge block, and consequently the reproducibility of text is improved.

Note that the matrix size of the edge block judgment domain is defined as 3×3 pixels in Embodiment 6. However, the matrix size may be expanded to a wider range in the low frequency domain if the hardware condition permits.

Besides, the predetermined value $\alpha 1$ is not limited to 34000 as long as it is an appropriate positive value capable of obtaining satisfactory images.

Embodiment 7

Next, the following description will describe in detail an image processing method and an image processing apparatus in accordance with Embodiment 7 of the present invention based on the drawings. Similarly to the image processing apparatus in accordance with Embodiment 1 shown in FIG. 3, the image processing apparatus in accordance with Embodiment 7 comprises a control unit 10, an image data storage unit 11, a frequency transform unit 12, a frequency component judging unit 13, a modification unit 14, a noise adding unit 15, an inverse frequency transform unit 16, and a threshold processing unit 17.

Similarly to the frequency component judging unit 13 in accordance with Embodiment 6, the frequency component judging unit 13 in accordance with Embodiment 7 calculates the absolute values Aqμv of the products obtained by multiplying the DCT coefficients Qj(s0+μ, t0+v) in the edge block judgment domain by the DCT coefficient Qj(s0, t0) of the DC component.

Then, the frequency component judging unit 13 judges whether or not the calculated absolute value Aqμv is equal to or larger than a predetermined value $\alpha 1$. When a judgment is made that the calculated absolute value Aqμv is smaller than the predetermined value $\alpha 1$, the frequency component judging unit 13 judges whether or not the DCT coefficients Qj(S, T) in the edge block judging domain satisfy following Equation (8).

$$|Qj(s0+\mu, t0+v)| \geq \alpha 2 \tag{8}$$

(where $\mu, v=0, 1, 2, \mu=v\neq 0$, and $\alpha 2=16$)

When there is no pair of μ, v satisfying the relationship of Equation (8) shown above, that is, when the magnitude of all the DCT coefficients Qj(S, T) in the edge block judging domain is smaller than the predetermined value $\alpha 2$, it is judged that the block subjected to image processing is a block of a flat image (hereinafter referred to as a non-edge block). On the other hand, when the above-mentioned magnitude of any of the absolute values is greater than the predetermined value $\alpha 2$, it is judged that the block subjected to image processing is a block of an image that includes no edge portion and is not a flat image (hereinafter referred to as an intermediate block).

When any of the absolute values Aqμv is judged to be equal to or larger than $\alpha 1$, the frequency component judging unit 13 outputs the judgment data F=01 to the modification unit 14. When all the absolute values Aqμv are smaller than $\alpha 1$ and any of the absolute values qμv is equal to or larger than $\alpha 2$, the frequency component judging unit 13 outputs the judgment data F=10 to the modification unit 14. Further, when all the absolute values Aqμv are smaller than $\alpha 1$ and all the absolute values qμv are smaller than $\alpha 2$, the frequency component judging unit 13 outputs the judgment data F=00 to the modification unit 14.

Figure 24:
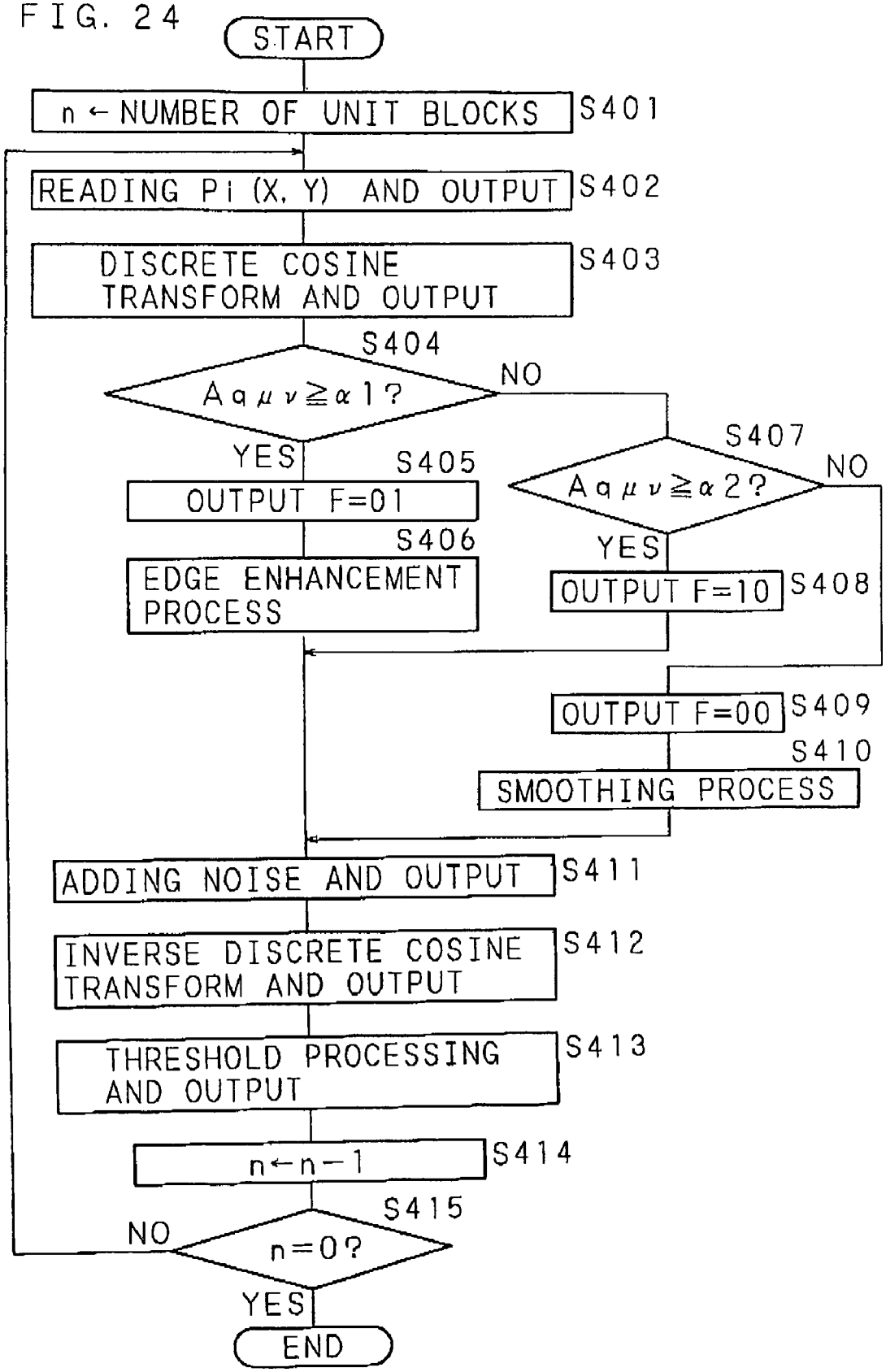
FIG. 24 is a flowchart showing the procedure of image processing performed by the image processing apparatus in accordance with Embodiment 7 of the present invention.

Next, the processing procedure of the control unit 10 will be explained using a flowchart. FIG. 24 is a flowchart showing the procedure of image processing performed by the image processing apparatus in accordance with Embodiment 7.

First, the control unit 10 performs the processing of step S401 through step S404 similar to that of step S301 through step S304 shown in FIG. 23.

Specifically, the control unit 10 sets the number of unit blocks for the variable n (step S401), reads the image data Pi (X, Y) for each unit block of 8×8 pixels, and outputs the read image data Pi (X, Y) to the frequency transform unit 12 (step S402). Next, the control unit 10 transforms the Pi (X, Y) by discrete cosine transformation in the frequency transform unit 12, and outputs the results to the frequency component judging unit 13 and modification unit 14 (step S403). Then, the control unit 10 calculates the absolute values Aqμv (where $\mu, v=0, 1, 2$, and $\mu\neq v$) of the products obtained by multiplying each of the DCT coefficients Qj(s0+μ, t0+v) in the edge block judgment domain by the value Qj(s0, t0) of the DC component, and judges whether or not any of the calculated absolute values Aqμv is equal to or larger than the predetermined value $\alpha 1$ by the frequency component judging unit 13 (step S404).

When any of the absolute values Aqμv is judged to be equal to or larger than the predetermined value $\alpha 1$ (step S404: YES), the control unit 10 sets the judgment data F at "01", and outputs the judgment data F (=01) to the modification unit 14 (step S405).

Then, the control unit 10 performs the enhancement process on the value Qj(S, T) in the modification unit 14, and outputs the result to the noise adding unit 15 (step S406).

In short, the control unit 10 changes the value of the DCT coefficient Qj(S, T) into Qk (S, T), according to Equation (2), in the modification unit 14, and outputs the Qk (S, T) to the noise adding unit 15.

When all the absolute values Aqµv are smaller than the predetermined value α1 (step S404: NO), the control unit 10 judges whether or not any of the absolute values qµv is equal to or larger than a predetermined value α2 (step S407). When any of the absolute values qµv is judged to be equal to or larger than the predetermined value α2 (step S407: YES), the control unit 10 sets the judgment data F at "10", and outputs the judgment data F (=10) to the modification unit 14 (step S408).

When the judgment data F (=10) is inputted to the modification unit 14, the modification unit 14 outputs the DCT coefficient Qj(S, T) as it is to the noise adding unit 15 without changing the value of the DCT coefficient Qj(S, T).

When all the absolute values qµv are smaller than the predetermined value α2 (step S407: NO), the control unit 10 sets the judgment data F at "00", and outputs the judgment data F (=00) to the modification unit 14 (step S409).

Then, the control unit 10 performs the smoothing process on the values of the DCT coefficients Qj(S, T) in the modification unit 14 (step S410), and outputs the results to the noise adding unit 15.

When the processing at step S406, S408 or S409 has been finished, the control unit 10 performs the processing of step S411 through step S415 similar to that of steps S309 through S313 shown in FIG. 23.

In short, the control unit 10 adds the DCT coefficient of blue noise to the DCT coefficient Qk (S, T) (step S411), transforms the DCT coefficient Ql (S, T) into Pm (X, Y) by inverse discrete cosine transformation in the inverse frequency transform unit 16 (step S412), and transforms the Pm (X, Y) into quantized data, for example, 4-value image data Po (X, Y) according to Equation (3) in the threshold processing unit 17 and outputs the image data Po (X, Y) to the outside (step S413). Next, the control unit 10 decrements the variable n by 1 (step S414), and judges whether or not the variable n of the decremented result is 0 (step S415). In short, a judgment is made as to whether or not image processing has been finished for all the unit blocks. When a judgment is made that the variable n is 0 (step S415: YES), the control unit 10 terminates the image processing. When a judgment is made that the variable n is not 0 (step S415: NO), the control unit 10 returns the processing to step S402, and performs the image processing from step S402 through step S413 for the remaining unit blocks in the same manner as above.

In the image processing apparatus in accordance with Embodiment 7, a judgment as to whether the image subjected to image processing is an edge block or not is made by the processing at step S404, and further a judgment is made as to whether the image that was judged not to be an edge block is an non-edge block or not. Then, the modification unit 14 performs the enhancement process on an image of an edge block, but performs the smoothing process on the non-edge block.

The image of an intermediate block includes no edge portion, but it is not a flat image, and therefore it is difficult to uniformly decide which of the enhancement process and the smoothing process is appropriate. Hence, when the enhancement process or the smoothing process is performed on the image of the intermediate block, it may badly influence the image quality of the image. For such a reason, the modification unit 14 does not perform either of the enhancement process and the smoothing process on the intermediate block.

Thus, in the image processing apparatus in accordance with Embodiment 7, it is possible to perform processing by capturing the features of an image in an improved manner, and it is possible to decrease the gray levels of the image while satisfactorily maintaining the features of the image.

Note that since the configuration, operations and effects of the image processing apparatus in accordance with Embodiment 7 except for the frequency component judging unit 13 and the modification unit 14 are the same as the configuration, operations and effects of the image processing apparatus in accordance with Embodiment 1, the same reference numerals are added to the same components, and the detailed explanation thereof will be omitted.

Besides, the predetermined value α2 is not limited to 16 as long as it is an appropriate positive value capable of obtaining satisfactory images.

In Embodiment 7, as described above, with use of similar method of Embodiment 1 or Embodiment 5, the enhancement process for an image is performed by increasing the values of the DCT coefficients Qj(S, T) of the AC components, and with use of similar method of Embodiment 4, the smoothing process for an image is performed by decreasing the values of the DCT coefficients Qj(S, T) of the AC components.

Embodiment 8

Figure 25:
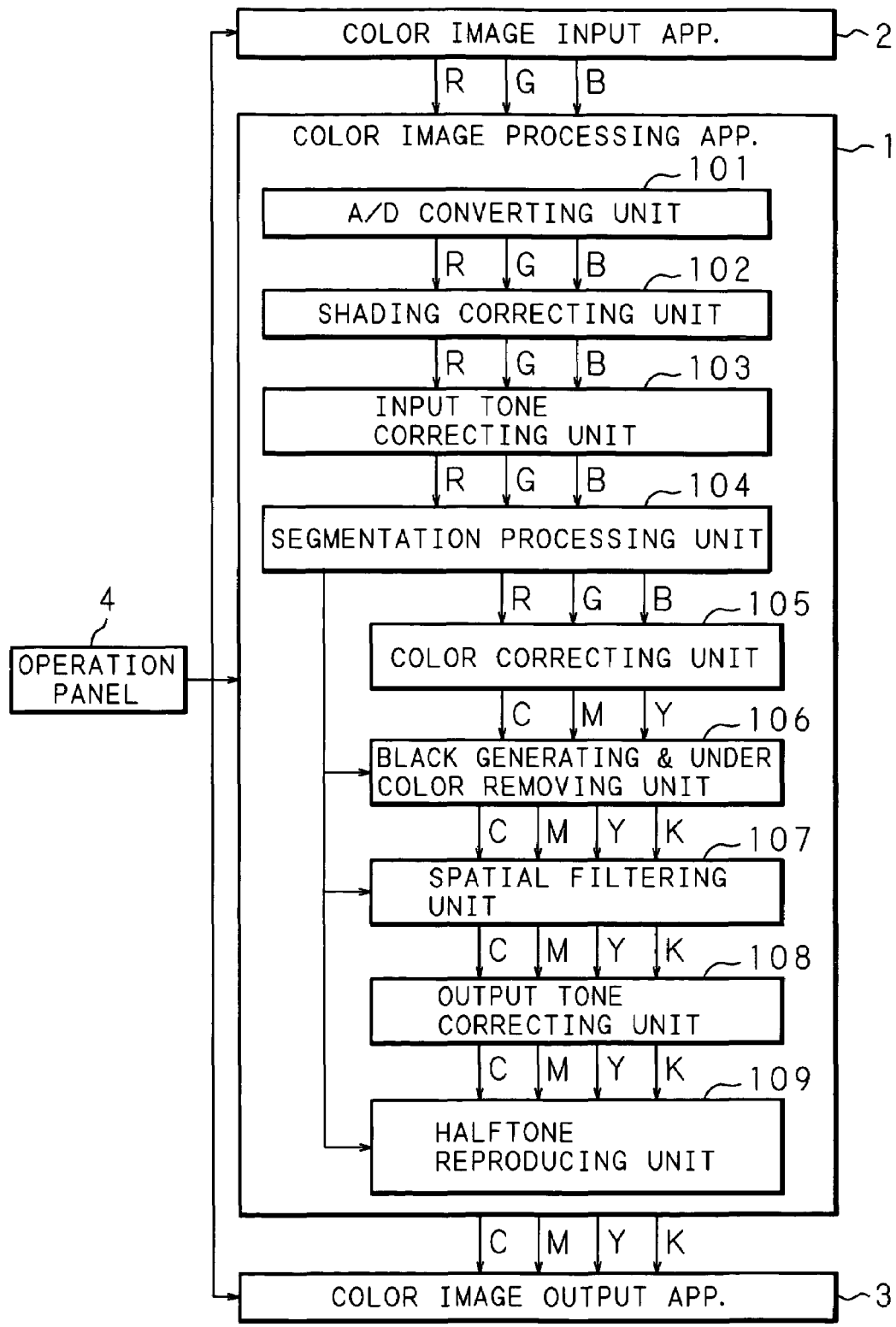
FIG. 25 is a block diagram showing a configuration example of the image forming apparatus in accordance with Embodiment 8 of the present invention.

Next, an image forming apparatus provided with the image processing apparatus in accordance with the present invention will be described as Embodiment 8 in accordance with the present invention. FIG. 25 is a block diagram showing a configuration example of the image forming apparatus in accordance with Embodiment 8 of the present invention. The image forming apparatus in accordance with Embodiment 8 is configured as a digital color copying machine, for example. More specifically, the image forming apparatus comprises a color image input apparatus 2 to which image data having RGB color components is inputted, a color image processing apparatus 1 for decreasing the number of gray levels of the image data inputted to the color image input apparatus 2, and a color image output apparatus 3 for outputting the image data processed by the color image processing apparatus 1, and further comprises an operation panel 4. The operation panel 4 is provided with setting buttons for setting the operation modes of the image forming apparatus, a numeric keypad, etc. Furthermore, the image forming apparatus is provided with a CPU (central processing unit), not shown, for controlling the various apparatuses provided in the image forming apparatus.

The color image processing apparatus 1 comprises an A/D (analog/digital) converting unit 101, a shading correcting unit 102, an input tone correcting unit 103, a segmentation processing unit 104, a color correcting unit 105, a black generating and under color removing unit 106, a spatial filtering unit 107, an output tone correcting unit 108 and a halftone reproducing unit 109. The halftone reproducing unit 109 is provided with the image processing apparatus in accordance with Embodiment 1 to Embodiment 5 described above.

The color image processing apparatus 1 converts the RGB analog signals outputted from the color image input apparatus 2 to the image data of RGB digital signals, carries out various image processing, such as correction processing, thereby generating image data formed of CMYK (C: cyan, M: magenta, Y: yellow, K: black) digital signals and decreasing the number of gray levels of the color components CMYK possessed by the generated image data to two or four, for example. The image data whose number of gray levels being decreased to two or four is temporarily stored in a storage apparatus not shown, and outputted to the color image output apparatus 3 at predetermined timing.

The color image input apparatus 2 is a scanner provided with a CCD (Charge Coupled Device), for example. The color image input apparatus 2 reads the image of light reflected from an original document as RGB (R: red, G: green, B: blue)

analog signals using the CCD, and outputs the RGB analog signals having been read to the color image processing apparatus 1.

The A/D converting unit 101 converts the RGB analog signals outputted from the color image input apparatus 2 to image data formed of RGB digital signals, and outputs the converted image data to the shading correcting unit 102. The shading correcting unit 102 processes the image data outputted from the A/D converting unit 101 to remove various distortions caused in the illumination system, imaging system and image taking system of the color image input apparatus 2, and outputs the processed image data to the input tone correcting unit 103. The input tone correcting unit 103 adjusts the color balance of the image data outputted from the shading correcting unit 102, converts the image data to density signals easily processable by the image processing system used in the color image processing apparatus 1, and outputs the converted image data to the segmentation processing unit 104.

The segmentation processing unit 104 separates each pixel of the image formed of the image data outputted from the input tone correcting unit 103 to one of a text area, a halftone dot area and a picture area, and outputs an area identification signal indicating which area each pixel belongs to, on the basis of the result of the separation, to the black generating and under color removing unit 106, the spatial filtering unit 107 and the halftone reproducing unit 109. Furthermore, the segmentation processing unit 104 outputs the image data outputted from the input tone correcting unit 103 to the color correcting unit 105 as it is.

To faithfully carry out color reproduction, the color correcting unit 105 converts the RGB digital signals of the image data received from the input tone correcting unit 103 to image data of CMY (C: cyan, M: magenta, Y: yellow) digital signals, removes color muddiness on the basis of the spectroscopic characteristics of the CMY color materials including unwanted absorbing components, and then outputs the processed image data to the black generating and under color removing unit 106. The black generating and under color removing unit 106 carries out black generation for generating a black signal, i.e. a K signal, from the three color signals of the CMY signals, i.e., the C signal, M signal and Y signal, in the image data outputted from the color correcting unit 105. Furthermore, the black generating and under color removing unit 106 generates new CMY digital signals by subtracting the K signal obtained by the black generation from the original CMY digital signals, and outputs image data formed of four CMYK color signal, that is, image data formed of CMYK digital signals, to the spatial filtering unit 107.

A method for carrying out black generation using skeleton black is available as general-purpose black generation processing. In the method for carrying out black generation using skeleton black, in the case where the input/output characteristics of a skeleton curve is assumed to be y=f(x), that the CMY digital signals of image data to be inputted are C, M and Y, that the CMYK digital signals of image data to be outputted are C', M', Y'and K', and that the UCR (Under Color Removal) ratio is α (0<α<1), C', M', Y' and K' are respectively represented by Expression (8) described below.

$$K'=f\{min(C, M, Y)\}$$
$$C'=C-\alpha K'$$
$$M'=M-\alpha K'$$
$$Y'=Y-\alpha K' \tag{8}$$

The spatial filtering unit 107 subjects the image of the image data outputted from the black generating and under color removing unit 106 to spatial filter processing using a digital filter on the basis of the area identification signals outputted from the segmentation processing unit 104, thereby correcting the spatial frequency characteristics and improving image blurring or graininess deterioration. The spatial filtering unit 107 then outputs the processed image data to the output tone correcting unit 108. The output tone correcting unit 108 subjects the image data outputted from the spatial filtering unit 107 to output tone correction processing or the like, and outputs the processed image data to the halftone reproducing unit 109. The halftone reproducing unit 109 subjects the image data formed of the CMYK digital signals to binarization or multi-value processing on the basis of the image data outputted from the output tone correcting unit 108 and the area identification signals outputted from the segmentation processing unit 104.

For example, in an area separated as a text area by the segmentation processing unit 104, the emphasizing amounts of high frequencies by sharpness emphasizing processing included in the spatial filter processing are increased to raise the reproducibility of black or color characters in particular in the spatial filtering unit 107. Furthermore, the halftone reproducing unit 109 carries out high-resolution binarization or multi-value processing suited for the reproduction of high frequencies.

Furthermore, in an area separated as a halftone dots area by the segmentation processing unit 104, the spatial filtering unit 107 carries out low-pass filter processing to remove input halftone dot components. Then, the output tone correcting unit 108 performs output tone correction processing for converting a signal such as a density signal to a halftone-dot area ratio serving as the characteristic value of the color image output apparatus 3. The halftone reproducing unit 109 carries out halftone reproduction processing wherein the image is finally separated to pixels and binarized or multi-value processed so that respective gray levels can be reproduced.

Still further, in an area separated as a picture area by the segmentation processing unit 104, the halftone reproducing unit 109 carries out binarization or multi-value processing by attaching importance to gray level reproducibility.

The image data of the CMYK digital signals subjected to binarization or multi-value processing by the halftone reproducing unit 109 is outputted to the color image output apparatus 3. The color image output apparatus 3 is an apparatus, for example, an electrographic printer or an ink-jet printer, for forming images on recording media, such as paper, on the basis of the CMYK digital signals of the image data inputted from the color image processing apparatus 1.

The operation panel 4 is an input apparatus through which the operator inputs instructions by key operation or the like. The instructions of the operator are outputted as control signals from the operation panel 4 to the color image input apparatus 2, the color image processing apparatus 1 and the color image output apparatus 3. According to the instructions of the operator, the image on an original document is read by the color image input apparatus 2, and subjected to data processing by the color image processing apparatus 1. An image is then formed on a recording medium by the color image output apparatus 3 that functions as a digital color copying machine. The above-mentioned processing is carried out under the control of the CPU.

In the image forming apparatus in accordance with Embodiment 8 of the present invention, the halftone reproducing unit 109 carries out the processing detailed in Embodiment 1 to Embodiment 5. It is thus possible to generate an image being subjected to binarization or four-value processing and high in original image reproducibility. In other words, it is possible to form an image being sharp at edge portions in comparison with the original image and having decreased number of gray levels while the characteristic portions of the original image are maintained properly. Furthermore, it is possible to form an image wherein pixels are not connected to one another at highlight areas, by adding the DCT coefficients of blue noise. Still further, it is possible to form an image having uniform black or white area while pixels are not connected to one another at highlight areas.

Embodiment 9

Figure 26:
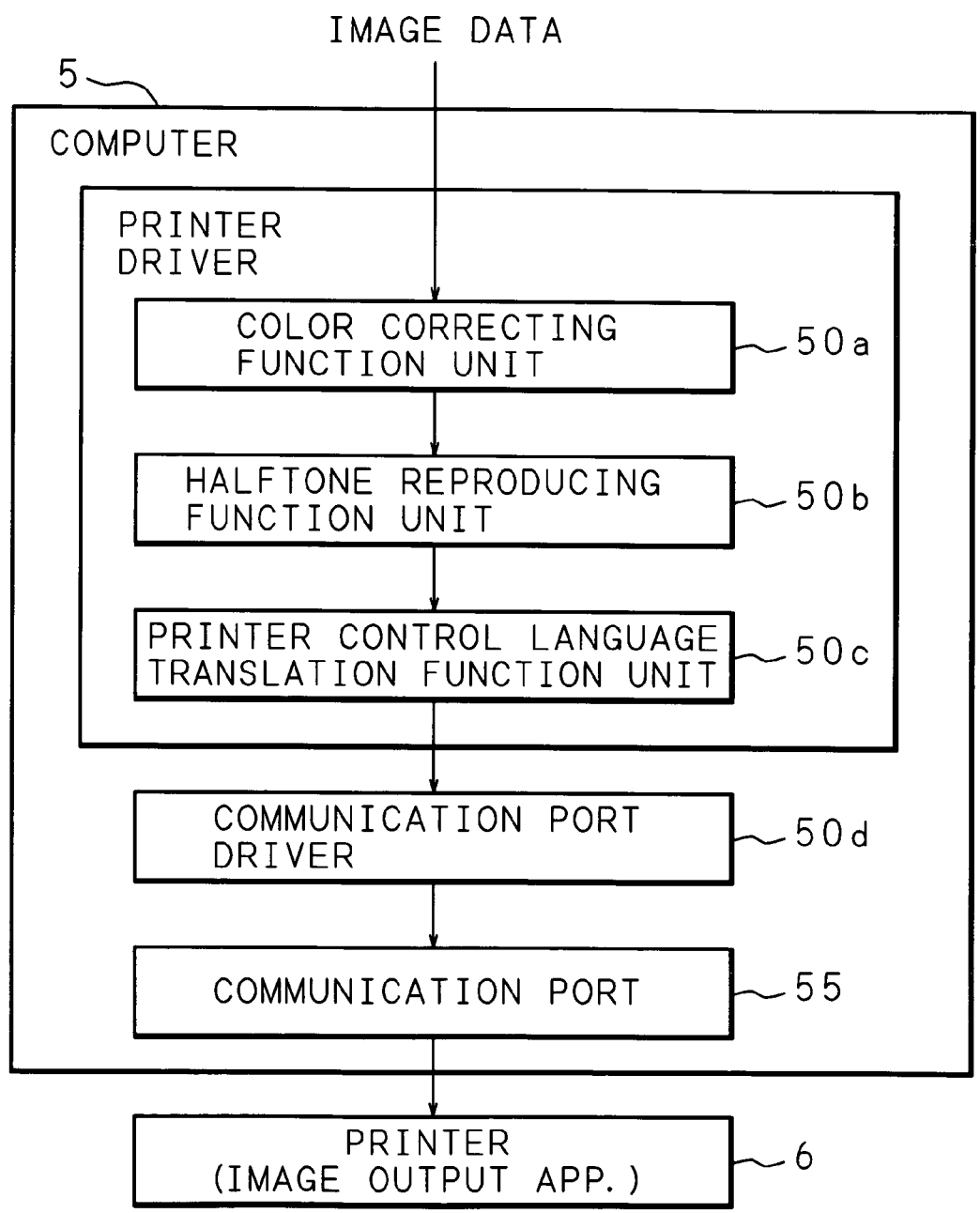
FIG. 26 is a function block diagram showing an image forming system comprising a computer functioning as the image processing apparatus in accordance with Embodiment 9 of the present invention and an image output apparatus.
Figure 27:
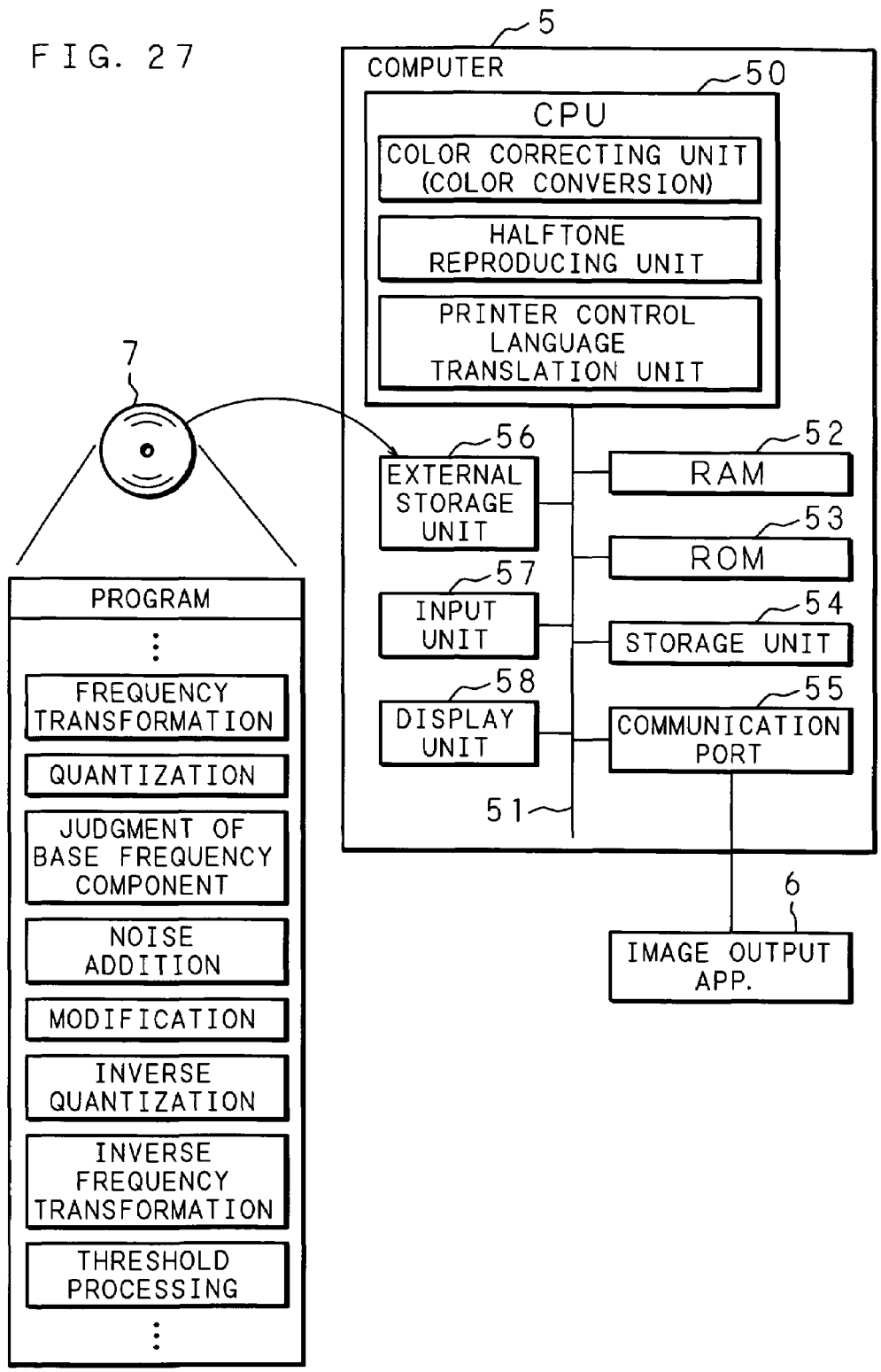
FIG. 27 is a block diagram showing the configuration of the computer functioning as the image processing apparatus in accordance with Embodiment 9 of the present invention.

Next, as Embodiment 9 in accordance with the present invention, a computer program product in accordance with the present invention, a recording medium 7 as a computer memory product on which the computer program is recorded, and a computer 5 functioning as an image processing apparatus by execution of the computer program recorded on the recording medium 7 will be described below. FIG. 26 is a function block diagram showing an image forming system comprising the computer 5 functioning as the image processing apparatus in accordance with Embodiment 9 of the present invention and an image output apparatus 6. FIG. 27 is a block diagram showing the configuration of the computer 5 functioning as the image processing apparatus in accordance with Embodiment 9 of the present invention. The image forming system comprises the computer 5 and the image output apparatus 6. The image output apparatus 6 is, for example, a printer, and carries out electrographic or ink-jet type image formation.

The computer 5 has a printer driver including a color correcting function unit 50a for carrying out color correction processing for image data having been inputted, a halftone reproducing function unit 50b for threshold processing wherein the number of gray levels of color-corrected image data, for example, 256, is decreased to two or four, and a printer control language translation function unit 50c for transforming the image data, the number of gray levels of which is decreased by the threshold processing, to a printer control language. The color correcting function unit 50a has functions similar to those of the color correcting unit 105, the black generating and under color removing unit 106, the spatial filtering unit 107, the output tone correcting unit 108, etc. shown in FIG. 25. The halftone reproducing function unit 50b has functions similar to those of the image processing apparatus in accordance with Embodiment 1 to Embodiment 5 described above. The image data transformed to a printer control language by the printer control language translation function unit 50c of the printer driver is outputted to the image output apparatus 6 provided outside via a communication port 55, such as a terminal conforming to the RS232C Standard, a LAN card or a LAN board, via a communication port driver 50d.

A specific configuration example of the computer 5 will be described below referring to FIG. 27. The computer 5 has a CPU 50 connected to a bus 51. A ROM 53 in which control program required for the CPU 50 to control various hardware devices described below are stored and a RAM 52, such as a DRAM for temporary storage, are connected to the bus 51. In addition, a storage unit 54, such as a hard disk drive, connected to the bus 51 stores computer program in accordance with the present invention. The CPU 50 starts the computer program, loads predetermined program portions of the computer program to the RAM 52 and carries out processing according to the computer program, whereby the computer 5 functions as an image processing apparatus having functions similar to those of the image processing apparatus in accordance with Embodiment 1 to Embodiment 5. An input unit 57 comprises a keyboard, a mouse, etc. A display unit 58 comprises a CRT display, a liquid crystal display or the like for displaying images or the like being inputted/outputted to the computer 5 as the result of the processing of the computer 5.

An external storage unit 56 comprises a flexible disc drive, a CD-ROM drive or the like for reading the computer program in accordance with the present invention from the recording medium 7, such as a flexible disc, a CD-ROM and a DVD, on which the computer program in accordance with the present invention are recorded. The computer program read from the external storage unit 56 are stored in the storage unit 54. The communication port 55 is an interface for outputting images processed by the computer 5 to the image output apparatus 6.

In Embodiment 9, the computer program stored on the recording medium 7, such as a CD-ROM, are read by the external storage unit 56 and stored in the storage unit 54 or the RAM 52, and then executed by the CPU 50. Hence, the computer 5 can function as the image processing apparatus in accordance with Embodiment 1 to Embodiment 5 or Embodiment 8.

In other words, by using the computer 5, it is possible to realize an image processing apparatus capable of generating an image being sharp at edge portions in comparison with the original image and capable of decreasing the number of gray levels of the image while the characteristic portions of the original image are maintained properly. In addition, the DCT coefficients of blue noise are added using the computer 5, whereby it is possible to realize an image processing apparatus capable of preventing pixels from being connected to one another at highlight areas having large gray levels while image deterioration is suppressed to the minimum. Furthermore, by using the computer 5, it is possible to realize an image processing apparatus capable of preventing pixels from being connected to one another at highlight areas having large gray levels, capable of obtaining uniformly black or white blocks and capable of obtaining an excellent image.

Furthermore, in the case where the computer 5 is operated to function as an image processing apparatus corresponding to Embodiment 5, it is possible to effectively prevent block patterns from being generated at the curve portions of an image in comparison with the case wherein the coefficients of all the AC components are modified. Hence, the number of gray levels of the image can be decreased while the characteristic portions of the original image are maintained properly. Moreover, in the case where the computer 5 is operated to function as an image processing apparatus equivalent to Embodiment 5, it is possible to more effectively emphasize edge portions without losing the characteristic portions of the image than in the case wherein all the AC components are multiplied by the same real number larger than 1, and also possible to decrease the number of gray levels of the image while the characteristic portions of the original image are maintained properly.

In Embodiment 9, the computer program in accordance with the present invention are read from the recording medium on which the computer program in accordance with the present invention are stored and then stored in the storage unit. However, it may be possible that the computer program in accordance with the present invention are received from an apparatus, such as a computer or a work station, connected to a network via the communication port and then stored in the hard disk drive or the RAM.

Furthermore, the recording medium should only be a recording medium that is readable directly or indirectly by a computer. For example, the recording medium may be a semiconductor device, such as a ROM or a flash memory, or a magnetic recording medium, such as a flexible disk, a hard disk, an MD or a magnetic tape. Still further, the recording medium may be an optical recording medium, such as a CD-ROM, a MO or a DVD. It does not matter what kinds of recording and reading methods are used for the recording medium 7.

Still further, the image output apparatus may be a digital complex machine having a copying function, a facsimile function and the like in addition to a printing function.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds there of are therefore intended to be embraced by the claims.

The invention claimed is:

1. An image processing method for carrying out image processing by transforming image data to image data having spatial frequency components and by modifying the coefficients of said spatial frequency components, comprising steps controlled by a processor of:
    judging whether at least one of absolute values of the products obtained by multiplying the plural coefficients of the predetermined frequency components, corresponding to a predetermined direct current component, of the transformed image data by the coefficients of the direct current (DC) components of the same is equal to or more than a predetermined value, wherein a plurality of the absolute values correspond with each of the plural coefficients and the absolute values correspond with the direct current component;
    modifying the coefficients of alternating current (AC) components of said image data by calculation depending on the result of the judgment;
    adding specific values to the modified coefficients of the alternating current (AC) components of the image data;
    inversely transforming the image data, to which said specific values are added, to image data having spatial coordinate components;
    comparing gray levels of the inversely transformed image data with predetermined values; and
    transforming said gray levels to quantized levels corresponding to the result of the comparison, wherein
    all the coefficients of the alternating current components corresponding to the predetermined direct current component are modified by calculation, once the judging has been carried out.

2. The image processing method as set forth in claim 1, further comprising a step controlled by a processor of modifying said coefficients by calculation in the case where it is judged that said absolute values are equal to or more than said predetermined value, by multiplying the coefficients of the alternating current (AC) components having only the spatial frequency components in the horizontal direction and the coefficients of the alternating current (AC) components having only the spatial frequency components in the vertical direction by a real number larger than 1.

3. The image processing method as set forth in claim 2, further comprising a step controlled by a processor of modifying said coefficients by calculation in the case where it is judged that said absolute values are equal to or more than said predetermined value, by multiplying said coefficients by a larger real number as the frequency of the alternating current (AC) component is higher and multiplying said coefficients by a smaller real number as the frequency of the alternating current (AC) component is lower, respectively.

4. An image processing apparatus which has a frequency transform unit for transforming image data to image data having spatial frequency components, and carries out image processing by modifying the coefficients of said spatial frequency components, comprising:
    a judging unit for judging whether at least one of absolute values of the products obtained by multiplying the plural coefficients of the predetermined frequency components, corresponding to a predetermined direct current component, of the transformed image data by the coefficients of the direct current (DC) components of the same is equal to or more than a predetermined value, wherein a plurality of the absolute values correspond with each of the plural coefficients and the absolute values correspond with the direct current component;
    a calculation unit for modifying the coefficients of alternating current (AC) components of said image data by calculation depending on the result of the judgment made by said judging unit;
    an adding unit for adding specific values to the coefficients of the alternating current (AC) components of the image data modified by said calculation unit;
    an inverse transform unit for inversely transforming the image data, to which said specific values are added by said adding unit, to image data having spatial coordinate components; and
    a threshold processing unit for comparing gray levels of the image data inversely transformed by said inverse transform unit with predetermined values and for transforming said gray levels to quantized levels corresponding to the result of the comparison, wherein
    all the coefficients of the alternating current components corresponding to the predetermined direct current component are modified by calculation, once the judging has been carried out.

5. The image processing apparatus as set forth in claim 4, wherein
    said judging unit judges whether or not absolute values of coefficients of predetermined frequency components of the image data transformed by said frequency transform unit are equal to or larger than a predetermined value,
    said adding unit adds specific values to the coefficients of alternating current (AC) components of the image data transformed by said frequency transform unit, when said judging unit judges that the absolute values of the products are not equal to or larger than the predetermined value and the absolute values of the coefficients are equal to or larger than the predetermined value, and
    said calculation unit multiplies the coefficients of alternating current (AC) components of the image data transformed by said frequency transform unit by a positive real number smaller than 1, or divides the coefficients of alternating current (AC) components of the image data by a real number larger than 1, when said judging unit judges that the absolute values of products are not equal to or larger than the predetermined value and the absolute values of the coefficients are not equal to or larger than the predetermined value.

6. The image processing apparatus as set forth in claim 4, wherein said frequency transform unit transforms the image data into image data having spatial frequency components within a predetermined frequency range, and
    said judging unit judges whether or not absolute values of products obtained by multiplying the coefficients of alternating current (AC) components on a low frequency side by the coefficient of direct current (DC) component are equal to or larger than a predetermined value.

7. The image processing apparatus as set forth in claim 6, wherein said judging unit judges whether or not absolute values of coefficients of predetermined frequency components of the image data transformed by said frequency transform unit are equal to or larger than a predetermined value,
   said adding unit adds specific values to the coefficients of alternating current (AC) components of the image data transformed by said frequency transform unit, when said judging unit judges that the absolute values of the products are not equal to or larger than the predetermined value and the absolute values of the coefficients are equal to or larger than the predetermined value, and
   said calculation unit multiplies the coefficients of alternating current (AC) components of the image data transformed by said frequency transform unit by a positive real number smaller than 1, or divides the coefficients of alternating current (AC) components of the image data by a real number larger than 1, when said judging unit judges that the absolute values of the products are not equal to or larger than the predetermined value and the absolute values of the coefficients are not equal to or larger than the predetermined value.

8. The image processing apparatus as set forth in claim 4, wherein in the case where said judging unit judges that the absolute values are equal to or more than said predetermined value, said calculation unit multiplies the coefficients of the alternating current (AC) components of said image data by a real number larger than 1 or divides the coefficients of the alternating current (AC) components of said image data by a positive real number smaller than 1.

9. The image processing apparatus as set forth in claim 8, wherein in the case where said judging unit judges that the absolute values are equal to or more than said predetermined value, said calculation unit multiplies the coefficients of the alternating current (AC) components having only the spatial frequency components in the horizontal direction and the coefficients of the alternating current (AC) components having only the spatial frequency components in the vertical direction by a real number larger than 1.

10. The image processing apparatus as set forth in claim 9, wherein said calculation unit multiplies said coefficients by a larger real number as the frequency of the alternating current (AC) component is higher and multiples said coefficients by a smaller real number as the frequency of the alternating current (AC) component is lower, respectively.

11. The image processing apparatus as set forth in claim 10, wherein in the case where said judging unit judges that the absolute values are less than said predetermined value, said calculation unit multiplies the coefficients of the alternating current (AC) components of said image data by a positive real number smaller than 1 or divides the coefficients of the alternating current (AC) components of said image data by a real number larger than 1.

12. An image forming apparatus including an image processing apparatus which has a frequency transform unit for transforming image data to image data having spatial frequency components, and carries out image processing by modifying the coefficients of said spatial frequency components,
   said image processing apparatus, comprising:
   a judging unit for judging whether at least one of absolute values of the products obtained by multiplying the plural coefficients of the predetermined frequency components, corresponding to a predetermined direct current component, of the transformed image data by the coefficients of the direct current (DC) components of the same are equal to or more than a predetermined value, wherein a plurality of the absolute values correspond with each of the plural coefficients and the absolute values correspond with the direct current component;
   a calculation unit for modifying the coefficients of alternating current (AC) components of said image data by calculation depending on the result of the judgment made by said judging unit;
   an adding unit for adding specific values to the coefficients of the alternating current (AC) components of the image data modified by said calculation unit;
   an inverse transform unit for inversely transforming the image data, to which said specific values are added by said adding unit, to image data having spatial coordinate components; and
   a threshold processing unit for comparing gray levels of the image data inversely transformed by said inverse transform unit with predetermined values and for transforming said gray levels to quantized levels corresponding to the result of the comparison, wherein
   an image is formed on the basis of the image data image-processed by said image processing apparatus, and
   all the coefficients of the alternating current components corresponding to the predetermined direct current component are modified by calculation, once the judging has been carried out.

13. The image forming apparatus as set forth in claim 12, wherein
   said frequency transform unit transforms the image data into image data having spatial frequency components within a predetermined frequency range, and
   said judging unit judges whether or not absolute values of products obtained by multiplying the coefficients of alternating current (AC) components on a low frequency side by the coefficient of direct current (DC) component are equal to or larger than a predetermined value.

14. A computer program product for controlling a computer to carry out image processing by transforming image data to image data having spatial frequency components and by modifying the coefficients of said spatial frequency components, wherein the computer program product comprises:
   a computer readable storage medium having computer readable program code means embodied in said medium, said computer readable program code means comprising computer instruction means for:
   judging whether at least one of absolute values of the products obtained by multiplying the plural coefficients of the predetermined frequency components, corresponding to a predetermined direct current component, of the transformed image data by the coefficients of the direct current (DC) components of the same is equal to or more than a predetermined value, wherein a plurality of the absolute values correspond with each of the plural coefficients and the absolute values correspond with the direct current component;
   modifying coefficients of alternating current (AC) components of said image data by calculation depending on the result of the judgment;
   adding specific values to the modified coefficients of the alternating current (AC) components of the image data;
   inversely transforming the image data, to which said specific values are added, to image data having spatial coordinate components;
   comparing gray levels of the inversely transformed image data with predetermined values; and transforming said gray levels to quantized levels corresponding to the result of the comparison, wherein all the coefficients of the alternating current components corresponding to the predetermined direct current component are modified by calculation, once the judging has been carried out.

15. The computer program product as set forth in claim 14, wherein said computer instruction means for modifying the coefficients of the alternating current (AC) components of said image data by calculation includes computer instruction means for carrying out multiplication in the case where it is judged that the absolute values are equal to or more than said predetermined value, by multiplying the coefficients of the alternating current (AC) components having only the spatial frequency components in the horizontal direction and the coefficients of the alternating current (AC) components having only the spatial frequency components in the vertical direction by a real number larger than 1.

16. The computer program product as set forth in claim 15 wherein said computer instruction means for modifying the coefficients of the alternating current (AC) components of said image data by calculation includes computer instruction means for multiplying said coefficients by a larger real number as the frequency of the alternating current (AC) component is higher and multiplying said coefficients by a smaller real number as the frequency of the alternating current (AC) component is lower, respectively.

17. A computer memory product readable by a computer containing a program for controlling a computer to carry out image processing by transforming image data to image data having spatial frequency components and by modifying the coefficients of said spatial frequency components, the program comprising steps of:

judging whether at least one of absolute values of the products obtained by multiplying the plural coefficients of the predetermined frequency components, corresponding to a predetermined direct current component, of the transformed image data by the coefficients of the direct current (DC) components of the same is equal to or more than a predetermined value, wherein a plurality of the absolute values correspond with each of the plural coefficients and the absolute values correspond with the direct current component;

modifying coefficients of alternating current (AC) components of said image data by calculation depending on the result of the judgment;

adding specific values to the modified coefficients of the alternating current (AC) components of the image data;

inversely transforming the image data, to which said specific values are added, to image data having spatial coordinate components;

comparing gray levels of the inversely transformed image data with predetermined values; and transforming said gray levels to quantized levels corresponding to the result of the comparison, wherein all the coefficients of the alternating current components corresponding to the predetermined direct current component are modified by calculation, once the judging has been carried out.

\* \* \* \* \*